(12) United States Patent
Baghdadi

(10) Patent No.: US 11,667,764 B2
(45) Date of Patent: Jun. 6, 2023

(54) FOAM COMPOSITIONS AND USES THEREOF

(71) Applicant: NIKE, Inc., Beaverton, OR (US)

(72) Inventor: Hossein A. Baghdadi, Portland, OR (US)

(73) Assignee: NIKE, INC., Beaverton, OR (US)

( * ) Notice: Subject to any disclaimer, the term of this patent is extended or adjusted under 35 U.S.C. 154(b) by 0 days.

(21) Appl. No.: 17/662,668

(22) Filed: May 10, 2022

(65) Prior Publication Data

US 2022/0267551 A1  Aug. 25, 2022

Related U.S. Application Data

(63) Continuation of application No. 17/229,371, filed on Apr. 13, 2021, which is a continuation of application No. 16/351,364, filed on Mar. 12, 2019, now Pat. No. 11,034,813.

(60) Provisional application No. 62/645,036, filed on Mar. 19, 2018, provisional application No. 62/641,701, filed on Mar. 12, 2018.

(51) Int. Cl.
| | |
|---|---|
| *C08J 9/12* | (2006.01) |
| *A43B 1/14* | (2006.01) |
| *A43B 13/12* | (2006.01) |
| *C08L 67/02* | (2006.01) |
| *A43B 13/04* | (2006.01) |
| *C08G 63/672* | (2006.01) |
| *C08J 9/00* | (2006.01) |

(52) U.S. Cl.
CPC ............... *C08J 9/122* (2013.01); *A43B 1/14* (2013.01); *A43B 13/04* (2013.01); *A43B 13/12* (2013.01); *C08G 63/672* (2013.01); *C08J 9/00* (2013.01); *C08L 67/025* (2013.01); *C08J 2203/06* (2013.01); *C08J 2203/08* (2013.01); *C08J 2205/05* (2013.01); *C08J 2367/02* (2013.01); *C08L 2203/14* (2013.01); *C08L 2207/04* (2013.01)

(58) Field of Classification Search
CPC . C08J 9/122; C08J 9/00; C08J 2203/06; C08J 2203/08; C08J 2205/05; C08J 2367/02; A43B 1/14; A43B 13/04; A43B 13/12; C08G 63/672; C08L 67/025; C08L 2203/14; C08L 2207/04
See application file for complete search history.

(56) References Cited

U.S. PATENT DOCUMENTS

| | | | |
|---|---|---|---|
| 4,984,376 A | 1/1991 | Walter et al. | |
| 4,988,740 A * | 1/1991 | Walter | C08J 9/06 525/437 |
| 5,202,069 A | 4/1993 | Pontiff | |
| 6,267,692 B1 | 7/2001 | Higuchi et al. | |
| 10,314,364 B2 | 6/2019 | Schiller et al. | |
| 10,974,447 B2 | 4/2021 | Constantinou et al. | |
| 2005/0015907 A1 | 1/2005 | Georgi et al. | |
| 2014/0162050 A1 | 6/2014 | Kodama et al. | |
| 2015/0038605 A1 * | 2/2015 | Baghdadi | C08J 9/06 521/137 |
| 2018/0273715 A1 | 9/2018 | Luo et al. | |
| 2018/0345575 A1 | 12/2018 | Constantinou et al. | |
| 2021/0076772 A1 | 3/2021 | Baghdadi et al. | |

FOREIGN PATENT DOCUMENTS

| | | | |
|---|---|---|---|
| CN | 103717657 A | 4/2014 | |
| CN | 107641293 A | 1/2018 | |
| EP | 0402883 A2 | 12/1990 | |
| EP | 0608143 A1 | 7/1994 | |
| EP | 1225199 A1 * | 7/2002 | ............ C08G 18/12 |
| EP | 2508922 A1 | 10/2012 | |
| EP | 3244240 A1 | 11/2017 | |
| GB | 2164291 A * | 3/1986 | ......... B29C 44/0415 |
| JP | 2012159589 A | 8/2012 | |
| KR | 101472929 B1 | 12/2014 | |
| TW | 200628089 A | 8/2006 | |
| WO | 03095657 A2 | 11/2003 | |

(Continued)

OTHER PUBLICATIONS

International Preliminary Report on Patentability for PCT/US2019/021926 dated Mar. 2, 2020.
International Preliminary Report on Patentability for PCT/US2019/021926, dated Nov. 26, 2020.
International Preliminary Report on Patentability for PCT/US2019/021931 dated Mar. 2, 2020.
International Preliminary Report on Patentability for PCT/US2020/050360, dated Mar. 24, 2022.
International Preliminary Report on Patentability for PCT/US2020/050361, dated Nov. 29, 2021.
International Preliminary Report on Patentability for PCT/US2020/050484, dated Dec. 6, 2021.
International Preliminary Report on Patentability for PCT/US2020/050489, dated Dec. 6, 2021.

(Continued)

*Primary Examiner* — K. Boyle
(74) *Attorney, Agent, or Firm* — Thomas | Horstemeyer, LLP

(57) ABSTRACT

A variety of forms and form components are provided, including form components for articles of footwear and athletic equipment. The articles include a composition having a form structure, wherein the composition includes a thermoplastic copolyester elastomer comprising: (a) a plurality of first segments, each first segment derived from a dihydroxy-terminated polydiol; (b) a plurality of second segments, each second segment derived from a diol; and (c) a plurality of third segments, each third segment derived from an aromatic dicarboxylic acid. Methods of making the compositions and forms are provided, as well as methods of making an article of footwear including at least one of the form components. In some aspects, the forms and form components can be made by extrusion or injection molding to form the polymeric composition, or extrusion or injection molding to form the polymeric composition followed by compression molding of the form.

20 Claims, 9 Drawing Sheets

(56) References Cited

FOREIGN PATENT DOCUMENTS

| WO | 2016030333 A1 | 3/2016 |
| WO | 2017042707 A2 | 3/2017 |
| WO | 2017171031 A1 | 10/2017 |
| WO | 2018134166 A1 | 7/2018 |
| WO | 2018222714 A1 | 12/2018 |
| WO | 2019178150 A1 | 9/2019 |
| WO | 2019178154 A1 | 9/2019 |

OTHER PUBLICATIONS

International Search Report and the Written Opinion of the International Searching Authority for PCT/US2020/050360, dated Nov. 20, 2020.
International Search Report and the Written Opinion of the International Searching Authority for PCT/US2020/050484, dated Dec. 21, 2020.
International Search Report and Written Opinion for PCT/US2019/021926 dated May 9, 2019.
International Search Report and Written Opinion for PCT/US2019/021931 dated May 9, 2019.
International Search Report and Written Opinion for PCT/US2020/050361, dated Nov. 20, 2020.
International Search Report and Written Opinion for PCT/US2020/050489 dated Dec. 21, 2020.
Veenstra, "Formation and stability of co-continuous blends with a poly(ether-ester)block copolymer around its order-disorder temperature," Polymer, vol. 40 (1999) p. 1119-1130. (Year 1999).
Written Opinion of the International Preliminary Examining Authority for PCT/US2019/021926 dated Dec. 16, 2019.
Written Opinion of the International Preliminary Examining Authority for PCT/US2019/021931 dated Dec. 16, 2019.
Written Opinion of the International Preliminary Examining Authority for PCT/US2020/050484, dated Jun. 15, 2021.
Written Opinion of the International Preliminary Examining Authority for PCT/US2020/050489, dated Apr. 28, 2021.

* cited by examiner

FOAM COMPOSITIONS AND USES THEREOF

CROSS-REFERENCE TO RELATED APPLICATIONS

This application is a continuation of, and claims priority to co-pending U.S. patent application Ser. No. 17/229,371, filed on Apr. 13, 2021, which is a continuation of, and claims priority to co-pending U.S. patent application Ser. No. 16/351,364, filed on Mar. 12, 2019, now U.S. Pat. No. 11,034,813, which claims priority to U.S. Provisional Application No. 62/641,701, filed on Mar. 12, 2018, and U.S. Provisional Application No. 62/645,036, filed on Mar. 19, 2018, each of which is incorporated herein by reference in its entirety.

TECHNICAL FIELD

The present disclosure generally relates to forms formed of thermoplastic copolyester elastomers, and in particular to forms formed of thermoplastic copolyester elastomers which are suitable for the footwear and related industries and uses thereof.

BACKGROUND

The design of athletic equipment and apparel as well as footwear involves a variety of factors from the aesthetic aspects, to the comfort and feel, to the performance and durability. While design and fashion may be rapidly changing, the demand for increasing performance in the market is unchanging. To balance these demands, designers employ a variety of materials and designs for the various components that make up athletic equipment and apparel as well as footwear.

BRIEF DESCRIPTION OF THE DRAWINGS

Further aspects of the present disclosure will be readily appreciated upon review of the detailed description, described below, when taken in conjunction with the accompanying drawings.

(FIG. 8A); 190 degrees C. (FIG. 8A); 205 degrees C. (FIG. 8A); and 245 degrees C. (FIG. 8D).

DETAILED DESCRIPTION

Figure 1:
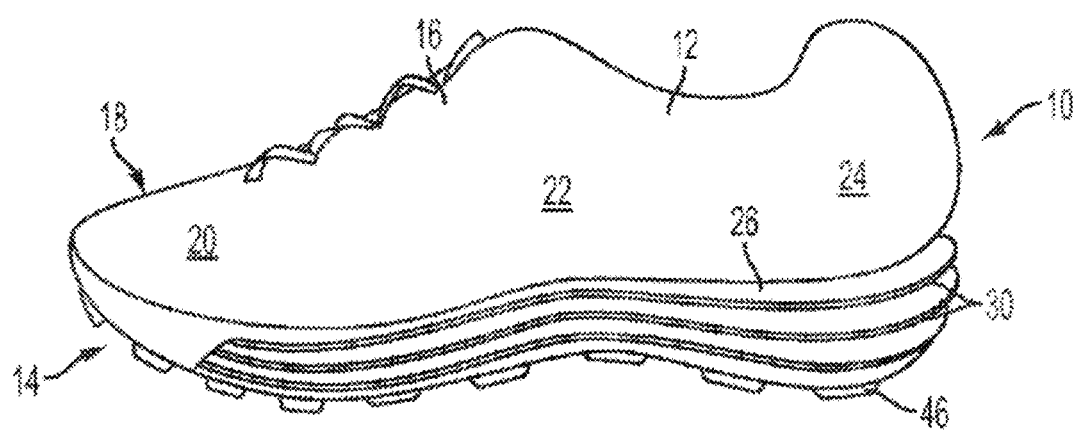
FIG. 1 is an elevation view of an article of footwear with a sole component according to an aspect of the invention.

The present disclosure is directed to a form comprising thermoplastic copolyester elastomers, i.e., thermoplastic copolyester elastomer form. The thermoplastic copolyester elastomer forms are formed from polymeric compositions comprising one or more thermoplastic copolyester elastomer. Examples of thermoplastic copolyester elastomers include polymers which have one or more carboxylic acid moiety present in the polymeric backbone, on one or more side chains, or both in the polymeric backbone and on one or more side chains. The one or more carboxylic acid moiety of the thermoplastic copolyester elastomer can include a free carboxylic acid, a salt of a carboxylic acid, or an anhydride of a carboxylic acid. In particular examples, the carboxylic acid moiety can be an acrylic acid moiety or a methacrylic acid moiety. The thermoplastic copolyester elastomer form of the present disclosure is suitable for use in a variety of articles. The thermoplastic copolyester elastomer form is particularly suitable for athletic equipment and apparel, particularly footwear (e.g., athletic footwear midsoles/outsoles). As discussed below, the thermoplastic copolyester elastomer form exhibits a unique balance of properties such as high energy return, high split tear, low density, and low compression set. Unlike thermosetting polymeric compositions and forming methods that form thermoset forms, the thermoplastic compositions and methods of forming described herein produce do not require the formation of irreversible chemical bonds (e.g., crosslinking bonds) during the forming process, and so the solidified forms described herein retain the thermoplastic nature of the copolyester elastomers. In some examples, the level of crosslinks between thermoplastic copolyester elastomer chains is low prior to forming and remains substantially unchanged following solidification of the form. The thermoplastic copolyester elastomer form described herein can be melted and reprocessed repeatedly, with minimal loss in physical properties (e.g., for recycling), providing a solution for materials sustainability.

In a first aspect, the present disclosure is directed to a form article comprising: a formed polymeric material comprising a thermoplastic copolyester elastomer, wherein the thermoplastic copolyester elastomer comprises, (a) a plurality of first segments, each first segment derived from a dihydroxy-terminated polydiol; (b) a plurality of second segments, each second segment derived from a diol; and (c) a plurality of third segments, each third segment derived from an aromatic dicarboxylic acid; wherein the form article has a microcellular form structure. The thermoplastic copolyester elastomer of the form article can be substantially uncrosslinked. In one example, the microcellular form structure is a closed-cell microcellular form structure. In another example, the microcellular form structure is an open-cell microcellular form structure.

In a second aspect, the present disclosure is directed to a form article comprising: a formed polymeric material comprising a thermoplastic copolyester elastomer, wherein the thermoplastic copolyester elastomer comprises, (a) a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a formula 1:

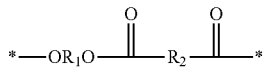
(1)

wherein $R_1$ is a group remaining after removal of terminal hydroxyl groups from the poly(alkylene oxide) diol of the first segment, wherein the poly(alkylene oxide) diol of the first segment is a poly(alkylene oxide) diol having a number-average molecular weight of about 400 to about 6000; and wherein $R_2$ is a group remaining after removal of carboxyl groups from the aromatic dicarboxylic acid of the third segment; and (b) a plurality of second copolyester units, each second copolyester unit of the plurality comprising the second segment derived from a diol and the third segment derived from an aromatic dicarboxylic acid, wherein The second copolyester unit has a structure represented by a formula 2:

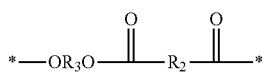
(2)

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment; wherein the form article has a microcellular form structure. In one example, the thermoplastic copolyester elastomer of the form article is substantially uncrosslinked.

In a third aspect, the present disclosure is directed to a form article comprising: a formed polymeric material comprising a thermoplastic copolyester elastomer, wherein the thermoplastic copolyester elastomer comprises, (a) a plurality of first copolyester units, each first copolyester unit of the plurality having a structure represented by a formula 4:

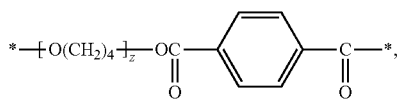
(4)

wherein z is an integer having a value from 2 to 60; and wherein a weight average molecular weight of each of the plurality of first copolyester units is from about 300 Daltons to about 7,000 Daltons; and (b) a plurality of second copolyester units, each second copolyester unit of the plurality having represented by a formula 5:

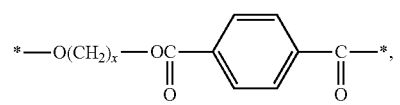
(5)

wherein x is an integer having a value from 1 to 20; wherein the form article has a microcellular form structure. In one example, the thermoplastic copolyester elastomer of the form article is substantially uncrosslinked.

In a fourth aspect, the present disclosure is directed to a method for making a form article, the method comprising: forming a mixture of molten polymeric material and a blowing agent, wherein the polymeric material comprises a thermoplastic copolyester elastomer having: (a) a plurality of first segments, each first segment derived from a dihydroxy-terminated polydiol; (b) a plurality of second segments, each second segment derived from a diol; and (c) a plurality of third segments, each third segment derived from an aromatic dicarboxylic acid; injecting the mixture into a mold cavity; forming molten polymeric material while decreasing a temperature or a pressure or both of the molten polymeric material, thereby forming a form article having a microcellular form structure; solidifying the form; and removing the solidified form article from the mold cavity. In one example, a crosslinking density of the thermoplastic copolyester elastomer remains substantially unchanged in the solidified form article as compared to the molten polymeric material. The blowing agent can be a physical blowing agent, such as supercritical nitrogen or carbon dioxide, or can be a chemical blowing agent.

In a fifth aspect, the present disclosure is directed to a method for making a form article, the method comprising: forming a mixture of molten polymeric material and a blowing agent, wherein the polymeric material comprises a thermoplastic copolyester elastomer having: (a) a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a formula 1:

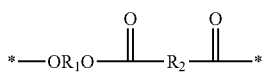
(1)

wherein $R_1$ is a group remaining after removal of terminal hydroxyl groups from the poly(alkylene oxide) diol of the first segment, wherein the poly(alkylene oxide) diol of the first segment is a poly(alkylene oxide) diol having a number-average molecular weight of about 400 to about 6000; and wherein $R_2$ is a group remaining after removal of carboxyl groups from the aromatic dicarboxylic acid of the third segment; and (b) a plurality of second copolyester units, each second copolyester unit of the plurality comprising the second segment derived from a diol and the third segment derived from an aromatic dicarboxylic acid, wherein The second copolyester unit has a structure represented by a formula 2:

(2)

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment; injecting the mixture into a mold cavity; forming molten polymeric material while decreasing a temperature or a pressure or both of the molten polymeric material, thereby forming a form article having a microcellular form structure; solidifying the form; and removing the solidified form article from the mold cavity. In one example, a crosslinking density of the thermoplastic copolyester elastomer remains substantially unchanged in the solidified form article as compared to the molten polymeric material. The blowing agent can be a physical blowing agent, such as supercritical nitrogen or carbon dioxide, or can be a chemical blowing agent.

In a sixth aspect, the present disclosure is directed to a method for making a form article, the method comprising: forming a mixture of molten polymeric material and a blowing agent, wherein the polymeric material comprises a thermoplastic copolyester elastomer having: (a) a plurality of first copolyester units, each first copolyester unit of the plurality having a structure represented by a formula 4:

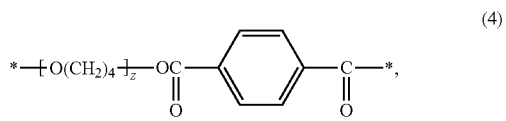

(4)

wherein z is an integer having a value from 2 to 60; and wherein a weight average molecular weight of each of the plurality of first copolyester units is from about 300 Daltons to about 7,000 Daltons; and (b) a plurality of second copolyester units, each second copolyester unit of the plurality having represented by a formula 5:

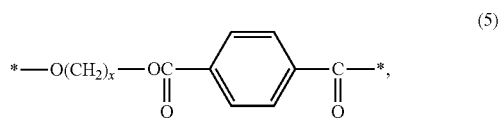

(5)

wherein x is an integer having a value from 1 to 20; wherein the form article has a microcellular form structure; injecting the mixture into a mold cavity; forming molten polymeric material while decreasing a temperature or a pressure or both of the molten polymeric material, thereby forming a form article having a microcellular form structure; and removing the form article from the mold cavity. In one example, a crosslinking density of the thermoplastic copolyester elastomer remains substantially unchanged in the solidified form article as compared to the molten polymeric material. The blowing agent can be a physical blowing agent, such as supercritical nitrogen or carbon dioxide, or can be a chemical blowing agent.

In a seventh aspect, the present disclosure is directed to a method for manufacturing an article of footwear, the method comprising: affixing a form article and a textile element to each other; wherein the form article is any disclosed form article.

In an eighth aspect, the present disclosure is directed to a method for manufacturing an article of footwear, the method comprising: affixing a form article and a textile element to each other; wherein the form article is made by any disclosed method.

In a ninth aspect, the present disclosure is directed an article comprising any disclosed form article.

In a tenth aspect, the present disclosure is directed an article comprising a form article made by any disclosed method.

Articles Manufactured Using the Disclosed Methods.

Footwear 10 is an exemplary article of athletic footwear that includes the thermoplastic copolyester elastomer form of the present disclosure. While illustrated as a running shoe, footwear 10 may alternatively be configured for any suitable athletic performance, such as baseball shoes, basketball shoes, soccer/global football shoes, American football shoes, running shoes, cross-trainer shoes, cheerleading shoes, golf shoes, and the like. While an athletic shoe is exemplified in FIG. 1, it will be readily understood that some of the terminology employed will also apply to other articles of footwear or to other styles of shoe. Footwear 10 includes an upper 12 and a sole component 14 secured to upper 12. Sole component 14 can be secured to upper 12 by adhesive or any other suitable means. As used herein, the sole component 14 can be a monolithic component formed entirely of the thermoplastic copolyester elastomer form material as described herein, or a multi-component assembly formed of a plurality of monolithic components, where at least one of the monolithic components is formed entirely of the thermoplastic copolyester elastomer form material as described herein.

Footwear 10 has a medial, or inner, side 16 and a lateral, or outer, side 18. For ease of discussion, footwear 10 can be divided into three portions: a forefoot portion 20, a midfoot portion 22, and a heel portion 24. Portions 20, 22, and 24 are not intended to demarcate precise areas of footwear 10. Rather, portions 20, 22, and 24 are intended to represent respective areas of footwear 10 that provide a frame of reference during the following discussion. Unless indicated otherwise, directional terms used herein, such as rearwardly, forwardly, top, bottom, inwardly, downwardly, upwardly, etc., refer to directions relative to footwear 10 itself. Footwear 10 is shown in FIG. 1 in a substantially horizontal orientation, as it would be positioned on a horizontal surface when worn by a wearer. However, it is to be appreciated that footwear 10 need not be limited to such an orientation. Thus, in FIG. 1, rearwardly is toward heel portion 24 (to the right as seen in FIG. 1), forwardly is toward forefoot portion 20 (to the left as seen in FIG. 1), and downwardly is toward the bottom of the page as seen in FIG. 1. Top refers to elements toward the top of the view in FIG. 1, while bottom refers to elements toward the bottom of the view in FIG. 1. Inwardly is toward the center of footwear 10, and outwardly is toward the outer peripheral edge of footwear 10.

In some aspects, the component is a sole component, such as a sole component 14 depicted in FIGS. 1-5, that includes a thermoplastic copolyester elastomer form described herein. In some aspects, the component is an insert such as insert 36 or insert 60 depicted in FIGS. 4-5 that includes a thermoplastic copolyester elastomer form described herein. The sole components and inserts for sole components can be made partially or entirely of a thermoplastic copolyester elastomer form described herein. Any portion of a sole component or an insert for a sole component can be made of a thermoplastic copolyester elastomer form described herein. For example, first portion 26 of the sole component (optionally including the ground engaging lower surface 44, such as the plurality of projections 46 and/or the groove 48 surrounding the projections), the entire insert 36, portions 62 or 64 of insert 60, a separate outsole component, or any combination thereof, can include a thermoplastic copolyester elastomer form as described herein. The sole components and inserts can be made by forming thermoplastic copolyester elastomers as described herein, for example by injection molding or by injection molding followed by compression molding as described herein. In some aspects, the thermoplastic copolyester elastomer forms can be formed by physical forming of the compositions. The thermoplastic copolyester elastomer forms and components can demonstrate improved physical properties including one or more of an enhanced energy return, and enhanced split tear, a decreased density, or a combination thereof.

Sole component 14, which is generally disposed between the foot of the wearer and the ground, provides attenuation of ground reaction forces (i.e., imparting cushioning), traction, and may control foot motions, such as pronation. As with conventional articles of footwear, sole component 14 can include an insole (not shown) located within upper 12. In some aspects, the sole component is an insole or sockliner or is a multi-component assembly including an insole or sockliner, can further include an insole or sockliner located within the upper, where the insole or sockliner is formed entirely or partially of a thermoplastic copolyester elastomer form described herein. Articles of footwear described herein can include an insole or sockliner formed entirely or partially of a thermoplastic copolyester elastomer form described herein.

Figure 2:
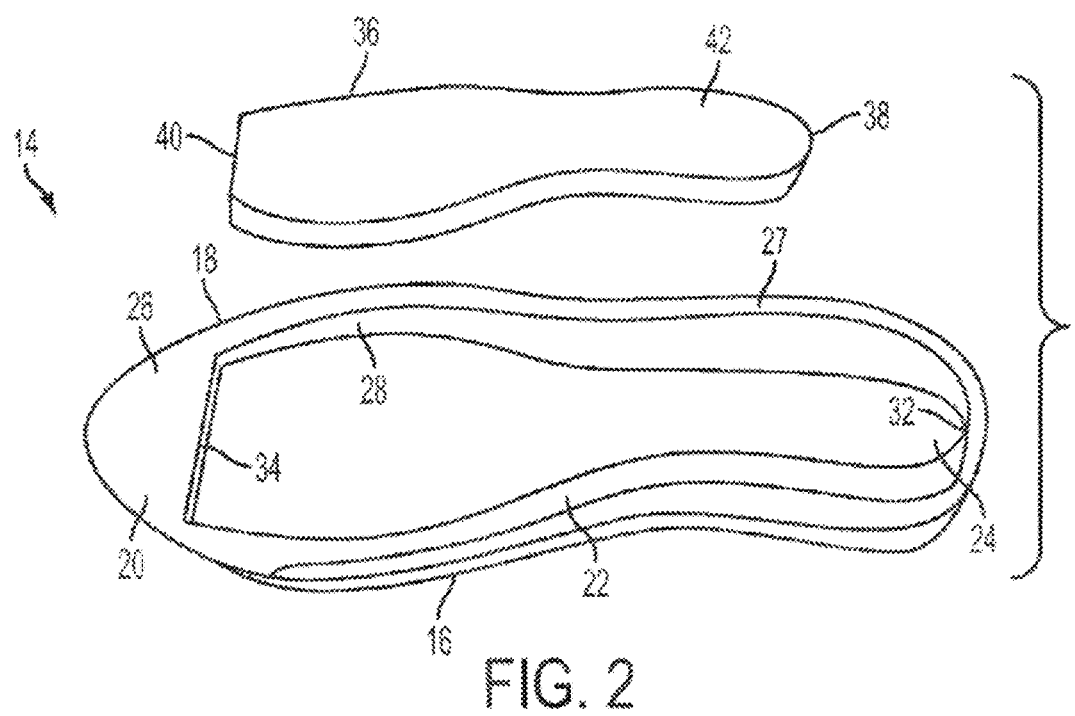
FIG. 2 is an exploded view of the sole component of the article of footwear of FIG. 1.

As can be seen in FIG. 2, sole component 14 consists of a first portion 26 having an upper surface 27 with a recess 28 formed therein. Upper surface 27 is secured to upper 12 with adhesive or other suitable fastening means. A plurality of substantially horizontal ribs 30 is formed on the exterior of first portion 26. In certain aspects, ribs 30 extend from a central portion of forefoot portion 20 on medial side 16 rearwardly along first portion 26, around heel portion 24 and forwardly on lateral side 18 of first portion 26 to a central portion of forefoot portion 20.

First portion 26 provides the external traction surface of sole component 14. In certain aspects it is to be appreciated that a separate outsole component could be secured to the lower surface of first portion 26. When a separate outsole component is secured to the lower surface of first portion 26, the first portion 26 is a midsole component. In some aspects, the article is a midsole component for an article of footwear. In other aspects, the article is a combination midsole-outsole component for an article of footwear.

In some aspects, the article is an insert. An insert 36 can be received in recess 28. As illustrated in FIG. 2, insert 36 can provide cushioning or resiliency in the sole component. First portion 26 can provide structure and support for insert 36. In such aspects, first portion 26 can be formed of a material of higher density and/or hardness as compared to insert 36 such as, for example, non-form materials including rubber and thermoplastic polyurethane, as well as form materials. In certain aspects, insert 36 can be formed of a thermoplastic copolyester elastomer form as disclosed herein.

Insert 36 has a curved rear surface 38 to mate with curved rear surface 32 of recess 28 and a transverse front surface 40 to mate with transverse front surface 34 of recess 28. An upper surface 42 of insert 36 is in contact with and secured to upper 12 with adhesive or other suitable fastening means. For example, when there is an insert 36, a recess 28 can extend from heel portion 24 to forefoot portion 20. In certain aspects, the rear surface 32 of recess 28 is curved to substantially follow the contour of the rear of heel portion 24 and the front surface 34 of recess 28 extends transversely across first portion 26.

Figure 3:
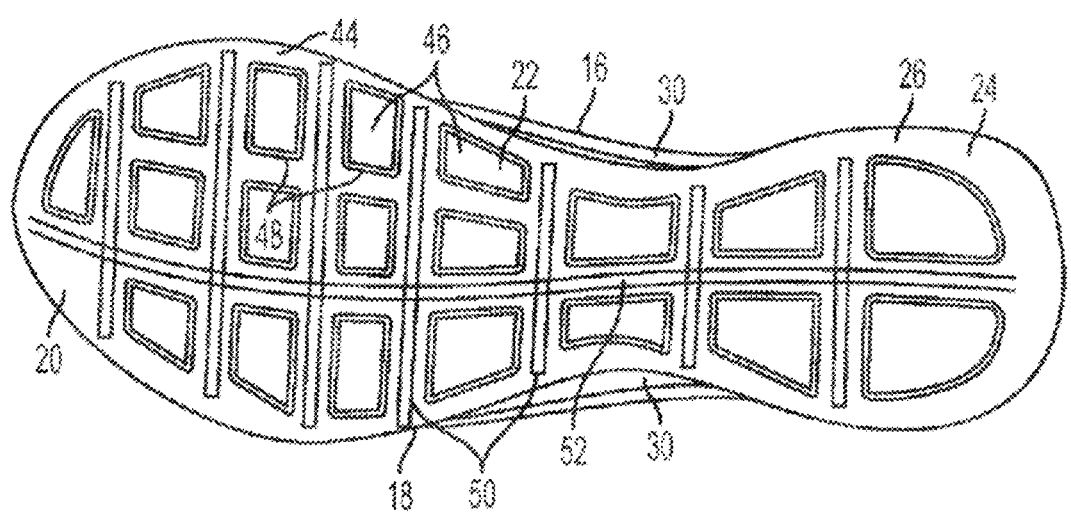
FIG. 3 is a plan view of the bottom of the sole component of the article of footwear of FIG.

As seen best in FIG. 3, a ground engaging lower surface 44 of first portion 26 includes a plurality of projections 46. Each projection 46 is surrounded by a groove 48. A plurality of transverse slots 50 are formed in lower surface 44, extending between adjacent projections 46. A longitudinal slot 52 extends along lower surface 44 from heel portion 26 to forefoot portion 20.

Figure 4:
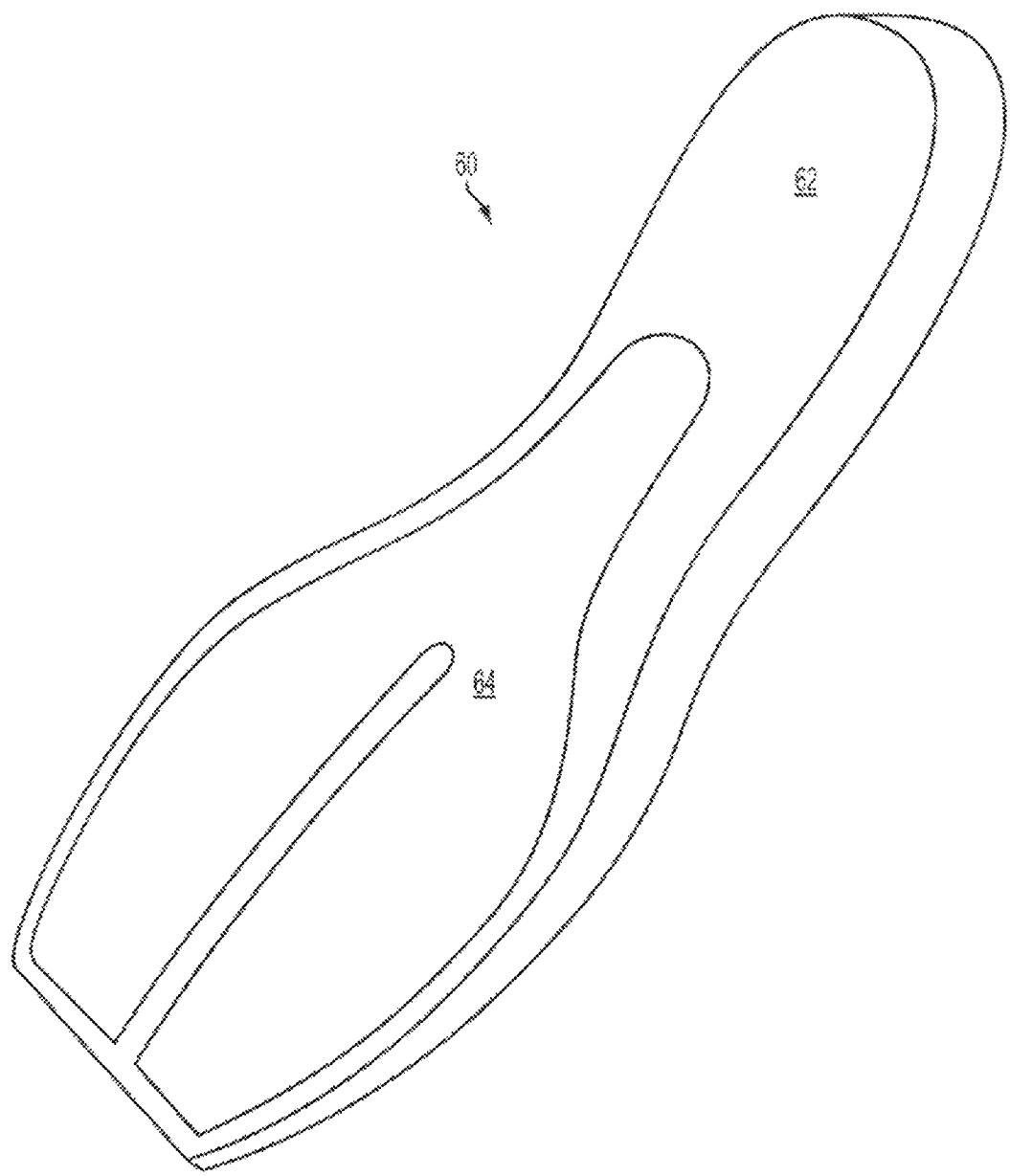
FIG. 4 is a bottom view of an insert for use in a sole component of an article of footwear.
Figure 5:
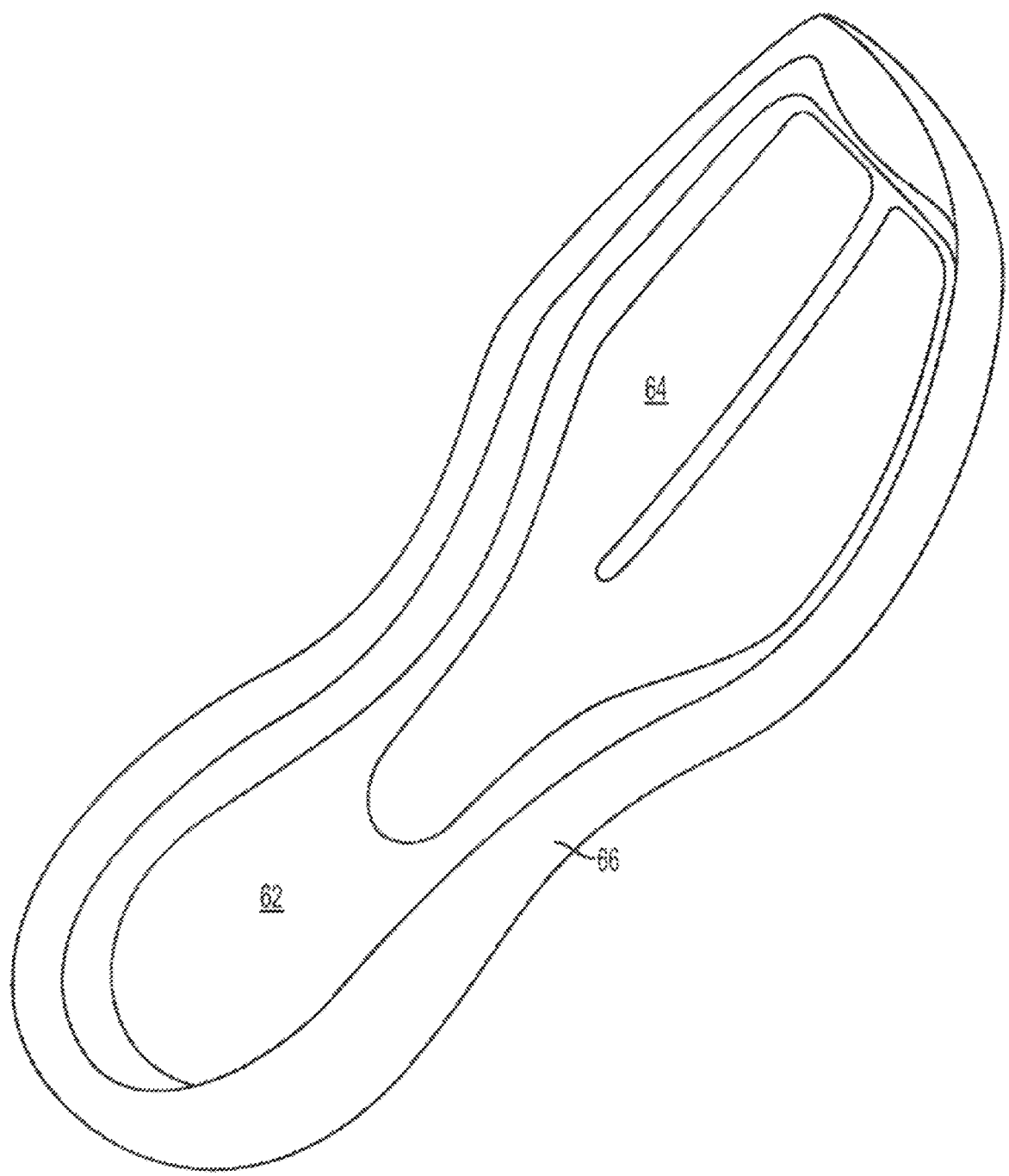
FIG. 5 is a top view of the insert of FIG. 4 inserted in a first portion to form a sole component.

FIGS. 4 and 5 show bottom and top views of an insert 60 which can be used in a sole component as described herein. Insert 60 is similar to insert 36, but as illustrated in FIGS. 4 and 5, insert 60 is formed of two types of materials 62 and 64, where at least one of the materials is a thermoplastic copolyester elastomer form as disclosed herein. FIG. 4 shows a bottom view of insert 60, while FIG. 5 shows a top view of insert 60 formed of two types of materials 62 and 64, with the insert placed inside a first portion 66 to form a sole component 14. Inserts with more than two types of materials, at least one of which is a thermoplastic copolyester elastomer form as disclosed herein, can also be used. In the example illustrated in FIGS. 4 and 5, a portion of a first material 62 can be used in the heel region of the insert, and a portion of a second material 64 can be used in the toe region of the insert. A higher density material can be used to support the heel region, while a lower density material can be used to support the toe region. For example, the density of the first material can be at least 0.02 grams per cubic centimeter greater than the density of the second material. The shape of the portions of the two materials 62 and 64 of the insert can be any suitable shape. For example, the heel region can be in the shape of a wedge. Inserts formed of two types of materials can be useful in running shoes, as well as in basketball shoes.

In some aspects, the article can be something other than a sole component. For example, the article can be an upper or an upper component. An upper component refers to a piece that is stitched or otherwise joined with one or more other pieces to form an upper. The materials in the upper generally contribute to characteristics such as breathability, conformability, weight, and suppleness or softness. A lower component refers to a piece that is joined with one or more other pieces to form the lower portion of an article of footwear. The lower can include, for example, the outsole and midsole. The choice of outsole materials and design will contribute, for instance, to the durability, traction, as well as to the pressure distribution during use. The midsole materials and design contribute to factors such as the cushioning and support. Grindery components include all of the additional components that can be attached to the upper, lower, or both. Grindery components can include, for example, eyelets, toe puffs, shanks, nails, laces, velcro, catches, backers, linings, padding, heel backings, heel foxings, toe caps, etc.

In some aspects, the upper is a lasted upper. A "lasted upper," as used herein, refers to an upper that is formed into the shoe shape prior to attachment to the sole by one or more mechanical means. The lasted upper can include a heel counter formed to shape the heel of the upper. The lasted upper can include a strobel or a strobel board attached to the upper, typically via a strobel stitch.

Methods of Manufacturing Disclosed Forms.

In some examples, the disclosed formed polymeric materials can be prepared by various methods as disclosed herein and as known in the art. That is, disclosed articles or components of articles such as midsoles, midsole components, inserts and insert components can be prepared by injection molding a melt composition described herein using a physical blowing agent and/or chemical blowing agent.

Disclosed herein are methods for making a form article, the method comprising: forming a mixture of molten polymeric material and a blowing agent, wherein the polymeric material comprises a disclosed thermoplastic copolyester elastomer; injecting the mixture into a mold cavity; forming the molten polymeric material, thereby forming a formed molten polymeric material; solidifying the formed molten polymeric material, thereby forming a form article having a microcellular form structure; and removing the form article from the mold cavity.

Also disclosed are methods for making a form article, the method comprising: forming a mixture of molten polymeric material and a blowing agent, wherein the polymeric material comprises a disclosed thermoplastic copolyester elastomer; injecting the mixture into a mold cavity; forming the molten polymeric material, thereby forming a formed molten polymeric material; solidifying the formed molten polymeric material, thereby forming a form article having a microcellular form structure; and removing the form article from the mold cavity; wherein the mixture has an injection temperature; and wherein the injection temperature is from about the melting temperature of the thermoplastic copolyester elastomer to about 50 degrees C. above the tail temperature of the thermoplastic copolyester elastomer.

Also disclosed are methods for making a form article, the method comprising: forming a mixture of molten polymeric material and a blowing agent, wherein the polymeric material comprises a disclosed thermoplastic copolyester elastomer; injecting the mixture into a mold cavity; forming the molten polymeric material, thereby forming a formed molten polymeric material; solidifying the formed molten polymeric material, thereby forming a form article having a microcellular form structure; and removing the form article from the mold cavity; wherein the forming occurs at a forming temperature; and wherein the forming temperature is from about the melting temperature of the thermoplastic copolyester elastomer to about 50 degrees C. above the tail temperature of the thermoplastic copolyester elastomer.

Figure 7:
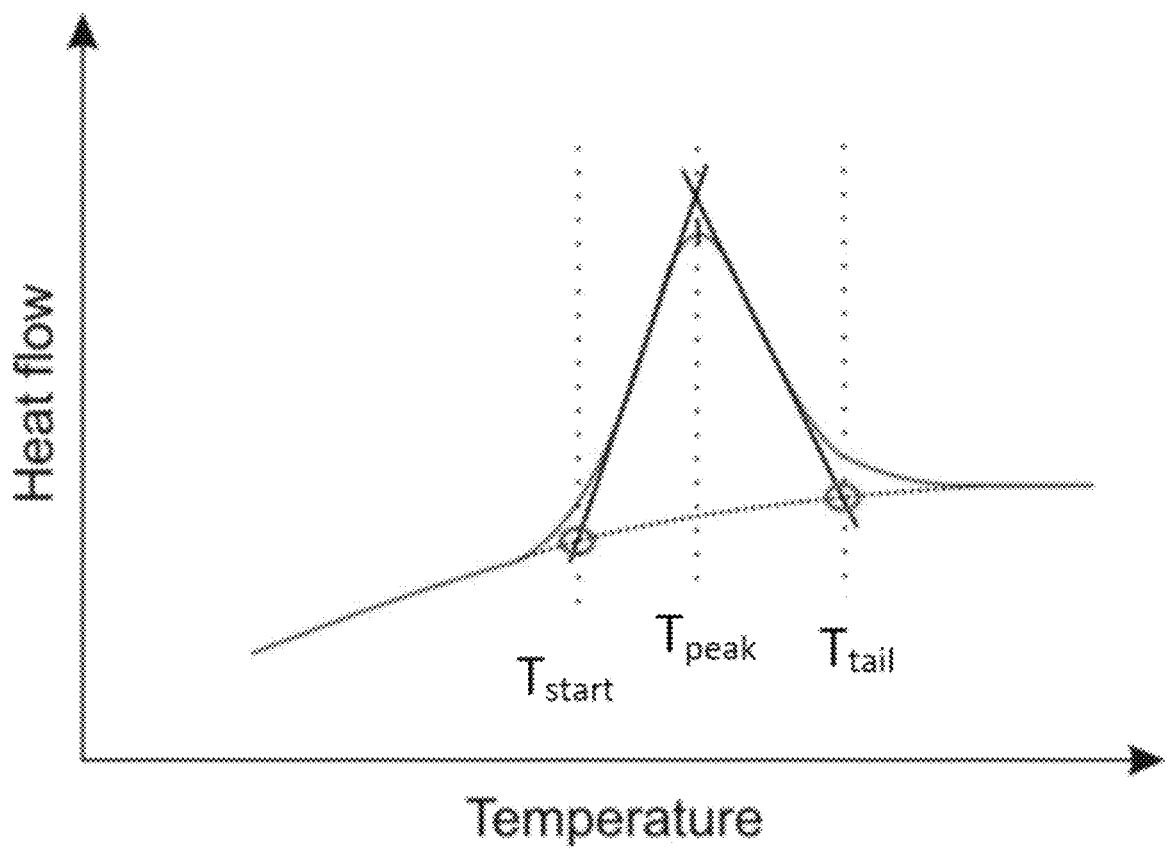
FIG. 7 shows a representative schematic illustrating a disclosed method for determining peak and tail temperatures.
Figure 8A:
FIGS. 8A-8D show representative images of cross-sectional views of form plaques prepared using a disclosed thermoplastic copolyester elastomer at different temperatures. Each image shows a scalar bar (500 micrometers). Formed plaques were prepared at the following temperatures: 175 degrees C.
Figure 8B:
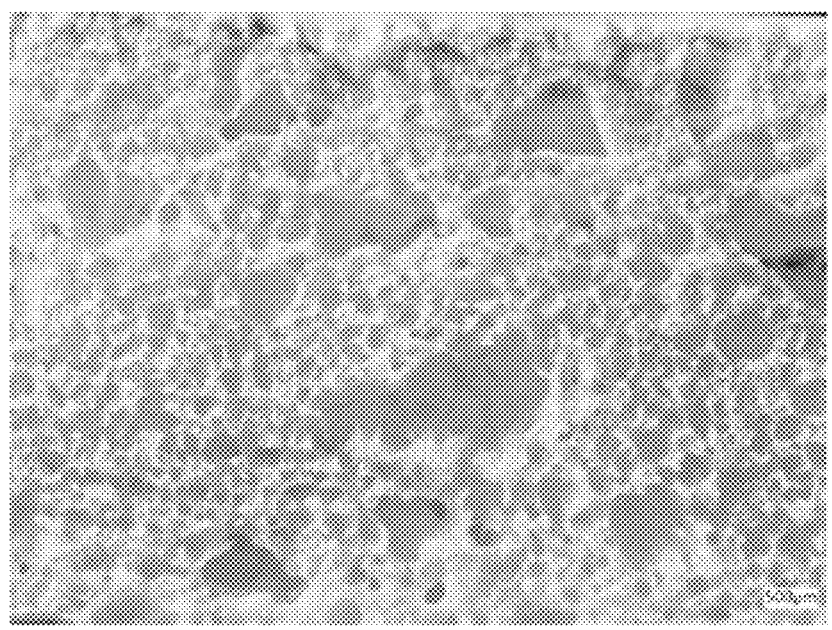
Figure 8C:
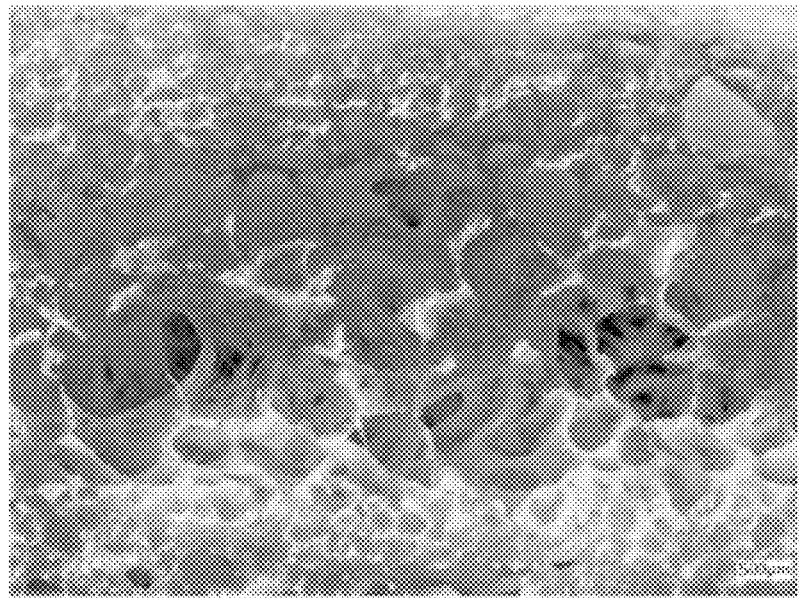
Figure 8D:
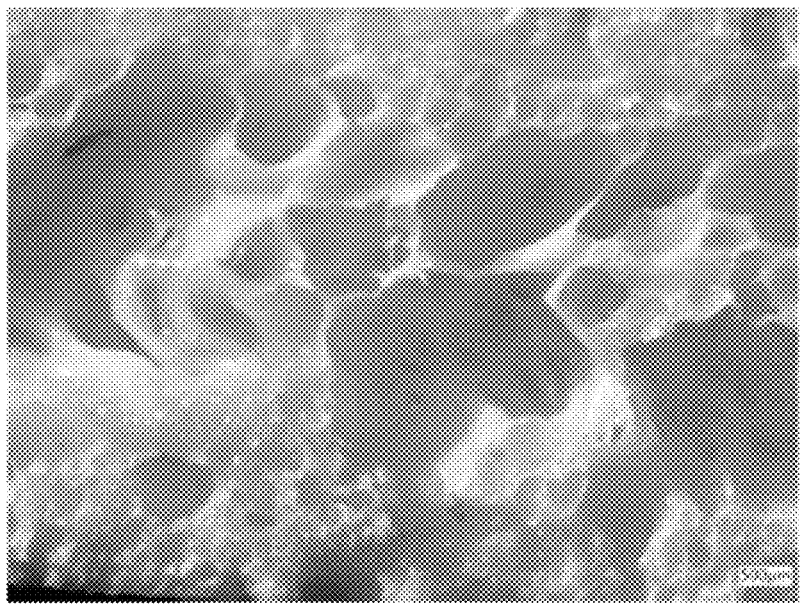

Dynamic scanning calorimetry (DSC) is used to determine the melting temperature and the tail temperature of a thermoplastic copolyester elastomer, and an exemplary method is described herein below in the Examples. Briefly, 10-30 mg pieces of undried resin pellets are cycled from −90 degrees C. to 225 degrees C. at 20 degrees C./min and cooled to −90° C. at 10° C./min. In some instances, experiments are run using a heat-cool-heat profile with a ramp rate of 10 degrees C. per min, minimum temperature of 0 degrees C. and maximum temperature of 250 degrees C. Analyses should be determined in duplicate. The $T_m$ and $T_g$ values are recorded from the second cycle. The melt "peak" is identified as the local maximum of the second heating cycle. If there is more than one peak in the DSC curve, the peak occurring at hotter temperatures is chosen as the temperature reference. The tail is identified as the intersection of the tangent of the line of the higher temperature side of the melt peak with the extrapolated baseline. A schematic illustrating the method for determining peak and tail temperatures is shown in FIG. 7.

For example, the disclosed formed polymeric materials can be prepared using a suitable extruder. An extruder (e.g., single or twin screw) can be used to provide a composition. The extruder can have a motor to turn a screw inside the extruder. Extruder may be a single screw or twin screws made of individual elements of various sizes and pitches appropriate for mixing or kneading the specific materials used. In some examples, the extruder has a twin screw.

The various components that make up the compositions used to form the thermoplastic copolyester elastomer form of the various examples described herein are added into the extruder through one or more port. The various components can be added as a melt or as appropriately-sized solid particles, for example chips or pellets, that are melted in section as they are mixed in the barrel of the extruder. The contents of the extruder can be heated to melt the composition. A supercritical fluid can be added into the melt as a physical blowing agent. In particular examples, the thermoplastic copolyester elastomer form is prepared by using a physical blowing agent which forms the composition after it exits the extruder, and the thermoplastic copolyester elastomer form is thus substantially free of a chemical blowing agent or decomposition product thereof.

In some examples, the compositions can be added as a melt at a temperature close to or at a temperature that causes ionic crosslinks between polymer chains to dissociate. At lower temperatures the ionic moieties can reform or reassociate. Due to the ionic crosslinking, the extent to which the compositions are crosslinked during processing can be controlled by controlling the temperature; by causing a temperature reduction at a desired point to increase crosslinking, which results in an increase in the modulus or viscosity of the molten resin as the ionic moieties reassociate.

If a chemical blowing agent is used, the processing (melting) temperature used can be sufficiently below the temperature that would trigger the blowing agent. In order to form the composition, the temperature near the exit of the extruder can be increased to a temperature close to or at the triggering temperature of a chemical blowing agent, thereby producing a chemically formed thermoplastic copolyester elastomer form as the composition exits the extruder (e.g., as the composition is injected into an injection mold).

Alternatively or in addition, a physical blowing agent can be used for form the composition to form a physically formed thermoplastic copolyester elastomer form, or a physically and chemically formed thermoplastic copolyester elastomer form. For example, a supercritical fluid such as supercritical carbon dioxide or supercritical nitrogen can be mixed with the molten polymeric composition in the barrel of the extruder. As the mixture of the molten composition comprising one or more thermoplastic copolyester elastomers and a supercritical fluid exits the extruder, the pressure drop between the higher pressure in the extruder and the lower pressure outside the extruder causes the supercritical fluid to transition to the gas phase and form the molten polymeric composition.

Various examples include methods of manufacturing an article of footwear or components for an article of footwear. In some examples, the methods of manufacturing an article of footwear include injection molding a composition to form a thermoplastic copolyester elastomer form described herein to produce a form article or component of an article, such as an article of footwear. The article or component of an article can be a midsole or a component of a midsole, and the method can include providing an upper and an outsole for an article of footwear; and combining the midsole or midsole component, the upper, and the outsole to make an article of footwear. In some examples, the method of manufacturing the article of footwear includes combining an article comprising a thermoplastic copolyester elastomer form, an upper, and an outsole to make an article of footwear.

The articles or components of articles such as midsoles, midsole components, inserts and insert components can be prepared by injection molding a melt composition described herein using a physical blowing agent. The injection molding can use a screw-type injector that allows for maintaining and controlling the pressure in the injector barrel. The injection molding machine can allow metering and delivering a supercritical fluid such as carbon dioxide or nitrogen into the composition prior to injection. The supercritical fluid can be mixed into the composition within the injection barrel and then injected into the mold. The supercritical fluid can then expand to create cell nuclei to form the physical form within the mold. The injection molding can include physical forming of the compositions described herein using a microcellular form injection molding process, such as, for example the MuCell process (Trexcel Inc., Royal Oak. Mich., USA).

In some examples, the thermoplastic copolyester elastomer forms of the various examples described herein are made using a process that involves impregnating a polymeric composition (e.g., at or above a softening temperature of the composition) with a physical blowing agent at a first concentration or first pressure. As used herein, the term "impregnating" generally means dissolving or suspending a physical blowing agent in a composition. The impregnated composition can then be formed, or can be cooled (when applicable) and re-softened (when applicable) for blowing at a later time.

In some instances, the impregnated composition is formed by reducing the solubility of the physical blowing agent in the polymer matrix through pressure or temperature changes. The reduction in solubility of the physical blowing agent can release additional amounts (e.g., to create a secondary expansion of an originally-formed microcell in the composition) of the impregnated physical blowing agent from the composition, to further blow the composition, forming a form composition (e.g., a form composition having a microcellular structure).

In addition to injection molding, the thermoplastic copolyester elastomer form of the present disclosure can be formed and molded using various processes known in the art. For example, the thermoplastic copolyester elastomer form can be formed into slab form, filament or strand forms, particulate (e.g., bead) forms of various shapes and sizes, etc. These various forms of form can then be used in different ways. For example, like injection molded form, slab form and filament or strand form can be used directly as a finished form article, or can be shaped (e.g., cut, buffed, or trimmed) to form a finished form article, or can be compression molded to form a finished form article. Optionally, the thermoplastic copolyester elastomer form can be subjected to annealing processes as part of forming the finished form article. Pellets of the compositions can be used to form individual particulate thermoplastic copolyester elastomer forms, or can be formed and molded to form unitary molded form articles composed of individual portions of form affixed to each other.

The thermoplastic copolyester elastomer forms of the various examples described herein may be further shaped or molded by any of the methods known for forming articles from thermoplastic materials. Optionally, the thermoplastic copolyester elastomer forms of the present disclosure which have been formed using any suitable blowing process (e.g., blowing using a physical and/or chemical blowing agent), including by injection molding using only a physical blowing agent, can then be compression molded to form a compression molded form.

In some examples, the thermoplastic copolyester elastomer form of the present disclosure can be prepared by a process comprising (i) softening a composition (e.g., by heating at a first temperature at or above a softening temperature of the composition); (ii) simultaneously or sequentially with the softening (when applicable), contacting the composition with a first concentration or first pressure of a physical blowing agent sufficient to drive an amount of the physical blowing agent into the composition or combine the physical blowing agent with the composition; (iii) changing the concentration or pressure (e.g., decreasing the pressure or concentration) of the physical blowing agent to a second concentration or second pressure that is effective to form the composition, thereby forming a thermoplastic copolyester elastomer form (e.g., a thermoplastic copolyester elastomer form having a microcellular structure); and, (iv) following the changing, cooling (when applicable) the thermoplastic copolyester elastomer form to (e.g., cooling to a temperature below the softening temperature of the composition), to form a solidified thermoplastic copolyester elastomer form.

In other examples, the thermoplastic copolyester elastomer form of the present disclosure is prepared by (i) contacting (e.g., dissolving or suspending) the composition with a first concentration of a chemical blowing agent, in some examples, at or above a softening temperature of the composition (ii) triggering the chemical blowing agent to form the composition, thereby forming a thermoplastic copolyester elastomer form (e.g., a thermoplastic copolyester elastomer form having a microcellular structure); and, (iii) following the triggering, in some examples, cooling the thermoplastic copolyester elastomer form to, e.g., a temperature below its softening temperature, to form a solidified thermoplastic copolyester elastomer form. In some examples, the "triggering" of the chemical blowing agent is performed by any suitable method, including heating the composition comprising a concentration of the chemical blowing agent to a temperature sufficient to "trigger" the chemical blowing agent, wherein the concentration of the chemical blowing agent is effective to form the composition, thereby forming a thermoplastic copolyester elastomer form (e.g., a thermoplastic copolyester elastomer form having a microcellular structure). In some examples, the contacting comprises contacting at a pressure of from about 10 MPa to about 100 MPa (e.g., from about 30 MPa to about 100 MPa, about 20 MPa to about 80 MPa, about 30 MPa to about 60 MPa or about 40 MPa to about 70 MPa).

Chemical forming agents may be endothermic or exothermic, which refers to a type of decomposition they undergo to produce the gas for forming. The decomposition may be a result of thermal energy in the system. Endothermic forming agents absorb energy and typically release a gas, such as carbon dioxide, upon decomposition. Exothermic forming agents release energy and generate a gas, such as nitrogen, when decomposed. Regardless of the chemical forming agent used, thermal variables of the polymer composition being molded and thermal variables of the forming agent to be decomposed are coupled together such that process parameters are selected so that the polymer can be molded and the forming agent can decompose at an appropriate phase of the molding operation.

In a further example, the disclosed formed polymeric materials and articles can be prepared by using systems such as those disclosed in U.S. Patent Appl. No. 62/734,912, which is incorporated herein by reference. Briefly, the system provides for decreased pressure losses across the system as well as to control (e.g., deliberately increase or decrease) the elongation, apparent shear, and/or zero shear viscosities of the molten polymeric material that is flowed into the mold. The method includes flowing a molten polymeric material into a shot tuning chamber from an upstream device and adjusting a temperature, a pressure, or both, within the shot tuning chamber to create a tuned molten polymeric material. The method additionally includes flowing the tuned molten polymeric material into a mold cavity from the shot tuning chamber. It will be appreciated that fine-tuning the temperature of and/or pressure applied to the molten polymeric material enables the system to have a desired impact on the physical and mechanical properties of the molded article. In particular, the temperature of the molten polymeric material may be controlled to achieve a desired range of shear/extensional viscosities, which reduces (e.g., substantially eliminates) uncontrolled bubble growth and/or nucleation. In one example, the method may also include adjusting (e.g., increasing and/or decreasing) a pressure in the mold cavity via a gas counter pressure (GCP) assembly prior to or while the molten polymeric material is flowed from the shot tuning chamber into the mold cavity. In such an example, the molten polymeric material may be flowed into the mold cavity at pressures well above ambient pressure. Furthermore, GCP may be introduced into the mold cavity to control nucleation and bubble growth during polymer forming as well as increase surface quality of the molded article. Nucleation and bubble growth control enhances cell density uniformity and mechanical properties of the molded polymeric material. In some examples, the improvement in cell density homogeneity may be particularly beneficial in articles having low densities such as articles that have a density less than or equal to 0.3 grams per cubic centimeter and/or in articles having large dimensions such as articles having a thickness that is 1.0 cm, for instance.

In various aspects, the system can include a shot tuning chamber configured to receive a molten polymeric material from an upstream device. The shot tuning chamber is also configured to adjust one or more of a temperature of and a pressure applied to the molten polymeric material to create an adjusted molten polymeric material and to dispense the adjusted molten polymeric material. In this way, the system can selectively adjust tuning chamber temperature and/or pressure to achieve desired properties, as previously mentioned. In one example, the system may further include an adjustable mold runner configured to regulate fluidic communication between the shot tuning chamber and a mold cavity in a mold. In another example, the system can further include a GCP assembly coupled to the mold cavity and configured to regulate an amount of counter pressure gas flow into and out of the mold cavity. Providing GCP adjustment allows for additional tuning of the polymeric material as it enters and cools in the mold.

Alternatively, the disclosed formed polymeric materials and articles can be prepared using methods and systems as described in International Patent Appl. No. PCT/US2018/035128. Briefly, the method can comprise a method for molding a single-phase solution comprised of a polymer composition and a gas. The polymer composition and the gas are maintained under pressure during the molding operation to prevent a cellular structure from being formed by the dissolved gas in the polymer composition coming out of solution. The mold cavity in which the single-phase solution is introduced for molding purposes is pressurized to a mold pressure that is sufficient to maintain the single-phase solution as a single-phase solution as the mold cavity is filled. Subsequent to filling the mold cavity with the single-phase solution under pressure, the resulting article may solidify entrapping the compressed gas, or the article may be exposed to a reduction in pressure causing the entrapped gas to form a microcellular structure.

The method can include forming the single-phase solution, such as through introduction of pressurized gas with a polymer composition that is melted, e.g., from about the $T_m$ up to about 50 degrees C. above the $T_{tail}$ of the thermoplastic copolyester elastomer as described elsewhere, in an injection molding apparatus's barrel (e.g., screw) that is effective to mix and dissolve the gas with the polymer composition while under pressure. The method continues with pressurizing a mold cavity of a mold above atmospheric pressure to a mold pressure. Atmospheric pressure is a pressure of the environment in which the mold cavity is exposed (e.g., general environment pressure). The mold pressure is at least a pressure to maintain the single-phase solution as a single single-phase. The method further includes injecting the single-phase solution into the pressurized mold cavity. The method also includes maintaining at least the mold pressure in the mold cavity during the injecting of the single-phase solution. As a result, the pressure in the mold cavity prevents the gas from coming out of solution to form a two-phase mixture (e.g., forming) upon exit from the injection molding apparatus. As the pressure is maintained, premature forming as the polymer composition is injected from the injection molding apparatus is avoided to allow a decoupling of process parameters associated with the forming agent and the polymer composition.

In another example, a molding system can be utilized to prepare the disclosed formed polymeric materials that includes a device configured to receive a polymeric material and heat the polymeric material to form a molten polymeric material. The molding system additionally includes a shot tuning chamber configured to receive the molten polymeric material from the device and adjust a temperature of or a pressure applied to the molten polymeric material. The molding system also includes an adjustable mold runner configured to regulate the flow of the molten polymeric material between the shot tuning chamber and a mold cavity. In one example, the device may be an injection device or an extrusion device. The molding system allows the characteristics of the polymeric material to be adapted to achieve desired end-use goals.

In some aspects, the present disclosure is directed to a compression molded thermoplastic copolyester elastomer form, and to a method of forming compression molded thermoplastic copolyester elastomer form for, among other applications, articles of footwear or athletic equipment. In some examples, the method can be a process comprising providing (e.g., preparing) a thermoplastic copolyester elastomer form preform and then compression molding the thermoplastic copolyester elastomer form preform to form a compression molded thermoplastic copolyester elastomer form. For example, the thermoplastic copolyester elastomer form can be compression molded by placing the thermoplastic copolyester elastomer form preform in a compression mold having a height less than the initial height of the thermoplastic copolyester elastomer form preform and closing the mold, thereby compressing the thermoplastic copolyester elastomer form preform to the height of the mold. Simultaneously or sequentially with the compressing, the thermoplastic copolyester elastomer form preform can be heated in the closed compression mold. During the compression molding, the temperature of at least a portion of the thermoplastic copolyester elastomer form preform in the closed mold can be raised to a temperature within ±30 degrees C. of the softening temperature of the composition. The temperature can be raised by heating the closed mold. Following the raising of the temperature, while the thermoplastic copolyester elastomer form preform remains closed in the compression mold, the temperature of at least a portion of the thermoplastic copolyester elastomer form preform can be lowered. The temperature can be lowered by cooling the closed mold. The lowering can lower the temperature of at least a portion of the thermoplastic copolyester elastomer form preform to a temperature at least 35 degrees C. below the softening temperature of the composition, thereby forming the compression molded thermoplastic copolyester elastomer form. Following the cooling, the compression mold can be opened, and the compression molded thermoplastic copolyester elastomer form can be removed from the compression mold.

Examples contemplated herein are directed to methods of manufacturing articles of footwear or athletic equipment. For example, the method can comprise providing components such as midsoles and inserts of an article of footwear in accordance with the present disclosure, and combining the component with a footwear upper and an outsole to form the article of footwear.

One method of making compression molded thermoplastic copolyester elastomer form articles such as midsoles and inserts or components of articles such as components of midsoles or components of inserts described herein comprises forming a thermoplastic copolyester elastomer form preform and compression molding the thermoplastic copolyester elastomer form preform to make a compression molded thermoplastic copolyester elastomer form. In some examples, the form preforms of the various examples described herein are obtained by blowing the composition by about 150 percent to about 240 percent (e.g., from about 150 percent to about 220 percent; about 150 percent to about 200 percent, about 175 percent to about 225 percent, about 180 percent to about 230 percent or about 160 percent to about 240 percent) in at least one dimension (e.g., the vertical dimension) using a blowing agent. In some examples, the blown composition can be compression molded to about 120 percent to about 200 percent (e.g., from about 120 percent to about 180 percent; about 130 percent to about 190 percent; about 150 percent to about 200 percent; or about 160 percent to about 190 percent) in at least one dimension.

Thus for example, if the forming of the composition is about 200 percent, the blown composition can be compression molded by a net 20 percent by compression molding to about 180 percent. In another example, if the composition is blown into a 20 millimeter (height)×10 centimeter (width)×5 centimeter (depth) slab (wherein hereinafter, "mm" will be used to indicate millimeter and "cm" will be used to indicate centimeter), and the slab is compression molded in the height direction by 20 percent, the compression molded slab would have the dimensions 18 mm (height)×10 cm (width)×5 cm (depth). In some examples, the compression molding is substantially maintained.

In some examples, the thermoplastic copolyester elastomer form is made using a process that involves impregnating a composition (e.g., at or above a softening temperature of the composition) with a physical blowing agent at a first concentration or first pressure. The impregnated composition can then be formed, or can be cooled (when applicable) and re-softened (when applicable) for blowing at a later time. In some instances, the impregnated composition is formed by reducing the temperature or pressure, impacting the solubility of the physical blowing agent. The reduction in solubuility of the physical blowing agent can release additional amounts of the impregnated physical blowing agent from the composition to further blow the composition forming a thermoplastic copolyester elastomer form (e.g., a thermoplastic copolyester elastomer form having a microcellular structure).

In some examples, the compression molding process is conducted by heating the thermoplastic copolyester elastomer form preform in a closed compression mold. The thermoplastic copolyester elastomer form preform is heated to a temperature close to its softening temperature, to allow the form to retain the shape of the compression mold. For example, the form preform can be heated to a temperature within ±30 degrees C. of its softening temperature, or within ±20 degrees C. of its softening temperature, or within ±10 degrees C. of its softening temperature, or within ±5 degrees C. of its softening temperature. For example, the thermoplastic copolyester elastomer form preform can be heated to a temperature of from about 100 degrees C. to about 250 degrees C., or of from about 140 degrees C. to about 220 degrees C., or of from about 100 degrees C. to about 150 degrees C., or of from about 130 degrees C. to about 150 degrees C.

The material used to form the compression mold can be any material which can withstand the temperatures used during the process, such as machined metals, including aluminum. The compression mold can be made using two pieces, such as a top and a bottom mold. Depending on the shape of the form component to be molded, a multiple-piece mold may be used in order to more easily release the compression molded form from the mold.

The injection molded thermoplastic copolyester elastomer form can have a closed skin. A closed skin can also be formed by compression molding a thermoplastic copolyester elastomer form preform in a compression mold. However, care should be taken during the compression molding not to subject the thermoplastic copolyester elastomer form preform to conditions such that more than a desired amount of the closed cell structures of the form collapse. One way to avoid collapsing more than a desired amount of the closed cell structures is to control the temperature of the thermoplastic copolyester elastomer form during the compression molding process, for example, by controlling the temperature of the mold. For example, during the compression molding step, the heating of the thermoplastic copolyester elastomer form preform in the compression mold can be conducted for time of from 100 seconds to 1,000 seconds, or of from 150 seconds to 700 seconds.

Once the thermoplastic copolyester elastomer form has been heated in the compression mold at the appropriate temperature for the desired length of time to soften the thermoplastic copolyester elastomer form to the desired level, the softened preform is cooled, for example, to a temperature at least 35 degrees C. below its softening temperature, or at least 50 degrees C. below its softening temperature, or at least 80 degrees C. below its softening temperature, to re-solidify the softened form, thereby forming the compression molded form. Once cooled, the compression molded thermoplastic copolyester elastomer form is removed from the compression mold. Following the heating, the cooling of the form preform in the compression mold can be conducted for a time of from 50 to 1,000 seconds, or for a time of from 100 to 400 seconds.

In the thermoplastic copolyester elastomer form of the present disclosure, the composition comprising one or more thermoplastic copolyester elastomers has a form structure with a density of about 0.7 grams per cubic centimeter, 0.5 grams per cubic centimeter, 0.4 grams per cubic centimeter, 0.3 grams per cubic centimeter, or less. The thermoplastic copolyester elastomer form has a density of about 0.1 grams per cubic centimeter to about 0.22 grams per cubic centimeter, about 0.2 grams per cubic centimeter to about 0.35 grams per cubic centimeter, or about 0.1 grams per cubic centimeter to about 0.35 grams per cubic centimeter. The thermoplastic copolyester elastomer form can be formed using any one of the methods described above. The forms and components of the present disclosure can have a density of from 0.02 grams per cubic centimeter to 0.22 grams per cubic centimeter, or of from 0.03 grams per cubic centimeter to 0.12 grams per cubic centimeter, or of from 0.04 grams per cubic centimeter to 0.10 grams per cubic centimeter, or from 0.11 grams per cubic centimeter to 0.12 grams per cubic centimeter, or from 0.10 grams per cubic centimeter to 0.12 grams per cubic centimeter, from 0.15 grams per cubic centimeter to 0.2 grams per cubic centimeter; 0.15 grams per cubic centimeter to 0.30 grams per cubic centimeter. Alternatively or in addition, the form preform can have a density of from 0.01 grams per cubic centimeter to 0.10 grams per cubic centimeter, or of from 0.02 grams per cubic centimeter to 0.08 grams per cubic centimeter, or of from 0.03 grams per cubic centimeter to 0.06 grams per cubic centimeter; 0.08 grams per cubic centimeter to 0.15 grams per cubic centimeter; or from 0.10 grams per cubic centimeter to 0.12 grams per cubic centimeter. For example, the density of the compression molded form component can be from or from 0.15 grams per cubic centimeter to 0.2 grams per cubic centimeter, and the density of the form preform can be from 0.10 grams per cubic centimeter to 0.12 grams per cubic centimeter. The thermoplastic copolyester elastomer form can be included in components of articles of footwear as described above, for example a midsole 146 as depicted in FIGS. 1A-1B.

Form Characteristics.

While the thermoplastic copolyester elastomer forms described herein can be used for making any of a variety of components, including a variety of components for an article of footwear, in particular aspects the components include a midsole, an outsole, an insole, or an insert. Additional articles can include a tongue padding, a collar padding, and a combination thereof. As described above and detailed more completely below, the articles comprising the thermoplastic copolyester elastomer forms described herein can exhibit a unique balance of beneficial physical properties such as high energy return, high split tear, low density, and low compression. Furthermore, the thermoplastic copolyester elastomer form can also be reprocessed with minimal loss in physical properties (e.g., for recycling), providing a solution for materials sustainability. The thermoplastic copolyester elastomer form can be injection molded, or can be injection molded and subsequently compression molded.

In various aspects, the disclosed formed polymeric materials formed can have a multicellular form structure. In some instances, the multicellular form structure can be a closed cell form structure. In other instances, the multicellular form structure can be an open cell form structure. In some instances, the multicellular form structure has an average cell size of from about 50 micron to about 5 mm; from about 100 micron to about 1 mm; or from about 50 micron to about 1 mm.

In the articles comprising the thermoplastic copolyester elastomer form described herein, the thermoplastic copolyester elastomer form portion of the article can exhibit a beneficial split tear, for example a high split tear for a sole component in an article of footwear. In some aspects, the thermoplastic copolyester elastomer form can have a split tear value of about 1.0 kilogram/centimeter (kg/cm) to 4.5 kg/cm, about 1.6 kg/cm to 4.0 kg/cm, about 2.0 kg/cm to 4.0 kg/cm, about 2.0 kg/cm to 3.5 kg/cm, or about 2.5 kg/cm to 3.5 kg/cm. The split tear can be measured pursuant to ASTM D3574-95. In some aspects, the thermoplastic copolyester elastomer form is injection molded (i.e., is not exposed to a separate compression molding step after being formed by injection molding and removed from the injection mold), or is injection molded and subsequently compression molded in a separate compression mold having different dimensions than the mold used in the injection molding step. The thermoplastic copolyester elastomer form can have a split tear of about 0.08 kg/cm to 4.0 kg/cm, about 0.9 kg/cm to 3.0 kg/cm, about 1.0 to 2.0 kg/cm, about 1.0 kg/cm to 1.5 kg/cm, or about 2 kg/cm. In some aspects, the thermoplastic copolyester elastomer form the thermoplastic copolyester elastomer form is injection molded, and has have a split tear of about 0.07 kg/cm to 2.0 kg/cm, or about 0.8 kg/cm to 1.5 kg/cm, or about 0.9 to 1.2 kg/cm, about 1.5 kg/cm to 2.2 kg/cm.

In some aspects, the thermoplastic copolyester elastomer form portion of the article or component of an article can have a stiffness of about 30 N/mm to 275 N/mm, about 40 N/mm to 275 N/mm, about 40 N/mm to 100 N/mm, about 100 N/mm to 200 N/mm, about 50 N/mm to 150 N/mm, about 50 N/m to 100 N/mm, or about 50 N/mm to 85 N/mm, as determined using a cyclic tensile testing system as described herein below. In some aspects, the thermoplastic copolyester elastomer form article or article component is formed by injection molding, or by injection molding and subsequently compression molding. The thermoplastic copolyester elastomer form can have a stiffness of about 30 N/mm to 275 N/mm, about 40 N/mm to 275 N/mm, about 40 N/mm to 100 N/mm, about 100 N/mm to 200 N/mm, about 50 N/mm to 150 N/mm, about 50 N/m to 100 N/mm, or about 50 N/mm to 85 N/mm, as determined using a cyclic tensile testing system as described herein below.

The energy efficiency, a measure of the percentage of energy the thermoplastic copolyester elastomer form portion of the article or component returns when it is released after being compressed under load, can provide improved performance for athletic shoes, e.g. for reducing energy loss or dissipation when running. This is especially true for running and other athletic shoes. In some aspects, the thermoplastic copolyester elastomer form portion of the articles and components provided herein have an energy return of about 50 percent to 95 percent, about 60 percent to 95 percent, about 60 percent to 90 percent, about 60 percent to 85 percent, about 65 percent to 85 percent, or about 70 percent to 85 percent. In some aspects, the thermoplastic copolyester elastomer form is injection molded or is injection molded and subsequently compression molded. The thermoplastic copolyester elastomer form of the present disclosure can have an energy return of about 50 percent to 95 percent, about 60 percent to 95 percent, about 60 percent to 95 percent (e.g., about 60 percent to 85 percent; about 65 percent to 80 percent; about 65 percent to 75 percent; about 70 percent to 80 percent; or about 75 percent to 80 percent; about 75 percent to 85 percent, about 75 percent to 90 percent, about 80 percent to 95 percent; or about 85 percent to 95 percent). The energy return can be measured as described in the examples below.

As discussed above, the thermoplastic copolyester elastomer form portion of the articles and components provided herein exhibits a low density, which beneficially reduces the weight of midsoles or other components containing the thermoplastic copolyester elastomer form. In some aspects, the thermoplastic copolyester elastomer form, including thermoplastic copolyester elastomer form present in midsoles and midsole components, can have a density, of from about 0.02 grams per cubic centimeter to about 0.22 grams per cubic centimeter; from about 0.03 grams per cubic centimeter to about 0.12 grams per cubic centimeter; from about 0.04 grams per cubic centimeter to about 0.10 grams per cubic centimeter; from about 0.11 grams per cubic centimeter to about 0.12 grams per cubic centimeter; from about 0.10 grams per cubic centimeter to about 0.12 grams per cubic centimeter; from about 0.15 grams per cubic centimeter to about 0.2 grams per cubic centimeter; from about 0.15 grams per cubic centimeter to about 0.30 grams per cubic centimeter; from about 0.05 grams per cubic centimeter to about 0.25 grams per cubic centimeter; from about 0.05 grams per cubic centimeter to about 0.2 grams per cubic centimeter; from about 0.05 grams per cubic centimeter to about 0.15 grams per cubic centimeter; from about 0.08 to about 0.15 grams per cubic centimeter; from about 0.08 to about 0.20 grams per cubic centimeter; from about 0.08 grams per cubic centimeter to about 0.25 grams per cubic centimeter; or about 0.1 grams per cubic centimeter to about 0.15 grams per cubic centimeter. In some aspects the thermoplastic copolyester elastomer form has a density of about 0.15 grams per cubic centimeter to about 0.3 grams per cubic centimeter; from about 0.2 grams per cubic centimeter to about 0.35 grams per cubic centimeter; or from about 0.15 grams per cubic centimeter to about 0.25 grams per cubic centimeter.

The specific gravity of the thermoplastic copolyester elastomer form can be determined by testing at least 3 representative samples taken from a form sample (e.g., a 2 inch×2 inch sample or a 1 inch×1 inch sample), or at least 3 entire form articles or components. Using a balance with appropriate accuracy for the weight of the sample, the weight of each sample is determined both in air and when the sample is completely submerged in distilled water at a temperature of 22 degrees C.±2 degrees C., after removing any air bubbles adhered to the surface of the form sample weighing. The specific gravity (S.G.) is then calculated by taking the weight of the sample in water and subtracting that from the weight of the sample in air, and this value is then divided into the weight of the sample in air, where all the weights are weights in grams.

As discussed above, the thermoplastic copolyester elastomer form of the present disclosure exhibits a low density, which beneficially reduces the weight of midsoles or other components containing the thermoplastic copolyester elastomer form. Alternatively or in addition, the form preform can have a density of from 0.01 grams per cubic centimeter to 0.10 grams per cubic centimeter, or of from 0.02 grams per cubic centimeter to 0.08 grams per cubic centimeter, or of from 0.03 grams per cubic centimeter to 0.06 grams per cubic centimeter; 0.08 grams per cubic centimeter to 0.15 grams per cubic centimeter; or from 0.10 grams per cubic centimeter to 0.12 grams per cubic centimeter. For example, the density of the compression molded form component can be from 0.15 grams per cubic centimeter to 0.2 grams per cubic centimeter, and the density of the form preform can be from 0.10 grams per cubic centimeter to 0.12 grams per cubic centimeter.

In some aspects, the thermoplastic copolyester elastomer form, including thermoplastic copolyester elastomer form present in midsoles and midsole components, can have a specific gravity of from about 0.05 to about 0.25; from about 0.05 to about 0.2; from about 0.05 to about 0.15; from about 0.08 to about 0.15; from about 0.08 to about 0.20; from about 0.08 to about 0.25; from about 0.1 to about 0.15; from about 0.02 to about 0.22; from about 0.03 to about 0.12; from about 0.04 to about 0.10, or from 0.11 to about 0.12, or from 0.10 to about 0.12; from about 0.15 to about 0.2; from 0.15 to about 0.30. Alternatively or in addition, the thermoplastic copolyester elastomer form can have a specific gravity of from about 0.01 to about 0.10; from about 0.02 to about 0.08; from about 0.03 to about 0.06; from about 0.08 to about 0.15; or from 0.10 to about 0.12. For example, the specific gravity of the thermoplastic copolyester elastomer form can be from 0.15 to about 0.2, or can be from 0.10 to about 0.12. In some aspects the thermoplastic copolyester elastomer form has a specific gravity of about 0.15 to about 0.3; from about 0.2 to about 0.35, or from about 0.15 to about 0.25

Several methods of measuring resiliency and/or energy return of forms exist in the art. One method of measuring resiliency of forms is based on ASTM D 2632-92, which is a test for solid rubber materials. For use with forms, the test sample is prepared as described in ASTM D2632-92, but uses a sample of form in place of the sample of solid rubber. This test uses a plunger which is dropped from a height onto a test sample while being guided by a vertical rod. The drop height is divided into 100 equal parts, and the height to which the plunger rebounds is measured using this 100 part scale, to determine the resiliency of the sample. Alternative methods which use a ball of standard weight dropped onto a sample, and which measure the rebound height of the ball to determine the resiliency of the sample can also be used. In some aspects, the resiliency and/or energy return are determined using force/displacement behavior measured using an Instron Electropuls as described in the Examples. For example, an Instron Electropuls E10000 with a stainless steel 45 mm circular cross section impact geometry can be used to evaluate compression at one or more different compression cycles. The compression cycle can include a running compression cycle consisting of samples being compressed under displacement control from 0 newton (N) to 300 N and back to 0 N in 180 millisecond (ms), followed by a pause of 400 ms for a total of ~1.7 hertz (Hz). A walking compression cycle can consist of samples compressed from 0 N to 144 N and back to 0 N in 600 ms followed by a pause of 400 ms for a total of ~1 Hz. The corresponding force-displacement data provided information about the form modulus (stiffness), hysteresis (energy efficiency), set, fatigue behavior, etc. over many cycles. Energy input can be taken as the integral of the force-displacement curve during compression force loading. Hysteresis is taken as the ratio: (energy output)/(energy input), which can also be viewed as the energy efficiency of the form. Fatigue behavior is judged by changes in the form displacement at the max load of a cycle. All measured properties: stiffness, hysteresis, and fatigue are measured for thousands of cycles for both running and walking compression cycles.

In particular examples, the resiliency and/or energy return of the subsequently compression molded thermoplastic copolyester elastomer form can be from about 2000 mJ to about 3500 millijoule (mJ), or from about 2100 mJ to about 3400 mJ, or from about 2200 mJ to about 3300 mJ, or from about 2300 mJ to about 3200 mJ, or from about 2400 mJ to about 3100 mJ, or from about 2500 mJ to about 3100 mJ, or from about 2600 mJ to about 3100 mJ, or from about 2700 mJ to about 3100 mJ, or from about 2750 mJ to about 3100 mJ, or from about 2800 mJ to about 3100 mJ, or from about 2850 mJ to about 3100 mJ, or from about 2900 mJ to about 3100 mJ, or or from about 2400 mJ to about 3050 mJ, or from about 2500 mJ to about 3050 mJ, or from about 2600 mJ to about 3050 mJ, or from about 2700 mJ to about 3050 mJ, or from about 2750 mJ to about 3050 mJ, or from about 2800 mJ to about 3050 mJ, or from about 2850 mJ to about 3050 mJ, or from about 2900 mJ to about 3050 mJ, or from about 2400 mJ to about 3000 mJ, or from about 2500 mJ to about 3000 mJ, or from about 2600 mJ to about 3000 mJ, or from about 2700 mJ to about 3000 mJ, or from about 2750 mJ to about 3000 mJ, or from about 2800 mJ to about 3000 mJ, or from about 2850 mJ to about 3000 mJ, or from about 2900 mJ to about 3000 mJ.

In particular examples, the resiliency and/or energy return of the subsequently compression molded thermoplastic copolyester elastomer form can be at least at least 6 percentage points, or at least 7 percentage points, or at least 8 percentage points, or at least 9 percentage points, or at least 10 percentage points, or at least 12 percentage points greater than the resiliency and/or energy return of the injection molded thermoplastic copolyester elastomer form which has not subsequently been compression molded, when the compression molded thermoplastic copolyester elastomer form has a resiliency and/or energy return greater than 45 percent, or greater than 50 percent, or greater than 55 percent, or greater than 60 percent, or greater than 65 percent, and the compression molded thermoplastic copolyester elastomer form can have a specific gravity of from 0.02 grams per cubic centimeter to 0.15 grams per cubic centimeter, or of from 0.03 grams per cubic centimeter to 0.12 grams per cubic centimeter, or of from 0.04 grams per cubic centimeter to 0.10 grams per cubic centimeter or from 0.11 grams per cubic centimeter to 0.12 grams per cubic centimeter, from 0.15 grams per cubic centimeter to 0.2 grams per cubic centimeter; or 0.15 grams per cubic centimeter to 0.30 grams per cubic centimeter.

Compression set of a form is another important physical property for a form used as a component of an article of footwear or athletic equipment. In accordance with the present disclosure, the thermoplastic copolyester elastomer form can have a compression set of from 40 percent to 100 percent. For example, the compression set can be from 45 percent to 90 percent, or from 40 percent to 80 percent, or from 50 percent to 75 percent.

Compression set can be measured by preparing a sample of a standard thickness (e.g., 10 mm) of a form. Components having a thickness less than the standard can be stacked to make a sample having the standard thickness. The sample is loaded into a metal compression plate and compressed to a height of 50 percent of the original thickness (e.g., 5 mm). The sample is placed in a 50 degrees C. oven on its side for 6 hours. At the end of the 6 hours, the sample is removed from the oven and from the metal compression plate, and allowed to cool for 30 minutes. Once cooled, the thickness of the sample is measured. The percent compression set (C.S.) is calculated by (a) subtracting the final sample thickness from the original sample thickness, and (b) subtracting the 50 percent compressed thickness from the original sample thickness, (c) dividing (a) by (b), and (d) multiplying the result by 100 to obtain the percent compression set (where all thicknesses are measured in millimeters).

Split tear for forms can be measured using ASTM D3574-95. Although this method is directed to bonded and molded urethane forms, it can be used on thermoplastic copolyester elastomer form in accordance with the present disclosure. A sample of thermoplastic copolyester elastomer form having a thickness of 10 mm±1 mm. If the thermoplastic copolyester elastomer form has an outer skin, the outer skin should not be present on the test sample. A 3 cm long cut is placed in the center of one end of the specimen, and marked in five successive 2 cm portions along the edge of the sample. The sample is tested as described in ASTM D3574-95. The tear strength of the thermoplastic copolyester elastomer form can range from 4 kg/cm to 10 kg/cm.

The tensile strength of the form is another important physical characteristic. The thermoplastic copolyester elastomer form can have a tensile strength of from 5 kilogram per centimeter squared to 25 kilogram per centimeter squared, or of from 10 kilogram per centimeter squared to 23 kilogram per centimeter squared, or of from 15 kilogram per centimeter squared to 22 kilogram per centimeter squared. The tensile strength can be measured on a die cut sample of the form in the shape of a dumbbell of a standard size such as a 2.5 cm in width by 11.5 cm in length, with a minimum thickness of 3 to 4 mm. The dumbbell follows the shape described in ASTM D412, die C. The sample is loaded symmetrically into and tested using a long travel extensometer such as the Instron 2603-080 which allows for a minimum of 1000 percent strain with a gauge length of 25 mm and a resolution of at least 0.1 mm. The tensile value at the failure point of the sample (the point during testing when the load value initially drops) is recorded.

Another physical property to consider when determining whether or not a form is suitable for an intended use, for example for an intended use in an article of footwear or athletic equipment, is its 300 percent elongation. The thermoplastic copolyester elastomer form can have an elongation of at least 125 kilogram per centimeter squared, or at least 150 kilogram per centimeter squared.

Thermoplastic Copolyester Elastomers.

The compositions provided herein can include one or more thermoplastic copolyester elastomers. The thermoplastic copolyester elastomers can include chain units derived from one or more olefins and chain units derived from one or more ethylenically-unsaturated acid groups. The compositions can also include a plurality of cations ionically crosslink anionic form of the acid groups in the thermoplastic copolyester elastomers. In some aspects, the compositions are essentially just the thermoplastic copolyester elastomers and metal cations. The thermoplastic copolyester elastomers can have a melt flow index of about 30 or less, about 20 or less, about 15 or less, about 10 or less, or about 5 or less.

A variety of thermoplastic copolyester elastomers can be processed as described herein to have a form structure. In some aspects, the thermoplastic copolyester elastomers are terpolymers of ethylene, acrylic acid, and methyl acrylate or butyl acrylate. In some aspects, a ratio III of a total parts by weight of the acrylic acid in the thermoplastic copolyester elastomers to a total weight of the thermoplastic copolyester elastomers is about 0.05 to about 0.6, about 0.1 to about 0.6, about 0.1 to about 0.5, about 0.15 to about 0.5, or about 0.2 to about 0.5.

The compositions provided herein can include a thermoplastic copolyester elastomer comprising: (a) a plurality of first segments, each first segment derived from a dihydroxy-terminated polydiol; (b) a plurality of second segments, each second segment derived from a diol; and (c) a plurality of third segments, each third segment derived from an aromatic dicarboxylic acid. In various aspects, the thermoplastic copolyester elastomer is a block copolymer. In some aspects, the thermoplastic copolyester elastomer is a segmented copolymer. In further aspects, the thermoplastic copolyester elastomer is a random copolymer. In still further aspects, the thermoplastic copolyester elastomer is a condensation copolymer.

In a further aspect, the thermoplastic copolyester elastomer can have a weight average molecular weight of about 50,000 Daltons to about 1,000,000 Daltons; about 50,000 Daltons to about 500,000 Daltons; about 75,000 Daltons to about 300,000 Daltons; about 100,000 Daltons to about 200,000 Daltons; or a value or values of weight average molecular weight within any of the foregoing ranges or a weight average molecular weight range encompassing any sub-range of the foregoing ranges.

In a further aspect, the thermoplastic copolyester elastomer can have a ratio of first segments to third segments from about 1:1 to about 1:5 based on the weight of each of the first segments and the third segments; about 1:1 to about 1:3 based on the weight of each of the first segments and the third segments; about 1:1 to about 1:2 based on the weight of each of the first segments and the third segments; about 1:1 to about 1:3 based on the weight of each of the first segments and the third segments; or a value or values of have a ratio of first segments to third segments within any of the foregoing ranges or a have a range of ratio of first segments to third segments encompassing any sub-range of the foregoing ranges.

In a further aspect, the thermoplastic copolyester elastomer can a ratio of second segments to third segments from about 1:1 to about 1:2 based on the weight of each of the first segments and the third segments; about 1:1 to about 1:1.52 based on the weight of each of the first segments and the third segment; or a value or values of have a ratio of second segments to third segments within any of the foregoing ranges or a have a range of ratio of second segments to third segments encompassing any sub-range of the foregoing ranges.

In a further aspect, the thermoplastic copolyester elastomer can have first segments derived from a poly(alkylene oxide)diol having a number-average molecular weight of about 250 Daltons to about 6000 Daltons; about 400 Daltons to about 6,000 Daltons; about 350 Daltons to about 5,000 Daltons; about 500 Daltons to about 3,000 Daltons; or a value or values of weight average molecular weight within any of the foregoing ranges or a weight average molecular weight range encompassing any sub-range of the foregoing ranges.

In a further aspect, the thermoplastic copolyester elastomer can have first segments derived from a poly(alkylene oxide)diol such as poly(ethylene ether)diol; poly(propylene ether)diol; poly(tetramethylene ether)diol; poly(pentamethylene ether)diol; poly(hexamethylene ether)diol; poly(heptamethylene ether)diol; poly(octamethylene ether)diol; poly(nonamethylene ether)diol; poly(decamethylene ether)diol; or mixtures thereof. In a still further aspect, the thermoplastic copolyester elastomer can have first segments derived from a poly(alkylene oxide)diol such as poly(ethylene ether) diol; poly(propylene ether)diol; poly(tetramethylene ether) diol; poly(pentamethylene ether)diol; poly(hexamethylene ether)diol. In a yet further aspect, the thermoplastic copolyester elastomer can have first segments derived from a poly(tetramethylene ether)diol.

In a further aspect, the thermoplastic copolyester elastomer can have second segments derived from a diol having a molecular weight of less than about 250. The diol from which the second segments are derived can be a a C2-C8 diol. In a still further aspect, the second segments can be derived from ethanediol; propanediol; butanediol; pentanediol; 2-methyl propanediol; 2,2-dimethyl propanediol; hexanediol; 1,2-dihydroxy cyclohexane; 1,3-dihydroxy cyclohexane; 1,4-dihydroxy cyclohexane; and mixtures thereof. In a yet further aspect, the second segments can be derived from 1,2-ethanediol, 1,3-propanediol, 1,4-butanediol, 1,6-hexanediol, and mixtures thereof. In an even further aspect, the second segments can be derived from 1,2-ethanediol. In a still further aspect, the second segments can be derived from 1,4-butanediol.

In a further aspect, the thermoplastic copolyester elastomer can have third segments derived from an aromatic C5-C16 dicarboxylic acid. The aromatic C5-C16 dicarboxylic acid can have a molecular weight less than about 300 Daltons; about 120 Daltons to about 200 Daltons; or a value or values of molecular weight within any of the foregoing ranges or a molecular weight range encompassing any sub-range of the foregoing ranges. In some instances, the aromatic C5-C16 dicarboxylic acid is terephthalic acid, phthalic acid, isophthalic acid, or a derivative thereof. In a still further aspect, the aromatic C5-C16 dicarboxylic acid is a diester derivative of the terephthalic acid, phthalic acid, or isophthalic acid. In a yet further aspect, the aromatic C5-C16 dicarboxylic acid is terephthalic acid or the dimethyl ester derivative thereof.

In a further aspect, the a thermoplastic copolyester elastomer comprises: (a) a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a formula 1:

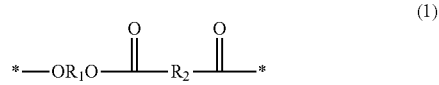

wherein $R_1$ is a group remaining after removal of terminal hydroxyl groups from the poly(alkylene oxide) diol of the first segment, wherein the poly(alkylene oxide) diol of the first segment is a poly(alkylene oxide) diol having a number-average molecular weight of about 400 to about 6000; and wherein $R_2$ is a group remaining after removal of carboxyl groups from the aromatic dicarboxylic acid of the third segment; and (b) a plurality of second copolyester units, each second copolyester unit of the plurality comprising the second segment derived from a diol and the third segment derived from an aromatic dicarboxylic acid, wherein The second copolyester unit has a structure represented by a formula 2:

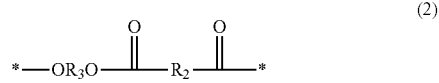

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment.

In a further aspect, the thermoplastic copolyester elastomer comprises a plurality of first copolyester units having a structure represented by a formula 3:

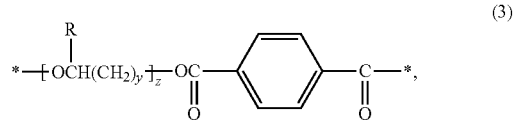

wherein R is H or methyl; wherein y is an integer having a value from 1 to 10; wherein z is an integer having a value from 2 to 60; and wherein a weight average molecular weight of each of the plurality of first copolyester units is from about 300 Daltons to about 7,000 Daltons. In some aspects, in the foregoing formula, y can be is an integer having a value of 1, 2, 3, 4, 5, 6, 7, 8, 9, 10; or y can be any set or range of the foregoing integer values. In some aspects, the foregoing formula, z is an integer having a value from 5 to 60; an integer having a value from 5 to 50; an integer having a value from 5 to 40; an integer having a value from 4 to 30; an integer having a value from 4 to 20; an integer having a value from 2 to 10; or z can be any set or range of the foregoing integer values. In some aspects, R is hydrogen. In a still further aspect, R is methyl. In some instances, R is hydrogen and y is an integer having a value of 1, 2, or 3. Alternatively, in other instances, R is methyl and y is an integer having a value of 1.

In a further aspect, the thermoplastic copolyester elastomer comprises a plurality of first copolyester units having a structure represented by a formula 4:

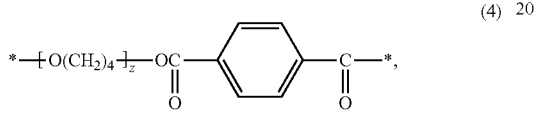

(4)

wherein z is an integer having a value from 2 to 60; and wherein a weight average molecular weight of each of the plurality of first copolyester units is from about 300 Daltons to about 7,000 Daltons. In some aspects, in the foregoing formula, y can be is an integer having a value of 1, 2, 3, 4, 5, 6, 7, 8, 9, 10; or y can be any set or range of the foregoing integer values. In some aspects, the foregoing formula, z is an integer having a value from 5 to 60; an integer having a value from 5 to 50; an integer having a value from 5 to 40; an integer having a value from 4 to 30; an integer having a value from 4 to 20; an integer having a value from 2 to 10; or z can be any integer value or set of integer values within the foregoing ranges or values, or any range of integer values encompassing a sub-range the foregoing integer value ranges.

In a further aspect, the thermoplastic copolyester elastomer comprises a plurality of first copolyester units having a weight average molecular weight from about 400 Daltons to about 6,000 Daltons; about 400 Daltons to about 5,000 Daltons; about 400 Daltons to about 4,000 Daltons; about 400 Daltons to about 3,000 Daltons; about 500 Daltons to about 6,000 Daltons; about 500 Daltons to about 5,000 Daltons; about 500 Daltons to about 4,000 Daltons; about 500 Daltons to about 3,000 Daltons; about 600 Daltons to about 6,000 Daltons; about 600 Daltons to about 5,000 Daltons; about 600 Daltons to about 4,000 Daltons; about 600 Daltons to about 3,000 Daltons; or a value or values of weight average molecular weight within any of the foregoing ranges or a weight average molecular weight range encompassing any sub-range of the foregoing ranges.

In a further aspect, the thermoplastic copolyester elastomer comprises a plurality of second copolyester units, each second copolyester unit of the plurality having represented by a formula 5:

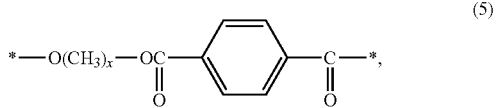

(5)

wherein x is an integer having a value from 1 to 20; wherein the form article has a microcellular microcellular form structure. In some aspects, in the foregoing formula, x is an integer having a value from 2 to 18; 2 to 17; 2 to 16; 2 to 15; 2 to 14; 2 to 13; 2 to 12; 2 to 11; 2 to 10; 2 to 9; 2 to 8; 2 to 7; 2 to 6; 2 to 5; 2 to 4; or x can be any integer value or set of integer values within the foregoing ranges or values, or any range of integer values encompassing a sub-range the foregoing integer value ranges. In a further aspect, x is an integer having a value of 2, 3, or 4.

In a further aspect, the thermoplastic copolyester elastomer comprises a plurality of second copolyester units, each second copolyester unit of the plurality having represented by a formula 6:

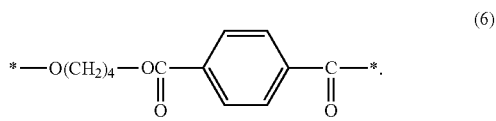

(6)

In a further aspect, the thermoplastic copolyester elastomer comprises a weight percent range of the plurality of first copolyester units based on total weight of the thermoplastic copolyester elastomer such that the weight percent range is about 30 weight percent to about 80 weight percent; about 40 weight percent to about 80 weight percent; about 50 weight percent to about 80 weight percent; about 30 weight percent to about 70 weight percent; about 40 weight percent to about 70 weight percent; about 50 weight percent to about 70 weight percent; about 40 weight percent to about 65 weight percent; about 45 weight percent to about 65 weight percent; about 50 weight percent to about 65 wt; about 55 weight percent to about 65 weight percent; about 40 weight percent to about 60 weight percent; about 45 weight percent to about 60 weight percent; about 50 weight percent to about 60 weight percent; about 55 weight percent to about 60 weight percent; or any weight percent value or set of weight percent values within any of the foregoing ranges of weight percent, or any range of weight percent values encompassing a sub-set of any of the foregoing ranges.

In a further aspect, the thermoplastic copolyester elastomer can have a maximum load, when determined using a cyclic tensile test as described herein, of about 10 N to about 100 N; about 15 N to about 50 N; about 20 N to about 40 N; or any load value or set of load values within any of the foregoing ranges of load value, or any range of load values encompassing a sub-set of any of the foregoing ranges.

In a further aspect, the thermoplastic copolyester elastomer can have an energy efficiency, when determined using a cyclic tensile test as described herein, of greater than or equal to about 50 percent; of greater than or equal to about 60 percent; greater than or equal to about 70 percent; of about 50 percent to about 90 percent; of about 60 percent to about 90 percent; of about 70 percent to about 90 percent; or any energy efficiency value or set of energy efficiency values within any of the foregoing ranges of energy efficiency, or any range of energy efficiency values encompassing a subset of any of the foregoing ranges.

In a further aspect, the thermoplastic copolyester elastomer can have an energy return, when determined using a cyclic tensile test as described herein, of about 1 J to 15 J; about 2 J to 12 J; about 4 J to 10 J; or any energy return value or set of energy return values within any of the foregoing ranges of energy return, or any range of energy return values encompassing a sub-set of any of the foregoing ranges.

In a further aspect, the thermoplastic copolyester elastomer can have tensile modulus, when determined using a cyclic tensile test as described herein, of about 1 MPa to 15 MPa; about 300 kPa to 3 MPa; about 500 kPa to about 2 MPa; and about 100 MPa to about 10 MPa; or any tensile modulus value or set of tensile modulus values within any of the foregoing ranges of tensile modulus, or any range of tensile modulus values encompassing a sub-set of any of the foregoing ranges.

In a further aspect, the thermoplastic copolyester elastomer can have a zero-shear viscosity value that can be determined as described herein below. Briefly, viscosity measurements can be collected on a suitable rheometer, e.g., a TA instruments DHR-3 Rheometer using flat parallel plates. Typically, samples of 25 mm circular cross are and circle roughly 2 mm thick are die cut from a solid injection molded plaque. The samples were dried before placing in the rheometer. All samples are equilibrated at 180° C. for 2-5 minutes and trimmed to obtain a final gap of <1 mm. A flow sweep experiment with shear rates from 0.01 to 100 s$^{-1}$ is conducted. The data are fit with Carreau, Carreau-Yasuda, and Williamson models and the best-fit is selected to record the zero-shear viscosity value. Polymer melt flow curve was determined at a temperature 20° C. greater than the melting point as determined by DSC as described herein above. In various aspects, the the thermoplastic copolyester elastomer can have a zero-shear viscosity value of about 10 to about 10,000 Pa·s; about 100 to about 7,000 Pa·s; and about 1,000 to about 5,000 Pa·s.

In some aspects, the thermoplastic copolyester elastomer can comprise phase separated domains. For example, the plurality of first segments derived from a dihydroxy-terminated polydiol can phase-separate into domains comprising primarily the first segments. Moreover, the plurality of second segments derived from a diol can phase-separate into domains comprising primarily the second segments. In other aspects, the thermoplastic copolyester elastomer can comprise phase-separated domains comprising primarily of a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a formula 1:

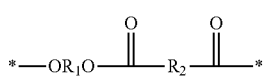

wherein $R_1$ is a group remaining after removal of terminal hydroxyl groups from the poly(alkylene oxide) diol of the first segment, wherein the poly(alkylene oxide) diol of the first segment is a poly(alkylene oxide) diol having a number-average molecular weight of about 400 to about 6000; and wherein $R_2$ is a group remaining after removal of carboxyl groups from the aromatic dicarboxylic acid of the third segment; and other phase-separated domains comprising primarily of a plurality of second copolyester units, each second copolyester unit of the plurality comprising the second segment derived from a diol and the third segment derived from an aromatic dicarboxylic acid, wherein The second copolyester unit has a structure represented by a formula 2:

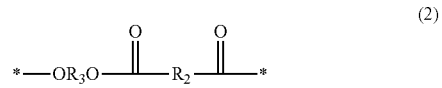

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment. In still other aspects, the thermoplastic copolyester elastomer can comprise phase-separated domains comprising primarily of a plurality of first copolyester units, each first copolyester unit of the plurality having a structure represented by a formula 4:

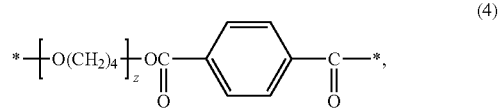

wherein z is an integer having a value from 2 to 60; and wherein a weight average molecular weight of each of the plurality of first copolyester units is from about 300 Daltons to about 7,000 Daltons; and other phase-separated domains comprising primarily of a plurality of second copolyester units, each second copolyester unit of the plurality having represented by a formula 5:

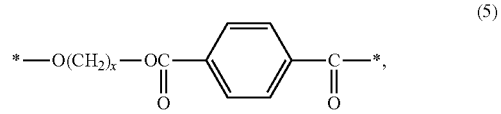

wherein x is an integer having a value from 1 to 20.

Exemplary, but non-limiting, thermoplastic polyester elastomers, including thermoplastic copolyester elastomers, that can be used in the disclosed methods, forms, and articles include Hytrel® 3078, Hytrel® 4068, and Hytrel® 4556 (DuPont, Wilmington, Del., USA); Pelprene™ P30B, P40B, and P40H (Toyobo U.S.A. Inc., New York, N.Y., USA); TRIEL® 5300, TRIEL® 5400, and blends thereof (Samyang Corporation, Korea); Keyflex BT1028D, BT1033D, BT1035D, BT1040D, BT1045D, and BT1047D (LG Chem, Korea); and KOPEL® KP3340, KP3346, KP3347, KP3942 (Kolon Plastics, Inc., Korea).

In some aspects, the disclosed formed polymeric materials can further include one or more ionomers, such as any of the Surlyn® polymers (DuPont, Wilmington, Del., USA). Ionic forms described herein can be made by a process/method including receiving a composition described herein, and physically forming the composition to form a thermoplastic copolyester elastomer form having a density of about 0.7 gram per cubic centimeter or less, or 0.5 gram per cubic centimeter or less, or 0.4 gram per cubic centimeter or less, or 0.3 gram per cubic centimeter or less. The process can include blowing the composition to produce an article or component comprising the thermoplastic copolyester elastomer form. In some examples, the process for forming the thermoplastic copolyester elastomer form comprises injection molding a mixture including a composition as described herein and a supercritical fluid (e.g., supercritical carbon dioxide or supercritical nitrogen) in a mold, and removing the thermoplastic copolyester elastomer form from the mold.

In some aspects, the disclosed formed polymeric materials can further include one or more thermoplastic polyurethanes, such as Fortimo™ (Mitsui Chemicals, Inc., Tokyo, Japan); Texin® (Covestro LLC, Pittsburgh, Pa., USA); and BounCell-X™ (Lubrizol Advanced Materials, Inc., Brecksville, Ohio, USA).

In some aspects, the disclosed formed polymeric materials can further include one or more olefinic polymers. Olefinic polymers can include ethylene-based copolymers, propylene-based copolymers, and butene-based copolymers. In some aspects, the olefinic polymer is an ethylene-based copolymer such as a styrene-ethylene/butylene-styrene (SEBS) copolymer; an ethylene-propylene diene monomer (EPDM) copolymer; an ethylene-vinyl acetate (EVA) copolymer; an ethylene alkyl acrylate (EAA) copolymer; an ethylene alkyl methacrylate (EAMA) copolymer; any copolymer thereof, and any blend thereof. In some aspects, a ratio V of a total parts by weight of the olefinic polymers present in the composition to a total parts by weight of the thermoplastic copolyester elastomers in the composition is about 0.0 to about 0.6, about 0.0 to about 0.4, about 0.01 to about 0.4, or about 0.01 to about 0.6, or about 0.1 to about 0.4.

In some aspects, the disclosed formed polymeric materials can further include an ethylene-vinyl acetate (EVA) copolymer. The ethylene-vinyl acetate (EVA) copolymer can have a range of vinyl acetate contents, for example about 50 percent to about 90 percent, about 50 percent to about 80 percent, about 5 percent to about 50 percent, about 10 percent to about 45 percent, about 10 percent to about 30 percent, about 30 percent to about 45 percent, or about 20 percent to about 35 percent.

Additives.

In various aspects, the disclosed formed polymeric materials can independently further comprise an additive. The additive can be incorporated directly into the disclosed form particles or binding materials, or alternatively, applied thereto. Additives that can be used in the disclosed form particles or binding materials include, but are not limited to, dyes, pigments, colorants, ultraviolet light absorbers, hindered amine light stabilizers, antioxidants, processing aids or agents, plasticizers, lubricants, emulsifiers, pigments, dyes, optical brighteners, rheology additives, catalysts, flow-control agents, slip agents, crosslinking agents, crosslinking boosters, halogen scavengers, smoke inhibitors, flameproofing agents, antistatic agents, fillers, or mixtures of two or more of the foregoing. In some aspects, the additive can be a wax, an anti-oxidant, a UV-absorbing agent, a coloring agent, or combinations thereof.

When used, an additive can be present in an amount of from about 0.01 weight percent to about 10 weight percent, about 0.025 weight percent to about 5 weight percent, or about 0.1 weight percent to 3 weight percent, where the weight percent is based upon the sum of the material components in the thermoplastic composition, fiber, filament, yarn, or fabric.

Individual components can be mixed together with the other components of the thermoplastic composition in a continuous mixer or a batch mixer, e.g., in an intermeshing rotor mixer, such as an Intermix mixer, a twin screw extruder, in a tangential rotor mixer such as a Banbury mixer, using a two-roll mill, or some combinations of these to make a composition comprising a thermoplastic polymer and an additive. The mixer can blend the components together via a single step or multiple steps, and can mix the components via dispersive mixing or distributive mixing to form the resulting thermoplastic composition. This step is often referred to as "compounding."

In some aspects, the additive is an antioxidant such as ascorbic acid, an alkylated monophenol, an alkylthiomethylphenol, a hydroquinone or alkylated hydroquinone, a tocopherol, a hydroxylated thiodiphenyl ether, an alkylidenebisphenol, a benzyl compound, a hydroxylated malonate, an aromatic hydroxybenzl compound, a triazine compound, a benzylphosphonate, an acylaminophenol, an ester of β-(3,5-di-tert-butyl-4-hydroxyphenyl)propionic acid with mono- or polyhydric alcohols, an ester of β-(5-tert-butyl-4-hydroxy-3-methylphenyl)propionic acid with mono- or polyhydric alcohols, an ester of β-(3,5-dicyclohexyl-4-hydroxyphenyl)propionic acid with mono- or polyhydric alcohols, an ester of 3,5-di-tert-butyl-4-hydroxyphenyl acetic acid with mono- or polyhydric alcohols, an amide of β-(3,5-di-tert-butyl-4-hydromhenyl)propionic acid, an aminic antioxidant, or mixtures of two or more of the foregoing.

Exemplary alkylated monophenols include, but are not limited to, 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-ethylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol, and mixtures of two or more of the foregoing.

Exemplary alkylthiomethylphenols include, but are not limited to, 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol, and mixtures of two or more of the foregoing.

Exemplary hydroquinones and alkylated hydroquinones include, but are not limited to, 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate, and mixtures of two or more of the foregoing.

Exemplary tocopherols include, but are not limited to, α-tocopherol, p-tocopherol, 7-tocopherol, 6-tocopherol, and mixtures of two or more of the foregoing.

Exemplary hydroxylated thiodiphenyl ethers include, but are not limited to, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide, and mixtures of two or more of the foregoing.

Exemplary alkylidenebisphenols include, but are not limited to, 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexyl phenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5- tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl)butyrate], bis(3-tert-butyl-4-hydroxy-5-methyl-phenyl)dicyclopentadiene, bis[2-(3tert-butyl-2-hydroxy-5-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane, and mixtures of two or more of the foregoing.

Exemplary benzyl compounds include, but are not limited to, 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, 1,3,5-tri-(3,5-di-tert-butyl-4-hydroxybenzyl)-2,4,6-trimethylbenzene, di-(3,5-di-tert-butyl-4-hydroxybenzyl)sulfide, 3,5-di-tert-butyl-4-hydroxybenzyl-mercapto-acetic acid isooctyl ester, bis-(4-tert-butyl-3-hydroxy-2,6-dimethylbenzyl)dithiol terephthalate, 1,3,5-tris-(3,5-di-tert-butyl-4-hydroxybenzyl)isocyanurate, 1,3,5-tris-(4-tert-butyl-3-hydroxy-2,6-dimethylbenzyl)isocyanurate, 3,5-di-tert-butyl-4-hydroxybenzyl-phosphoric acid dioctadecyl ester and 3,5-di-tert-butyl-4-hydroxybenzyl-phosphoric acid monoethyl ester, and mixtures of two or more of the foregoing.

Exemplary hydroxybenzylated malonates include, but are not limited to, dioctadecyl-2,2-bis-(3,5-di-tert-butyl-2-hydroxybenzyl)-malonate, di-octadecyl-2-(3-tert-butyl-4-hydroxy-5-ethylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate, and mixtures of two or more of the foregoing.

Exemplary aromatic hydroxybenzl compounds include, but are not limited to, 1,3,5-tris-(3,5-di-tert-butyl-4-hydroxybenzyl)-2,4,6-tri methyl benzene, 1,4-bis(3,5-di-tert-butyl-4-hydroxybenzyl)-2,3,5,6-tetramethyl benzene, 2,4,6-tris(3,5-di-tert-butyl-4-hydroxybenzyl)phenol, and mixtures of two or more of the foregoing.

Exemplary triazine compounds include, but are not limited to, 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxy-benzyl)isocyanurate, 1,3,5-tris(4-tert-butyl-3-hydroxy-2,6-di methylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxy-phenylpropionyl)-hexahydro-1,3,5-triazine, 1,3,5-tris(3,5-dicyclohexyl-4-hydroxybenzyl)isocyanurate, and mixtures of two or more of the foregoing.

Exemplary benzylphosphonates include, but are not limited to, dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid, and mixtures of two or more of the foregoing.

Exemplary acylaminophenols include, but are not limited to, 4-hydroxy-lauric acid anilide, 4-hydroxy-stearic acid anilide, 2,4-bis-octylmercapto-6-(3,5-tert-butyl-4-hydroxyanilino)-s-triazine and octyl-N-(3,5-di-tert-butyl-4-hydroxyphenyl)-carbamate, and mixtures of two or more of the foregoing.

Exemplary esters of β-(3,5-di-tert-butyl-4-hydroxyphenyl)propionic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary esters of β-(5-tert-butyl-4-hydroxy-3-methylphenyl)propionic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary esters of β-(3,5-dicyclohexyl-4-hydroxyphenyl)propionic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary esters of 3,5-di-tert-butyl-4-hydroxyphenyl acetic acid, include, but are not limited to esters with a mono- or polyhydric alcohol such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and mixtures of esters derived from two or more of the foregoing mono- or polyhydric alcohols.

Exemplary amides of β-(3,5-di-tert-butyl-4-hydromhenyl)propionic acid, include, but are not limited to, N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide, and mixtures of two or more of the foregoing.

Exemplary aminic antioxidants include, but are not limited to, N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p- phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyl-diphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine. phenothiazine, a mixture of mono- and dialkylated tert-butyl/tert-octylphenothiazines, a mixture of mono- and dialkylated tert-octyl-phenothiazines, N-allylphenothiazin, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)-sebacate, 2,2,6,6-tetramethylpiperidin-4-one, 2,2,6,6-tetramethylpiperidin-4-ol, and mixtures of two or more of the foregoing.

In some aspects, the additive is a UV absorber and/or light stabilizer, including, but limited to, a 2-(2-hydroxyphenyl)-2H-benzotriazole compound, a 2-hydroxybenzophenone compound, an ester of a substituted and unsubstituted benzoic acid, an acrylate or malonate compound, a sterically hindered amine stabilizer compound, an oxamide compound, a tris-aryl-o-hydroxyphenyl-s-triazine compound, or mixtures of two or more of the foregoing.

Exemplary 2-(2-hydroxyphenyl)-2H-benzotriazole compounds include, but are not limited to, 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω)-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumyl-phenyl)-2H-benzotriazole. 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole, and mixtures of two or more of the foregoing.

Exemplary 2-hydroxybenzophenone compounds include, but are not limited to, 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives of 2-hydroxybenzophenone, and mixtures of two or more such derivatives.

Exemplary esters of a substituted and unsubstituted benzoic acid include, but are not limited to, 4-tertbutyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate, and mixtures of two or more of the foregoing.

Exemplary an acrylate or malonate compounds include, but are not limited to, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(3-carbomethoxy-β-cyanovinyl)-2-methyl-indoline, dimethyl p-methoxybenzylidenemalonate, di-(1,2,2,6,6-pentamethylpiperidin-4-yl)p-methoxybenzylidenemalonate, and mixtures of two or more of the foregoing.

Exemplary sterically hindered amine stabilizer compounds include, but are not limited to, 4-hydroxy-2,2,6,6-tetramethylpiperidine, 1-allyl-4-hydroxy-2,2,6,6-tetramethylpiperidine, 1-benzyl-4-hydroxy-2,2,6,6-tetramethylpiperidine, bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2, 6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl)sebacate, bis(1-octyloxy-2,2,6,6-tetramethyl-piperidyl)succinate, linear or cyclic condensates of N,N'-bis-(2,2,6,6-tetramethyl-4-piperidyl)-hexamethylenediamine and 4-morpholino-2,6-dichloro-1,3,5-triazine, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, poly[methylpropyl-3-oxy-4-(2,2,6,6-tetramethyl-4-piperidyl)]siloxane, 1-(2-hydroxy-2-methylpropoxy)-4-octadecanoyloxy-2,2,6,6-tetramethylpiperidine, 1-(2-hydroxy-2-methylpropoxy)-4-hexadecanoyloxy-2,2,6,6-tetramethylpiperidine, 1-(2-hydroxy-2-methylpropoxy)-4-hydroxy-2,2,6,6-tetramethylpiperidine, 1-(2-hydroxy-2-methylpropoxy)-4-oxo-2,2,6,6-tetramethyl piperidine, bis(1-(2-hydroxy-2-methylpropoxy)-2,2,6,6-tetramethylpiperidin-4-yl)sebacate, bis(1-(2-hydroxy-2-methylpropoxy)-2,2,6,6-tetramethylpiperidin-4-yl)adipate, bis(1-(2-hydroxy-2-methylpropoxy)-2,2,6,6-tetramethylpiperidin-4-yl)succinate, bis(1-(2-hydroxy-2-methylpropoxy)-2,2,6,6-tetramethylpiperidin-4-yl) glutarate and 2,4-bis{N-[1-(2-hydroxy-2-methylpropoxy)-2,2,6,6-tetramethylpiperidin-4-yl]-N-butylamino}-6-(2-hydroxyethyl-amino)-s-triazine, and mixtures of two or more of the foregoing.

Exemplary oxamide compounds include, but are not limited to, 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides, and mixtures of two or more of the foregoing.

Exemplary tris-aryl-o-hydroxyphenyl-s-triazine compounds include, but are not limited to, 4,6-bis-(2,4-dimethylphenyl)-2-(2-hydroxy-4-octyloxyphenyl)-s-triazine, 4,6-bis-(2,4-di methylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxy-ethoxy)phenyl]-6-(4-chlorophenyl)-s-triazine, 2,4-bis[2-hydroxy-4-(2-hydroxy-4-(2-hydroxy-ethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3-sec-butyloxy-2-hydroxypropyloxy)phenylJ-642-hydroxy-4-(3-sec-amyloxy-2-hydroxypropyloxy)-phenyl]-s-triazine, 2,4-bis(2,4-dimethylphenyl)-6-[2-hydroxy-4-(3-benzyloxy-2-hydroxy-propyloxy)phenyl]-s-triazine, 2,4-bis(2-hydroxy-4-n-butyloxyphenyl)-6-(2,4-di-n-butyloxyphenyl)-s-triazine, methylenebis-{2,4-bis(2,4-dimethylphenyl)-6-[2-hydroxy-4-(3-butyloxy-2-hydroxypropoxy)-phenyl]-s-triazine}, 2,4,6-tris(2-hydroxy-4-isooctyloxycarbonylisopropyl ideneoxyphenyl)-s-triazine, 2,4-bis(2,4-di methyl phenyl)-6-(2-hydroxy-4-hexyloxy-5-α-cumyl phenyl)-s-triazine, 2-(2,4,6-trimethylphenyl)-4,6-bis[2-hydroxy-4-(3-butyloxy-2-hydroxypropyloxy)phenyl]-s-triazine, 2,4,6-tris[2-hydroxy-4-(3-sec-butyloxy-2-hydroxypropyloxy)phenyq-s-triazine, 4,6-bis-(2,4-dimethylphenyl)-2-(2-hydroxy-4-(3-(2-ethylhexyloxy)-2-hydroxypropoxy)-phenyl)-s-triazine, 4,6-diphenyl-2-(4-hexyloxy-2-hydroxyphenyl)-s-triazine, and mixtures of two or more of the foregoing.

In some aspects, the additive is a peroxide scavenger such as an ester of β-thiodipropionic acid, e.g., the lauryl, stearyl, myristyl or tridecyl esters, mercaptobenzimidazole, and the zinc salt of 2-mercapto-benzimidazole, zinc dibutyldithiocarbamate, dioctadecyl disulfide, pentaerythritol tetrakis(β-dodecylmercapto)propionate, or mixtures of any of the foregoing.

In some aspects, the additive is a polyamide stabilizer such as a copper salt of a halogen, e.g., iodide, and/or phosphorus compounds and salts of divalent manganese.

In some aspects, the additive is a basic co-stabilizer such as melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, calcium stearate, zinc stearate, magnesium behenate, magnesium stearate, sodium ricinoleate and potassium palmitate, antimony pyrocatecholate or zinc pyrocatecholate.

In some aspects, the disclosed polymeric formed materials can further include one or nucleating agent. Nucleating agents are widely used to modify the properties of various polymers. Nucleating agents can aid in decreasing form density, increasing the number of cells present in the form, and decreasing cell size in the form by providing a surface for heterogeneous nucleation of gas bubbles from the supercritical fluid state. For the thermoplastic copolyester elastomer forms of the present disclosure, nucleating agents can influence the properties of the final form article by modifying the quantity, distribution and rate of supercritical fluid conversion from a liquid to a gas during the forming process as lower pressures. The addition of nucleating agents provides a surface on which the supercritical fluid can be transformed from a liquid to a gas. As a consequence, many nucleation sites will result in many gas cell domains. In a particular example, the nucleating agent can include a metal salt of a fatty acid. In some aspects, the nucleating agent is zinc stearate. In some aspects, the composition contains about 0.1 weight percent to about 10 wt. percent, about 0.1 weight percent to about 5 wt. percent, about 0.1 weight percent to about 2 wt. percent, or about 0.5 weight percent to about 2 weight percent of the nucleating agent based upon a total weight of the composition.

In some aspects, the additive is a nucleating agent such as talcum, metal oxides such as titanium dioxide or magnesium oxide, phosphates, carbonates or sulfates of, preferably, alkaline earth metals, or mixtures thereof. Alternatively, the nucleating agent can be a mono- or polycarboxylic acids, and the salts thereof, e.g., 4-tert-butylbenzoic acid, adipic acid, diphenylacetic acid, sodium succinate, sodium benzoate, or mixtures thereof. In a further aspect, the additive can be a nucleating agent comprising both an inorganic and an organic material as disclosed herein above.

In some aspects, the rheology modifier can be a nanoparticles having comparatively high aspect ratios, nanoclays, nano-carbon, graphite, nano-silica, and the like.

In a further aspect, the formed polymeric material can further comprise a filler. The filler can be present in an amount from about 0.05 weight percent to about 20 weight percent based on the total weight of the formed polymeric material; about 0.1 weight percent to about 10 weight percent based on the total weight of the formed polymeric material; or present in an amount that is a value or set of values within the foregoing ranges, or any range that is a sub-set of the foregoing ranges. In some instances, the filler is a particulate filler. In further aspects, the filler is a carbonaceous filler. The carbonaceous filler can be carbon black, activated carbon, graphite, carbon fibers, carbon fibrils, carbon nanoparticles, or combinations thereof. In various aspects, the carbonaceous filler can be chemically-modified. Alternatively, the filler can be an inorganic filler. The inorganic filler can be an oxide, a hydroxide, a salt, a silicate, a metal, or combinations thereof. Examples of an inorganic filler include, but are not limited to, glass spheres, glass fibers, glass hollow spheres, glass flakes, MgO, $SiO_2$, $Sb_2O_3$, $Al_2O_3$, ZnO, talc, mica, kaolin, wollastonite, or combinations thereof.

In some aspects, the additive is a filler or reinforcing agent such as clay, kaolin, talc, asbestos, graphite, glass (such as glass fibers, glass particulates, and glass bulbs, spheres, or spheroids), mica, calcium metasilicate, barium sulfate, zinc sulfide, aluminum hydroxide, silicates, diatomaceous earth, carbonates (such as calcium carbonate, magnesium carbonate and the like), metals (such as titanium, tungsten, zinc, aluminum, bismuth, nickel, molybdenum, iron, copper, brass, boron, bronze, cobalt, beryllium, and alloys of these), metal oxides (such as zinc oxide, iron oxide, aluminum oxide, titanium oxide, magnesium oxide, zirconium oxide and the like), metal hydroxides, particulate synthetic plastics (such as high molecular weight polyethylene, polypropylene, polystyrene, polyethylene ionomeric resins, polyamide, polyester, polyurethane, polyimide, and the like), synthetic fibers (such as fibers comprising high molecular weight polyethylene, polypropylene, polystyrene, polyethylene ionomeric resins, polyamide, polyester, polyurethane, polyimide, and the like), particulate carbonaceous materials (such as carbon black and the like), wood flour and flours or fibers of other natural products, as well as cotton flock, cellulose flock, cellulose pulp, leather fiber, and combinations of any of the above. Non-limiting examples of heavy-weight filler components that can be used to increase the specific gravity of the cured elastomer composition can include titanium, tungsten, aluminum, bismuth, nickel, molybdenum, iron, steel, lead, copper, brass, boron, boron carbide whiskers, bronze, cobalt, beryllium, zinc, tin, metal oxides (such as zinc oxide, iron oxide, aluminum oxide, titanium oxide, magnesium oxide, and zirconium oxide), metal sulfates (such as barium sulfate), metal carbonates (such as calcium carbonate), and combinations of these. Non-limiting examples of light-weight filler components that can be used to decrease the specific gravity of the elastomer compound can include particulate plastics, hollow glass spheres, ceramics, and hollow spheres, regrinds, and forms, which can be used in combinations.

In some examples, the disclosed formed polymeric materials can also include a nanofiller. Nanofillers can not only serve as mechanical reinforcement but also nucleating agents. A variety of nanofillers can be used in lieu of or in addition to the zinc stearate. Nanofillers can include nanomaterials having one-dimensional structures such as of plates, laminas and/or shells; two-dimensional structures such as nanotubes and nanofibres having a diameter lower than 0.1 μm; or three-dimensional nanostructures such as nanoparticles or beads. Nanoplate fillers can be natural or synthetic clays, as well as phosphates of transition metals. Clay-based nanocomposites generate an overall improvement in physical performances. The most widely used ones are the phyllosilicates. Nanofillers can include nano-oxides such as nanoparticles of Titanium dioxide or Rutile. Other nanofillers can include nanoparticles of alumina or aluminum oxide, diatomite, and nanoscale carbon materials such as single-wall carbon nanotubes (SWCNT) or double-wall carbon nanotubes (DWCNT).

In some aspects, the additive is a cross-linking agent. There are a variety of cross-linking agents that can be used in the disclosed thermoplastic compositions. For example, a cross-linking agent can be a free-radical initiator. The free radical initiator can generate free radicals through thermo cleavage or UV radiation. The free-radical initiator can be present in an amount from about 0.001 weight percent to about 1.0 weight percent. A variety of radical initiators can be used as the radical sources to make thermoplastic compositions have a crosslinked structure. Suitable radical initiators applied include peroxides, sulfurs, and sulfides. Exemplary peroxides include, but are not limited to, aliphatic peroxides and aromatic peroxides, such as diacetylperoxide, di-tert-butypperoxide, dicumyl peroxide, dibenzoylperoxide, 2,5-dimethyl-2,5-di(benzoylperoxy)hexane, 2,5-dimethyl-2,5-di(butylperoxy)-3-hexyne, 2,5-bis-(t-butylperoxy)-2,5-dimethyl hexane, n-butyl-4,4-bis(t-butylperoxyl)valerate, 1,4-bis-(t-butylperoxyisopropyl)-benzene, t-butyl peroxybenzoate, 1,1-bis-(t-butylperoxy)-3,3,5 trimethylcyclohexane, and di(2,4-dichloro-benzoyl), or combinations of two or more of the foregoing.

In some aspects, the additive is a colorant. The term "colorant," as used herein, means a compound providing color to a substrate, e.g., a disclosed thermoplastic composition. The colorant can be an organic or inorganic pigment, a dye, or mixtures or combinations thereof. In a further aspect, the pigment or dye is an inorganic material such as a metal oxide, e.g., iron oxide or titanium dioxide. Alternatively, the inorganic pigment or dye can be a metal compound, e.g., strontium chromate or barium sulfate, or a metallic pigment, e.g., aluminum flakes or particles. Other exemplary inorganic pigments include carbon black, talc, and the like. In some cases, the metal compound is not one comprising cadmium. In can be desirable in some instances that the inorganic pigment or dye is not one that contains a lead, cadmium and chromium (VI) compound. In a further aspect, the pigment or dye is an organic compound such as a perylene, phthalocyanine derivative (e.g., copper phthalocyanine), a indanthrone, a benzimidazolone, a quinacridone, a perinone, and an azomethine derivative. In some instances, the composition according to any method known to a person skilled in the art. For example, the colorant can be added to the thermoplastic composition in a mixing device such as an extruder, directly or else by means of a masterbatch. In various aspects, the disclosed thermoplastic composition can comprise between about 0.005 weight percent and about 5 weight percent relative to the weight of the composition. In a further aspect, the disclosed thermoplastic composition can comprise between about 0.01 weight percent and about 3 weight percent relative to the weight of the composition.

The disclosed formed polymeric materials can comprise one or more colorants. In some aspects, the disclosed formed polymeric materials can comprise a first colorant, and the binding material can comprise a second colorant. In this instance, it is understood that the first colorant can comprise one or more dyes or pigments. Similarly, it is understood that the second colorant can comprise one or more dyes or pigments.

There are at least two types of metal complex dyes that can be used as colorants. Acid metal complex dyes are soluble in water and therefore dissolved in a water solvent system prior to use. Solvent metal complex dyes are insoluble in water and therefore dissolved in a water/organic solvent system prior to use.

The solvent system used for metal complex dyes should both dissolve the dyes and promote diffusion of dye molecules into the elastomeric substrates under mild conditions. Thus, it was discovered that certain organic solvents not only dissolve dyes that are insoluble in water such as solvent metal complex dyes, but also promote or facilitate dye diffusion into the polymer matrix of both acid metal complex dyes and solvent metal complex dyes.

Suitable organic solvents include ethylene glycol phenyl ether (EGPE) and isopropanol. Generally a relatively smaller amount of organic solvent is needed.

A suitable solvent system for acid metal complex dyes contains, for example, 90 to 100 volume percent water and 0 to 10 volume percent organic solvent. Typical amounts of organic solvents are 0.5 to 7 volume percent or 1 to 5 volume percent.

A suitable solvent system for solvent metal complex dyes contains, besides water and ethylene glycol phenyl ether, a third component, usually an organic solvent, to increase the solubility of dyes. For example, the solvent system may contain 40 to 80 volume percent water and 60 to 20 volume percent organic solvent. Suitable organic solvents include, but are not limited to, alcohols, ethers, esters and ketones. Suitable solvent metal complex dyes include Orasol Yellow 2RLN, Orasol Yellow 2GLN-M, Pylam Solvent Red, Pylam Brilliant Yellow, and Resofast Orange M2Y.

Alternatively, a two phase solvent system may be used wherein the dye is soluble in the organic solvent, but not in the water and the organic solvent is only partially miscible in water or insoluble or nearly insoluble in water. Suitable organic solvents to form a two-phase system include those that are polar and insoluble in water such as suitable hydrocarbons, alcohols, aldehydes, ketones, ethers, esters, amides, acids, and halogenated compounds. Examples include, but are not limited to, n-butanol, cyclohexanol, butyl acetate, and ethylene glycol phenyl ether.

In a two-phase solvent system, a solution is prepared containing a major amount of water and a minor amount of an organic solvent. The organic solvent is either partially miscible with water or nearly insoluble in water such that the water and organic solvent form a two phase system. The two-phase solvent composition allows fast and uniform dyeing, e.g., of form particles.

The dye may be first dissolved in the organic solvent to form a uniform solution and then the solution may be dispersed in the water as droplets under agitation or stirring. Alternatively, the organic solvent may be combined with the water to form a two-phase solvent. The dye is then added to the two-phase solvent under agitation or stirring to form droplets.

A two-phase solvent composition can contain 1 to 30 volume percent, for example, 1 to 25 volume percent, organic solvent, and 70 to 99 volume percent, for example, 75 to 99 volume percent, water. These two-phase solvent compositions are particularly suitable for solvent dyes that have high solubility in organic solvents. Generally, dyes suitable for use in this embodiment include those that are highly soluble in organic solvent, but nearly insoluble in water.

When suitable substrates are immersed in the two-phase solvent dye system, droplets of organic solvent and dye are preferentially adsorbed onto the surface of the substrate. This creates a thin layer of organic solvent with a high concentration of dye on the surface of the substrate. In addition, the organic solvent causes the substrate to swell providing an open polymeric structure. The combination of such open structure in the substrate and high concentration of dye facilitates fast diffusion of dye molecules into the substrate.

Thus, the two-phase solvent composition both dissolves dyes and promotes diffusion of dye molecules into flexible substrates under mild conditions. Compared with conventional dyeing systems, the two-phase solvent dye system provides fast dyeing, uses less organic solvent, uses mild dyeing conditions, and provides potential for effective dye recovery/removal from solvent.

In some aspects, a dye can be a metal complex dye such as, but not limited to, Bezanyl Black, Bezanyl Red, Bezanyl Yellow, Orasol Black, Orasol Blue GN, Orasol Red G, Orasol Yellow 2GLN, Isolan Blue, SP-R, Isolan Grey SP-G, Isolan Red SP-G, Isolan Yellow SP-2RL, Pylam Solvent Blue, Pylam Solvent Red, Pylam Solvent Yellow, Resofast Blue, Resofast Orange, and Resofast Yellow.

In some aspects, the disclosed formed polymeric materials can be dyed with a nonionic or anionic ("acid") dye by one of: (1) before being infused with the supercritical fluid, (2) during being infused with the supercritical fluid by a nonionic or anionic dye dissolved or dispersed in the supercritical fluid, which optionally comprises a polar liquid, (3) during immersion in the heated fluid, where the heated fluid contains the dye, or (4) after being formed.

In some aspects, the colorant can be an acid dyes, such as a water-soluble anionic dyes. Acid dyes are available in a wide variety, from dull tones to brilliant shades. Chemically, acid dyes include azo, anthraquinone and triarylmethane compounds.

The "Color Index" (C.I.), published jointly by the Society of Dyers and Colourists (UK) and by the American Association of Textile Chemists and Colorists (USA), is the most extensive compendium of dyes and pigments for large scale coloration purposes, including 12000 products under 2000 C.I. generic names. In the C.I. each compound is presented with two numbers referring to the coloristic and chemical classification. The "generic name" refers to the field of application and/or method of coloration, while the other number is the "constitution number." Nonlimiting examples of acid dyes include Acid Yellow 1, 17, 23, 25, 34, 42, 44, 49, 61, 79, 99, 110, 116, 127, 151, 158:1, 159, 166, 169, 194, 199, 204, 220, 232, 241, 246, and 250; Acid Red, 1, 14, 17, 18, 42, 57, 88, 97, 118, 119, 151, 183, 184, 186, 194, 195, 198, 211, 225, 226, 249, 251, 257, 260, 266, 278, 283, 315, 336, 337, 357, 359, 361, 362, 374, 405, 407, 414, 418, 419, and 447; Acid Violet 3, 5, 7, 17, 54, 90, and 92; Acid Brown 4, 14, 15, 45, 50, 58, 75, 97, 98, 147, 160:1, 161, 165, 191, 235, 239, 248, 282, 283, 289, 298, 322, 343, 349, 354, 355, 357, 365, 384, 392, 402, 414, 420, 422, 425, 432, and 434; Acid Orange 3, 7, 10, 19, 33, 56, 60, 61, 67, 74, 80, 86, 94, 139, 142, 144, 154, and 162; Acid Blue 1, 7, 9, 15, 92, 133, 158, 185, 193, 277, 277:1, 314, 324, 335, and 342; Acid Green 1, 12, 68:1, 73, 80, 104, 114, and 119; Acid Black 1, 26, 52, 58, 60, 64, 65, 71, 82, 84, 107, 164, 172, 187, 194, 207, 210, 234, 235, and combinations of these. The acid dyes may be used singly or in any combination in the dye solution.

Acid dyes and nonionic disperse dyes are commercially available from many sources, including Dystar L.P., Charlotte, N.C., under the trademark TELON; Huntsman Corporation, Woodlands, Tex., under the trademarks ERIONYL and TECTILON; BASF SE, Ludwigshafen, Germany under the trademark BASACID; Clariant International Ltd., Muttenz, Switzerland, under the trademarks of SOLVAPERM, HOSTASOL, POLYSYNTHREN, and SAVINYL; and Bezema AG, Montlingen, Switzerland under the trade name Bemacid.

Nonionic disperse dyes are also commercially available in many colors and include fluorescent dyes.

In some aspects, the disclosed formed polymeric materials can be dyed before being formed. The acid or nonionic disperse dye solution in which the pellets or other articles are dyed may include, for example, from about 0.001 to about 5.0 grams per liter, preferably from about 0.01 to about 2 grams per liter of the acid or nonionic disperse dye compound or combination of acid or nonionic disperse dye compounds. The amount of acid or nonionic disperse dye compound use will determine how strong the color is and how quickly the pellets or other articles are dyed, and may be optimized in a straightforward manner; generally, a more concentrated dye solution can provide a stronger (deeper, darker, more intense) dyed color and can more quickly dye the pellets or other articles containing the thermoplastic elastomer.

The dye solution may include a water-soluble organic solvent. Water solubility of a particular organic solvent used in a particular amount in the dye solution is determined at 20 degrees Celsius. and 1 atm. pressure at the concentration at which the alcohol is to be used in the dye solution; the organic solvent is water soluble if it fully dissolves or is fully miscible in water at 20 degrees Celsius. and 1 atm. pressure at the concentration at which the alcohol is to be used in the dye solution and does not form any separate phase or layer. Suitable, nonlimiting examples of water-soluble organic solvents that may be used include alcohols, such as methanol, ethanol, n-propanol, isopropanol, ethylene glycol, diethylene glycol, triethylene glycol, tetraethylene glycol, propylene glycol, dipropylene glycol, tripropylene glycols, and glycerol; ketones, such as acetone and methyl ethyl ketone; esters, such as butyl acetate, which is soluble in limited amounts in water; and glycol ethers and glycol ether esters (particularly acetates), such as ethylene glycol monobutyl ether, propylene glycol monomethyl ether, and propylene glycol monomethyl ether acetate. The water-soluble organic solvent may be included in concentrations of up to about 50 percent by volume, or up to about 25 percent by volume, or from about 1 percent to about 50 percent by volume, or from about 5 percent to about 40 percent by volume, or from about 10 percent to about 30 percent by volume, or from about 15 percent to about 25 percent by volume of the aqueous medium used to make the dye solution. Whether an organic solvent is used and how much organic solvent is used may be varied according to which dye is used and to the application method for contacting the dye solution with the pellets or other articles.

If the disclosed formed polymeric materials comprise thermoplastic polyurethane elastomers or thermoplastic polyurea elastomers, the anionic dye solution also advantageously includes a quaternary (tetraalkyl) ammonium salt selected from soluble tetrabutylammonium compounds and tetrahexylammonium compounds. Such articles are advantageously dyed in an acid dye solution including an anionic dye compound, a quaternary ammonium salt selected from soluble tetrabutylammonium compounds and tetrahexylammonium compounds, and, optionally, a water-soluble organic solvent.

The counterion of the quaternary ammonium salt should be selected so that the quaternary ammonium salt forms a stable solution with the anionic dye. The quaternary ammonium compound may be, for example, a halide (such as chloride, bromide or iodide), hydroxide, sulfate, sulfite, carbonate, perchlorate, chlorate, bromate, iodate, nitrate, nitrite, phosphate, phosphite, hexfluorophosphite, borate, tetrafluoroborate, cyanide, isocyanide, azide, thiosulfate, thiocyanate, or carboxylate (such as acetate or oxalate). In certain embodiments, an anion that is a weaker Lewis base may be selected for the tetraalkylammonium compound to produce a darker color for the dyed cover or coating layer. In various embodiments, the tetraalkylammonium compound is or includes a tetrabutylammonium halide or tetrahexylammonium halide, particularly a tetrabutylammonium bromide or chloride or a tetrahexylammonium bromide or chloride.

The acid dye solution used to dye the disclosed formed polymeric materials when they contain thermoplastic polyurethane elastomers or thermoplastic polyurea elastomers may include from about 0.1 to about 5 equivalents of the soluble tetraalkylammonium compound per equivalent of dye compound. In various embodiments, the acid dye solution may include from about 0.5 to about 4, preferably from about 1 to about 4 equivalents of the tetraalkylammonium compound per equivalent of dye compound. The amount of tetraalkylammonium compound used with a particular acid dye compound depends upon the rate of diffusion of the dye into and in the cover or coating layer and may be optimized in a straightforward manner. The process of dyeing the disclosed formed polymeric materials containing thermoplastic polyurethane elastomers or thermoplastic polyurea elastomers with this dye solution containing the soluble tetraalkylammonium compound can produce strong color intensity in the dyed form particles or binding materials.

The disclosed formed polymeric materials may be dyed with a nonionic or anionic dye one of: (1) before being infused with the supercritical fluid. The pellets may also be dyed while being infused with the supercritical fluid by a nonionic or anionic dye dissolved or dispersed in the supercritical fluid, which optionally comprises a polar liquid. The pellets may also be dyed while being immersed in the heated fluid, where the heated fluid contains the dye. In particular, the heated fluid may be a heated aqueous dye solution, which may contain the quaternary ammonium salt and organic solvents as described. Finally, the disclosed formed polymeric materials can be dyed after being formed using the dyeing process as already described.

Methods of Characterizing the Disclosed Articles.

Several methods of measuring resiliency and/or energy return of forms exist in the art. One method of measuring resiliency of forms is based on ASTM D 2632-92, which is a test for solid rubber materials. For use with forms, the test sample is prepared as described in ASTM D2632-92, but uses a sample of form in place of the sample of solid rubber. This test uses a plunger which is dropped from a height onto a test sample while being guided by a vertical rod. The drop height is divided into 100 equal parts, and the height to which the plunger rebounds is measured using this 100 part scale, to determine the resiliency of the sample. Alternative methods which use a ball of standard weight dropped onto a sample, and which measure the rebound height of the ball to determine the resiliency of the sample can also be used. In some aspects, the resiliency and/or energy return are determined using force/displacement behavior determined using methods known to one skilled in the art.

In various aspects, force/displacement behavior for the disclosed articles can be measured using an Instron Electropuls E10000 (Instron, Norwood, Mass., USA) with a stainless steel 4 5 mm circular cross section impact geometry. The test form slabs can be approximately 10 millimeters, although thinner or thicker form slabs can also be used. Each sample can be evaluated by two different compression cycles: "running" and "walking". A "running" compression cycle consists of samples being compressed under displacement control from 0 Newtons to 300 Newtons and back to 0 Newtons in 180 milliseconds, followed by a pause of 400 milliseconds for a total of ~1.7 Hertz. The "walking" compression cycle consist of samples compressed from 0 Newtons to 144 Newtons and back to 0 Newtons in 600 milliseconds followed by a pause of 400 milliseconds for a total of ~1 Hertz.

Compression can be measured by preparing a sample of a standard thickness (e.g., 10 millimeters) of a form. Samples having a thickness less than the standard can be stacked to make a sample having the standard thickness. The sample is loaded into a metal compression plate and compressed to a height of 50 percent of the original thickness (e.g., 5 millimeters). The sample is placed in a 50 degrees Celsius oven on its side for 6 hours. At the end of the 6 hours, the sample is removed from the oven and from the metal compression plate, and allowed to cool for 30 minutes. Once cooled, the thickness of the sample is measured. The percent compression set (C.S.) is calculated by (a) subtracting the final sample thickness from the original sample thickness, and (b) subtracting the 50 percent compressed thickness from the original sample thickness, (c) dividing (a) by (b), and (d) multiplying the result by 100 to obtain the percent compression set (where all thicknesses are measured in millimeters).

Energy input can be taken as the integral of the force-displacement curve during compression force loading. Hysteresis is taken as the ratio: (energy output)/(energy input), which can also be viewed as the energy efficiency of the form. Fatigue behavior is judged by changes in the form displacement at the max load of a cycle. All measured properties: stiffness, hysteresis, and fatigue are measured for multiple cycles for both running and walking compression cycles. Typical characterization using the compression sequence above can be run for 5000 cycles, which simulates approximately ~5-10 miles of walking/running and takes about 45 minutes of testing time on the Instron Electropuls E10000 instrument. Longer runs up to 100,000 compression cycles can be done to simulate accelerated materials response to ~100-200 miles of use.

The tensile strength can be measured on a die cut sample of the article in the shape of a dumbbell of a standard size such as a 2.5 centimeters in width by 11.5 centimeters in length, with a minimum thickness of 3 to 4 millimeters. The dumbbell follows the shape described in ASTM D412, die C. The sample is loaded symmetrically into and tested using a long travel extensometer such as the Instron 2603-080 which allows for a minimum of 1000 percent strain with a gauge length of 25 millimeters and a resolution of at least 0.1 millimeters. The tensile value at the failure point of the sample (the point during testing when the load value initially drops) is recorded.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the Definitions All technical and scientific terms used herein, unless defined otherwise, have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The terms "comprises," "comprising," "including," and "having," are inclusive and therefore specify the presence of features, steps, operations, elements, and/or components, but do not preclude the presence or addition of one or more other features, steps, operations, elements, components, and/or groups thereof.

As used in the specification and the appended claims, the singular forms "a," "an" and "the" include plural referents unless the context clearly dictates otherwise. Thus, for example, reference to "a form particle," "a midsole," or "an adhesive," including, but not limited to, two or more such form particles, midsoles, or adhesives, and the like.

As used herein, the term "and/or" includes any and all combinations of one or more of the associated listed items.

As used herein, in substance or substantially means at least 50 percent, 60 percent, 75 percent, 90 percent, 95 percent, or more, as determined based on weight or volume.

The terms first, second, third, etc. can be used herein to describe various elements, components, regions, layers and/or sections. These elements, components, regions, layers and/or sections should not be limited by these terms. These terms can be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

As used herein, the modifiers "upper," "lower," "top," "bottom," "upward," "downward," "vertical," "horizontal," "longitudinal," "transverse," "front," "back" etc., unless otherwise defined or made clear from the disclosure, are relative terms meant to place the various structures or orientations of the structures of the article of footwear in the context of an article of footwear worn by a user standing on a flat, horizontal surface.

It should be noted that ratios, concentrations, amounts, and other numerical data can be expressed herein in a range format. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1 percent to 5 percent" should be interpreted to include not only the explicitly recited values of about 0.1 percent to about 5 percent, but also include individual values (e.g., 1 percent, 2 percent, 3 percent, and 4 percent) and the sub-ranges (e.g., 0.5 percent, 1.1 percent, 2.4 percent, 3.2 percent, and 4.4 percent) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated plus or minus 10 percent variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Reference to "a" chemical compound" refers to one or more molecules of the chemical compound, rather than being limited to a single molecule of the chemical compound. Furthermore, the one or more molecules can or cannot be identical, so long as they fall under the category of the chemical compound. Thus, for example, "a polyamide" is interpreted to include one or more polymer molecules of the polyamide, where the polymer molecules can or cannot be identical (e.g., different molecular weights and/or isomers).

The terms "at least one" and "one or more of" an element are used interchangeably, and have the same meaning that includes a single element and a plurality of the elements, and can also be represented by the suffix "(s)" at the end of the element. For example, "at least one polyamide", "one or more polyamides", and "polyamide(s)" can be used interchangeably and have the same meaning.

As used herein, the terms "optional" or "optionally" means that the subsequently described component, event or circumstance can or cannot occur, and that the description includes instances where said component, event or circumstance occurs and instances where it does not.

The term "receiving", such as for "receiving an upper for an article of footwear", when recited in the claims, is not intended to require any particular delivery or receipt of the received item. Rather, the term "receiving" is merely used to recite items that will be referred to in subsequent elements of the claim(s), for purposes of clarity and ease of readability.

As used herein the terms "percent by weight", "weight percent," "wt percent," and "wt percent," which can be used interchangeably, indicate the weight percent of a given component based on the total weight of the composition or article, unless otherwise specified. That is, unless otherwise specified, all weight percent values are based on the total weight of the composition. It should be understood that the sum of weight percent values for all components in a disclosed composition or formulation or article are equal to 100.

Similarly, the terms "percent by volume", "volume percent," "vol percent," and "vol. percent," which can be used interchangeably, indicate the percent by volume of a given component based on the total volume of the composition or article, unless otherwise specified. That is, unless otherwise specified, all volume percent values are based on the total volume of the composition or article. It should be understood that the sum of volume percent values for all components in a disclosed composition or formulation or article are equal to 100.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

As used herein, the term "effective amount" refers to an amount that is sufficient to achieve the desired modification of a physical property of the composition or material. For example, an "effective amount" of a filler refers to an amount that is sufficient to achieve the desired improvement in the property modulated by the formulation component, e.g. achieving the desired level of modulus. The specific level in terms of weight percent in a composition required as an effective amount will depend upon a variety of factors including the amount and type of polymer, amount and type of filler, and end use of the article made using the composition.

As used herein, the terms "optional" or "optionally" means that the subsequently described event or circumstance can or cannot occur, and that the description includes instances where said event or circumstance occurs and instances where it does not.

As used herein, the term "units" can be used to refer to individual (co)monomer units such that, for example, styrenic repeat units refers to individual styrene (co)monomer units in the polymer. In addition, the term "units" can be used to refer to polymeric block units such that, for example, "styrene repeating units" can also refer to polystyrene blocks; "units of polyethylene" refers to block units of polyethylene; "units of polypropylene" refers to block units of polypropylene; "units of polybutylene" refers to block units of polybutylene, and so on. Such use will be clear from the context.

The term "copolymer" refers to a polymer having two or more monomer species, and includes terpolymers (i.e., copolymers having three monomer species).

Unless otherwise specified, temperatures referred to herein are determined at standard an atmospheric pressure (i.e., 1 atm).

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

The term "alkyl group" as used herein is a branched or unbranched saturated hydrocarbon group of 1 to 24 carbon atoms, such as methyl, ethyl, n propyl, isopropyl, n butyl, isobutyl, t butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "aralkyl" as used herein is an aryl group having an alkyl, alkynyl, or alkenyl group as defined above attached to the aromatic group. An example of an aralkyl group is a benzyl group.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

A very close synonym of the term "residue" is the term "radical," which as used in the specification and concluding claims, refers to a fragment, group, or substructure of a molecule described herein, regardless of how the molecule is prepared. For example, a 2,4-dihydroxyphenyl radical in a particular compound has the structure:

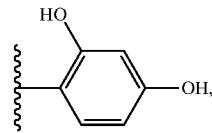 [SMILES: *c1ccc(O)cc1O]

regardless of whether 2,4-dihydroxyphenyl is used to prepare the compound. In some aspects the radical (for example an alkyl) can be further modified (i.e., substituted alkyl) by having bonded thereto one or more "substituent radicals." The number of atoms in a given radical is not critical to the present invention unless it is indicated to the contrary elsewhere herein.

As used herein, the terms "number average molecular weight" or "$M_e$" can be used interchangeably, and refer to the statistical average molecular weight of all the polymer chains in the sample and is defined by the formula:

$$M_n = \frac{\sum N_i M_i}{\sum N_i},$$

where $M_i$ is the molecular weight of a chain and $N_i$ is the number of chains of that molecular weight. $M_n$ can be determined for polymers, e.g., polycarbonate polymers, by methods well known to a person having ordinary skill in the art using molecular weight standards, e.g. polycarbonate standards or polystyrene standards, preferably certified or traceable molecular weight standards.

Aspects

The following listing of exemplary aspects supports and is supported by the disclosure provided herein.

Aspect 1. A thermoplastic copolyester elastomer composition comprising: a thermoplastic copolyester elastomer comprising, (a) a plurality of first segments, each first segment derived from a dihydroxy-terminated polydiol; (b) a plurality of second segments, each second segment derived from a diol; and (c) a plurality of third segments, each third segment derived from an aromatic dicarboxylic acid.

Aspect 2. The thermoplastic copolyester elastomer composition of Aspect 1, wherein the thermoplastic copolyester elastomer is a block copolymer; a segmented copolymer; a random copolymer; or a condensation copolymer.

Aspect 3. The thermoplastic copolyester elastomer composition of Aspect 1 or Aspect 2, wherein the thermoplastic copolyester elastomer has a weight average molecular weight of about 50,000 Daltons to about 1,000,000 Daltons.

Aspect 4. The thermoplastic copolyester elastomer composition of Aspect 3, wherein the thermoplastic copolyester elastomer has a weight average molecular weight of about 50,000 Daltons to about 500,000 Daltons; about 75,000 Daltons to about 300,000 Daltons; or about 100,000 Daltons to about 200,000 Daltons.

Aspect 5. The thermoplastic copolyester elastomer composition of any one of Aspect 1-Aspect 4, wherein the thermoplastic copolyester elastomer has a ratio of first segments to third segments from about 1:1 to about 1:5 based on the weight of each of the first segments and the third segments.

Aspect 6. The thermoplastic copolyester elastomer composition of Aspect 5, wherein the thermoplastic copolyester elastomer has a ratio of first segments to third segments from about 1:1 to about 1:3 or about 1:1 to about 1:2 based on the weight of each of the first segments and the third segments.

Aspect 7. The thermoplastic copolyester elastomer composition of any one of Aspect 1-Aspect 6, wherein the thermoplastic copolyester elastomer has a ratio of second segments to third segments from about 1:1 to about 1:3 based on the weight of each of the first segments and the third segments.

Aspect 8. The thermoplastic copolyester elastomer composition Aspect 7, wherein the thermoplastic copolyester elastomer has a ratio of second segments to third segments from about 1:1 to about 1:2 or about 1:1 to about 1:1.52 based on the weight of each of the first segments and the third segments.

Aspect 9. The thermoplastic copolyester elastomer composition of any one of Aspect 1-Aspect 8, wherein the first segments derived from a dihydroxy-terminated polydiol comprise segments derived from a poly(alkylene oxide)diol having a number-average molecular weight of about 250 Daltons to about 6000 Daltons.

Aspect 10. The thermoplastic copolyester elastomer composition of Aspect 9, wherein the number-average molecular weight is about 400 Daltons to about 6,000 Daltons; about 350 Daltons to about 5,000 Daltons; or about 500 Daltons to about 3,000 Daltons.

Aspect 11. The thermoplastic copolyester elastomer composition of any one of Aspect 9-Aspect 10, wherein the poly(alkylene oxide)diol is poly(ethylene ether)diol; poly (propylene ether)diol; poly(tetramethylene ether)diol; poly (pentamethylene ether)diol; poly(hexamethylene ether)diol; poly(heptamethylene ether)diol; poly(octamethylene ether) diol; poly(nonamethylene ether)diol; poly(decamethylene ether)diol; or mixtures thereof.

Aspect 12. The thermoplastic copolyester elastomer composition of Aspect 11, wherein the poly(alkylene oxide)diol is poly(ethylene ether)diol; poly(propylene ether)diol; poly (tetramethylene ether)diol; poly(pentamethylene ether)diol; or poly(hexamethylene ether)diol.

Aspect 13. The thermoplastic copolyester elastomer composition of Aspect 11, wherein the poly(alkylene oxide)diol is poly(tetramethylene ether)diol.

Aspect 14. The thermoplastic copolyester elastomer composition of any one of Aspect 1-Aspect 13, wherein the second segments derived from a diol comprise a diol having a molecular weight of less than about 250.

Aspect 15. The thermoplastic copolyester elastomer composition of Aspect 14, wherein the diol is a C2-C8 diol.

Aspect 16. The thermoplastic copolyester elastomer composition of Aspect 15, wherein the second segments derived from a diol comprise a diol selected from ethanediol; propanediol; butanediol; pentanediol; 2-methyl propanediol; 2,2-dimethyl propanediol; hexanediol; 1,2-dihydroxy cyclohexane; 1,3-dihydroxy cyclohexane; 1,4-dihydroxy cyclohexane; and mixtures thereof.

Aspect 17. The thermoplastic copolyester elastomer composition of Aspect 16, wherein the diol is selected from 1,2-ethanediol, 1,3-propanediol, 1,4-butanediol, 1,6-hexanediol, and mixtures thereof.

Aspect 18. The thermoplastic copolyester elastomer composition of any one of Aspect 1-Aspect 17, wherein the third segments derived from an aromatic dicarboxylic acid comprise an aromatic C5-C16 dicarboxylic acid.

Aspect 19. The thermoplastic copolyester elastomer composition of Aspect 18, wherein the aromatic C5-C16 dicarboxylic acid has a molecular weight less than about 300 Daltons or about 120 Daltons to about 200 Daltons.

Aspect 20. The thermoplastic copolyester elastomer composition of Aspect 18, wherein the aromatic C5-C16 dicarboxylic acid is terephthalic acid, phthalic acid, isophthalic acid, or a derivative thereof.

Aspect 21. The thermoplastic copolyester elastomer composition of Aspect 20, wherein the aromatic C5-C16 dicarboxylic acid is terephthalic acid or the dimethyl ester derivative thereof.

Aspect 22. The thermoplastic copolyester elastomer composition of any one of Aspect 1-Aspect 21, wherein the thermoplastic copolyester elastomer comprises, (a) a plurality of first copolyester units, each first copolyester unit of the plurality comprising the first segment derived from a dihydroxy-terminated polydiol and the third segment derived from an aromatic dicarboxylic acid, wherein the first copolyester unit has a structure represented by a formula 1:

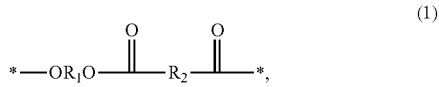

wherein $R_1$ is a group remaining after removal of terminal hydroxyl groups from the poly(alkylene oxide) diol of the first segment, wherein the poly(alkylene oxide) diol of the first segment is a poly(alkylene oxide) diol having a number-average molecular weight of about 400 to about 6000; and wherein $R_2$ is a group remaining after removal of carboxyl groups from the aromatic dicarboxylic acid of the third segment; and (b) a plurality of second copolyester units, each second copolyester unit of the plurality comprising the second segment derived from a diol and the third segment derived from an aromatic dicarboxylic acid, wherein the the second copolyester unit has a structure represented by a formula 2:

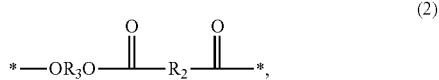

wherein $R_3$ is a group remaining after removal of hydroxyl groups from the diol of the second segment derived from a diol, wherein the diol is a diol having a molecular weight of less than about 250; and wherein $R_2$ is the group remaining after removal of carboxyl groups from the aromatic dicarboxylic acid of the third segment.

Aspect 23. The thermoplastic copolyester elastomer composition of Aspect 22, wherein the first copolyester unit has a structure represented by a formula 3:

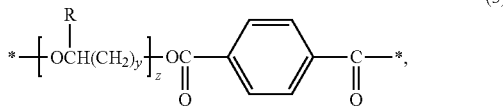

wherein R is H or methyl; wherein y is an integer having a value from 1 to 10; wherein z is an integer having a value from 2 to 60; and wherein a weight average molecular weight of each of the plurality of first copolyester units is from about 300 Daltons to about 7,000 Daltons.

Aspect 24. The thermoplastic copolyester elastomer composition of Aspect 23, wherein y is an integer having a value of 1, 2, 3, 4, or 5.

Aspect 25. The thermoplastic copolyester elastomer composition of Aspect 23 or Aspect 24, wherein R is hydrogen; wherein R is methyl; wherein R is hydrogen and y is an integer having a value of 1, 2, or 3; or wherein R is methyl and y is an integer having a value of 1.

Aspect 26. The thermoplastic copolyester elastomer composition of Aspect 22, wherein the first copolyester unit has a structure represented by a formula 4:

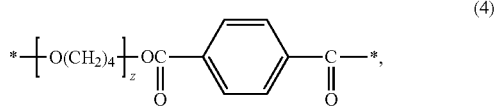

wherein z is an integer having a value from 2 to 60; and wherein a weight average molecular weight of each of the plurality of first copolyester units is from about 300 Daltons to about 7,000 Daltons.

Aspect 27. The thermoplastic copolyester elastomer composition of any one of Aspect 23-Aspect 26, wherein z is an integer having a value from 5 to 60; from 5 to 50; from 5 to 40; from 4 to 30; from 4 to 20; or from 2 to 10.

Aspect 28. The thermoplastic copolyester elastomer composition of any one of Aspect 23-Aspect 27, wherein the weight average molecular weight of each of the plurality of first copolyester units is from about 400 Daltons to about 6,000 Daltons; from about 400 Daltons to about 5,000 Daltons; from about 400 Daltons to about 4,000 Daltons; from about 400 Daltons to about 3,000 Daltons; from about 500 Daltons to about 6,000 Daltons; from about 500 Daltons to about 5,000 Daltons; from about 500 Daltons to about 4,000 Daltons; from about 500 Daltons to about 3,000 Daltons; from about 600 Daltons to about 6,000 Daltons; from about 600 Daltons to about 5,000 Daltons; from about 600 Daltons to about 4,000 Daltons; from about 600 Daltons to about 3,000 Daltons.

Aspect 29. The thermoplastic copolyester elastomer composition of any one of Aspect 22-Aspect 28, wherein the second copolyester unit has a structure represented by a formula 5:

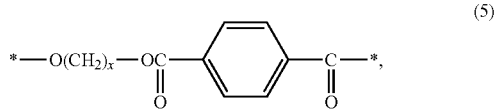

wherein x is an integer having a value from 1 to 20.

Aspect 30. The thermoplastic copolyester elastomer composition of Aspect 29, wherein x is an integer having a value from 2 to 18; a value from 2 to 17; a value from 2 to 16; a value from 2 to 15; a value from 2 to 14; a value from 2 to 13; a value from 2 to 12; a value from 2 to 11; a value from 2 to 10; a value from 2 to 9; a value from 2 to 8; a value from 2 to 7; a value from 2 to 6; or a value of 2, 3, or 4.

Aspect 31. The thermoplastic copolyester elastomer composition of Aspect 29, wherein the second copolyester unit has a structure represented by a formula 6:

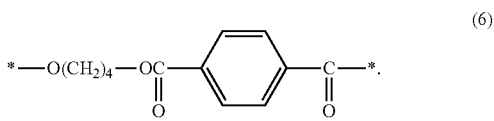

Aspect 32. The thermoplastic copolyester elastomer composition of any one of Aspect 22-Aspect 31, wherein the thermoplastic copolyester elastomer comprises a weight percent of the plurality of first copolyester units based on total weight of the thermoplastic copolyester elastomer of about 30 weight percent to about 80 weight; about 40 weight percent to about 80 weight percent; about 50 weight percent to about 80 weight percent; about 30 weight percent to about 70 weight percent; about 40 weight percent to about 70 weight percent; or about 50 weight percent to about 70 weight percent.

Aspect 33. The thermoplastic copolyester elastomer composition of any one of Aspect 22-Aspect 32, wherein the thermoplastic copolyester elastomer comprises a weight percent of the plurality of second copolyester units based on total weight of the thermoplastic copolyester elastomer of about 40 weight percent to about 65 weight percent; about 45 weight percent to about 65 weight percent; about 50 weight percent to about 65 weight percent; about 55 weight percent to about 65 weight percent; about 40 weight percent to about 60 weight percent; about 45 weight percent to about 60 weight percent; about 50 weight percent to about 60 weight percent; or about 55 weight percent to about 60 weight percent.

Aspect 34. The thermoplastic copolyester elastomer composition of any one of Aspect 1-Aspect 33, wherein the thermoplastic copolyester elastomer composition further comprises an additive.

Aspect 35. The thermoplastic copolyester elastomer composition of Aspect 34, wherein the additive is present in an amount from about 0.1 weight percent to about 10 weight percent based on the total weight of the formed polymeric material.

Aspect 36. The thermoplastic copolyester elastomer composition of Aspect 34 or Aspect 35, wherein the additive is a wax, an anti-oxidant, a UV-absorbing agent, a coloring agent, or combinations thereof.

Aspect 37. The thermoplastic copolyester elastomer composition of any one of Aspect 1-Aspect 36, wherein the thermoplastic copolyester elastomer composition further comprises a filler.

Aspect 38. The thermoplastic copolyester elastomer composition e of Aspect 37, wherein the filler is present in an amount from about 0.05 weight percent to about 20 weight percent or from about 0.1 weight percent to about 10 weight percent based on the total weight of the formed polymeric material.

Aspect 39. The thermoplastic copolyester elastomer composition of any one of Aspect 37 or Aspect 38, wherein the filler is a particulate filler; or wherein the filler is a carbonaceous filler.

Aspect 40. The thermoplastic copolyester elastomer composition of Aspect 39, wherein the carbonaceous filler is carbon black, activated carbon, graphite, carbon fibers, carbon fibrils, carbon nanoparticles, or combinations thereof; and wherein the carbonaceous filler is optionally chemically-modified.

Aspect 41. The thermoplastic copolyester elastomer composition of Aspect 37, wherein the filler is an inorganic filler.

Aspect 42. The thermoplastic copolyester elastomer composition of Aspect 41, wherein the inorganic filler is an oxide, a hydroxide, a salt, a silicate, a metal, or combinations thereof; or wherein the inorganic filler comprises glass spheres, glass fibers, glass hollow spheres, glass flakes, MgO, SiO2, Sb2O3, Al2O3, ZnO, talc, mica, kaolin, wollastonite, or combinations thereof.

Aspect 43. The thermoplastic copolyester elastomer composition of any one of Aspect 1-Aspect 42, wherein the thermoplastic copolyester elastomer composition consists essentially of one or more thermoplastic copolyester elastomer.

Aspect 44. The thermoplastic copolyester elastomer composition of any one of Aspect 1-Aspect 42, further comprising at least one ionomer.

Aspect 45. The thermoplastic copolyester elastomer composition of any one of Aspect 1-Aspect 42, further comprising at least one thermoplastic polyurethane.

Aspect 46. The thermoplastic copolyester elastomer composition of any one of Aspect 1-Aspect 45, wherein the thermoplastic copolyester elastomer composition is substantially free of a thermoplastic polyamide polymer, include polyamide copolymers such as polyether block amide copolymers.

Aspect 47. The thermoplastic copolyester elastomer composition of any one of Aspect 1-Aspect 45, wherein the thermoplastic copolyester elastomer composition is substantially free of a thermoplastic polyolefin polymers, including polyethylene and polypropylene and/or polyolefin copolymers such as ethylene-vinyl acetate copolymers.

Aspect 48. The thermoplastic copolyester elastomer composition of any one of Aspect 1-Aspect 47, wherein the thermoplastic copolyester elastomer has a maximum load when determined using a cyclic tensile test as described herein of about 10 N to about 100 N; about 15 N to about 50 N; or about 20 N to about 40 N.

Aspect 49. The thermoplastic copolyester elastomer composition of any one of Aspect 1-Aspect 48, wherein the thermoplastic copolyester elastomer has an energy efficiency when determined using a cyclic tensile test as described herein of greater than or equal to about 50%; greater than or equal to about 60%; or greater than or equal to about 70%.

Aspect 50. The thermoplastic copolyester elastomer composition of any one of Aspect 1-Aspect 49, wherein the thermoplastic copolyester elastomer has an energy return when determined using a cyclic tensile test as described herein of about 1 J to 15 J; about 2 J to 12 J; or about 4J to 10 J.

Aspect 51. The thermoplastic copolyester elastomer composition of any one of Aspect 1-Aspect 50, wherein the thermoplastic copolyester elastomer has tensile modulus of about 1 MPa to 15 MPa when determined using a cyclic tensile test as described herein.

Aspect 52. The thermoplastic copolyester elastomer composition of any one of Aspect 1-Aspect 51, wherein the thermoplastic copolyester elastomer has a zero shear viscosity when determined using a cyclic tensile test as described herein of about 10 to about 10,000 pascal-second; about 100 to about 7,000 pascal-second; or about 1,000 to about 5,000 pascal-second.

Aspect 53. A form article comprising a formed polymeric material comprising the thermoplastic copolyester elastomer composition of any one of Aspect 1-Aspect 52; wherein the form article has a multicellular form structure.

Aspect 54. The form article of Aspect 53, wherein the form article is extruded form article.

Aspect 55. The form article of Aspect 53, wherein the form article is compression molded form article.

Aspect 56. The form article of any one of Aspect 53-Aspect 55, wherein the form article has a split tear value of about 1.0 kilogram per centimeter to 4.5 kilogram per centimeter, about 1.6 kilogram per centimeter to 4.0 kilogram per centimeter, about 2.0 kilogram per centimeter to 4.0 kilogram per centimeter, about 2.0 kilogram per centimeter to 3.5 kilogram per centimeter, about 2.5 kilogram per centimeter to 3.5 kilogram per centimeter, about 0.07 kilogram per centimeter to 2.0 kilogram per centimeter, or about 0.8 kilogram per centimeter to 1.5 kilogram per centimeter, or about 0.9 to 1.2 kilogram per centimeter, about 1.5 kilogram per centimeter to 2.2 kilogram per centimeter; about 0.08 kilogram per centimeter to 4.0 kilogram per centimeter, about 0.9 kilogram per centimeter to 3.0 kilogram per centimeter, about 1.0 to 2.0 kilogram per centimeter, about 1.0 kilogram per centimeter to 1.5 kilogram per centimeter, or about 2 kilogram per centimeter.

Aspect 57. The form article of any one of Aspect 53-Aspect 56, wherein the form article has a tensile strength of from 5 kilogram per centimeter squared to 25 kilogram per centimeter squared, or of from 10 kilogram per centimeter squared to 23 kilogram per centimeter squared, or of from 15 kilogram per centimeter squared to 22 kilogram per centimeter squared.

Aspect 58. The form article of any one of Aspect 53-Aspect 57, wherein the form article has an energy return of about 60% to 90%; about 60% to 85%; about 65% to 85%; about 70% to 85%; about 60% to 85%; about 65% to 80%; about 65% to 75%; about 70% to 80%; or about 75% to 80%; about 75% to 85%; about 80% to 95%; or about 85% to 95%.

Aspect 59. The form article of any one of Aspect 53-Aspect 58, wherein the form article has a density of less than or equal to about 0.7 gram per cubic centimeter; of about 0.1 gram per cubic centimeter to about 0.35 gram per cubic centimeter; about 0.15 gram per cubic centimeter to about 0.35 gram per cubic centimeter; about 0.2 gram per cubic centimeter to about 0.35 gram per cubic centimeter; or about 0.1 gram per cubic centimeter to about 0.22 gram per cubic centimeter.

Aspect 60. The form article of any one of Aspect 53-Aspect 59, wherein the form article has a specific gravity of from about 0.02 to about 0.22; of from about 0.03 to about 0.12; from about 0.04 to about 0.10; from about 0.11 to about 0.12; from about 0.10 to about 0.12; from about 0.15 to about 0.2; 0.15 to about 0.30; 0.01 to about 0.10; from about 0.02 to about 0.08; from about 0.03 to about 0.06; 0.08 to about 0.15; from about 0.10 to about 0.12; from about 0.15 to about 0.2, or from about 0.10 to about 0.12.

Aspect 61. The form article of any one of Aspect 53-Aspect 59, wherein the form article has a stiffness of about 30 newtons per millimeter to about 275 newtons per millimeter; about 40 newtons per millimeter to about 275 newtons per millimeter; about 40 newtons per millimeter to about 100 newtons per millimeter; or about 50 newtons per millimeter to about 85 newtons per millimeter.

Aspect 62. The form article of any one of Aspect 53-Aspect 61, wherein the multicellular form structure is a closed cell form structure.

Aspect 63. The form article of any one of Aspect 53-Aspect 61, wherein the multicellular form structure is an open cell form structure.

Aspect 64. The form article of any one of Aspect 53-Aspect 63, wherein the multicellular form has an average cell size of from about 50 micron to about 5 mm; from about 100 micron to about 1 mm; or from about 50 micron to about 1 mm.

Aspect 65. The form article of any one of Aspect 53-Aspect 63, wherein the form article has a change in displacement at max loading of about 0.75 mm or less when measured on form slabs having a thickness of about 1 cm, wherein the form slabs are compressed for about 5000 cycles of compression from 0 N to 300 N and back to 0 N per cycle, using a 45 mm diameter tupp as the compression head.

Aspect 66. The form article of any one of Aspect 53-Aspect 63, wherein the form article has a change in displacement at max loading of about 0.1 mm or less when measured on form slabs having a thickness of about 1 cm, wherein the form slabs are compressed for about 5000 cycles of compression from 0 N to 300 N and back to 0 N per cycle, using a 45 mm diameter tupp as the compression head.

Aspect 67. A method for making a form article, the method comprising: forming a mixture of molten polymeric material comprising a thermoplastic elastomer and a blowing agent; injecting the mixture into a mold cavity; forming the molten polymeric material, thereby forming a formed molten polymeric material; solidifying the formed molten polymeric material, thereby forming a form article having a multicellular form structure; and removing the form article from the mold cavity.

Aspect 68. The method of Aspect 67, wherein the thermoplastic elastomer is a thermoplastic copolyester elastomer of any one of Aspect 1-Aspect 52.

Aspect 69. The method of Aspect 67 or Aspect 68, wherein the blowing agent is a physical blowing agent.

Aspect 70. The method of Aspect 69, wherein the physical blowing agent is a supercritical fluid.

Aspect 71. The method of Aspect 70, wherein the supercritical fluid comprises nitrogen, or a supercritical fluid thereof.

Aspect 72. The method of Aspect 71, wherein the supercritical fluid comprises or consists essentially of nitrogen, or a supercritical fluid thereof.

Aspect 73. The method of Aspect 71, wherein the supercritical fluid further comprises carbon dioxide, or a supercritical fluid thereof.

Aspect 74. The method of Aspect 73, wherein the carbon dioxide is present in an amount of about 1% to about 3% or about 1% to about 5% by weight based on upon a total weight of the mixture.

Aspect 75. The method of any one of Aspect 71-Aspect 74, wherein the nitrogen is present in an amount of about 1% to about 3% or about 1% to about 5% by weight based on upon a total weight of the mixture.

Aspect 76. The method of any one of Aspect 68-Aspect 74, wherein the forming the mixture of the molten polymeric material and the physical blowing agent comprises adding the physical blowing agent to the molten polymer material and forming a single phase solution of the physical blowing agent dissolved in the molten polymer material.

Aspect 77. The method of any one of Aspect 68-Aspect 74, wherein the forming the mixture of the molten polymer material and the physical blowing agent comprises infusing a solid resin comprising the polymeric material with the physical blowing agent to form infused resin, and melting the infused resin to form a single phase solution of the physical blowing agent dissolved in the molten polymeric mixture.

Aspect 78. The method of any one of Aspect 68-Aspect 77, wherein the injecting the mixture into the mold cavity comprises injecting the mixture into a pressurized mold cavity, the pressurized mold cavity having a first pressure greater than atmospheric pressure; and the forming the molten polymeric material comprises decreasing the first pressure to a second pressure and initiating formation of gas bubbles by the physical blowing agent, thereby forming the molten polymeric material.

Aspect 79. The method of any one of Aspect 76-Aspect 78, wherein the injecting the mixture into the mold cavity comprises injecting the mixture into a pressurized mold cavity having a first pressure greater than atmospheric pressure.

Aspect 80. The method of Aspect 79, wherein the method comprises applying a gas counter pressure to the mold cavity of from about 100 psi to about 3,000 psi, or from about 550 psi to about 1500 psi, or from about 650 psi to about 1000 psi, and wherein the gas counter pressure is applied to the mold cavity before the forming.

Aspect 81. The method of Aspect 78, wherein the second pressure is atmospheric pressure; and wherein decreasing the first pressure to the second pressure comprises venting the pressurized mold cavity to atmospheric pressure.

Aspect 82. The method of Aspect 78, wherein the second pressure is atmospheric pressure; and wherein decreasing the first pressure to the second pressure comprises using a controlled rate of pressure decrease until the mold cavity has a pressure essentially equal to atmospheric pressure.

Aspect 83. The method of Aspect 82, wherein the controlled rate of pressure decrease is from about 10 psi per sec to about 600 psi per sec, or from about 15 psi per sec to about 300 psi per sec, or from about 20 psi per sec to about 150 psi per sec.

Aspect 84. The method of Aspect 78, wherein the second pressure is atmospheric pressure; and wherein decreasing the first pressure to a second pressure comprises decreasing the pressure in a plurality of step decreases in pressure until the mold cavity has a pressure essentially equal to atmospheric pressure.

Aspect 85. The method of Aspect 67, wherein the blowing agent is a chemical blowing agent.

Aspect 86. The method of Aspect 85, wherein the chemical blowing agent is present in an amount from about 0.05 weight percent to about 25 weight percent or about 0.1 weight percent to about 10 weight percent based on the total weight of the polymeric mixture.

Aspect 87. The method of Aspect 85 or Aspect 86, wherein the chemical blowing is an azo compound.

Aspect 88. The method of any one of Aspect 67-Aspect 87, wherein the form article is substantially free of a chemical blowing agent or a decomposition product thereof.

Aspect 89. The method of any one of Aspect 67-Aspect 87, wherein the form article is substantially free of a physical blowing agent.

Aspect 90. The method of any one of Aspect 67-Aspect 89, wherein the mixture has an injection temperature; and wherein the injection temperature is from about the melting temperature of the thermoplastic elastomer to about 50 degrees C. above the tail temperature of the thermoplastic elastomer.

Aspect 91. The method of Aspect 90, wherein the injection temperature is from about the melting temperature of the thermoplastic elastomer to a temperature that is above the tail temperature of the thermoplastic elastomer by about 0 degrees C., 5 degrees C., 10 degrees C., 15 degrees C., 20 degrees C., 25 degrees C., 30 degrees C., 35 degrees C., 40 degrees C., 45 degrees C., or 50 degrees C.

Aspect 92. The method of any one of Aspect 67-Aspect 91, wherein the forming occurs at a forming temperature; and wherein the forming temperature is from about the melting temperature of the thermoplastic elastomer to about 50 degrees C. above the tail temperature of the thermoplastic elastomer.

Aspect 93. The method of Aspect 92, wherein the forming temperature is from about the melting temperature of the thermoplastic elastomer to a temperature that is above the tail temperature of the thermoplastic copolyester elastomer by about 0 degrees C., 5 degrees C., 10 degrees C., 15 degrees C., 20 degrees C., 25 degrees C., 30 degrees C., 35 degrees C., 40 degrees C., 45 degrees C., or 50 degrees C.

Aspect 94. The method of any one of Aspect 67-Aspect 93, wherein the form article is a thermoplastic form article.

Aspect 95. The method of any one of Aspect 67-Aspect 94, wherein the multicellular form structure is a closed cell form structure.

Aspect 96. The method of any one of Aspect 67-Aspect 94, wherein the multicellular form structure is an open cell form structure.

Aspect 97. The method of any one of Aspect 67-Aspect 96, wherein the multicellular form has an average cell size of from about 50 micron to about 5 mm; from about 100 micron to about 1 mm; or from about 50 micron to about 1 mm.

Aspect 98. The method of any one of Aspect 67-Aspect 96, wherein the thermoplastic elastomer does not form crosslinks during forming; or wherein the thermoplastic elastomer does not form crosslinks during solidifying.

Aspect 99. The method of any one of Aspect 67-Aspect 98, wherein the solidifying comprises cooling the mold cavity; or wherein the solidifying comprises cooling the formed molten polymeric material.

Aspect 100. The method of any one of Aspect 67-Aspect 99, wherein the forming comprises releasing pressure from the mold cavity at a mold cavity pressure release rate.

Aspect 101. The method of Aspect 100, wherein the mold cavity pressure release rate is about 10 psi per sec to about 600 psi per sec, or about 15 psi per sec to about 300 psi per sec, or about 20 psi per sec to about 150 psi per sec.

Aspect 102. The method of any one of Aspect 67-Aspect 99, wherein the forming comprises providing a gas counter pressure to the mold cavity.

Aspect 103. The method of Aspect 102, wherein the gas counter pressure is at least about 550 psi, about 550 psi to about 1500 psi, or about 650 psi to about 1000 psi.

Aspect 104. The method of Aspect 103, wherein the blowing agent is a physical blowing agent; or wherein the blowing agent is supercritical nitrogen.

Aspect 105. The method of any one of Aspect 67-Aspect 104, the method further comprising placing a textile element in the mold cavity prior to injecting the mixture, and forming the molten polymeric material in contact with the textile element.

Aspect 106. The method of Aspect 105, wherein the textile element comprises thermoplastic polyester fibers, thermoplastic polyester yarns, thermoplastic polyurethane fibers, thermoplastic polyurethane yarns, thermoplastic polyamide fibers, thermoplastic polyamide yarns, or combinations thereof.

Aspect 107. The method of Aspect 105 or Aspect 106, wherein the textile element is a component for an upper for an article of footwear.

Aspect 108. The method of any one of Aspect 67-Aspect 107, wherein the form article is a component of an article of footwear.

Aspect 109. The method of any one of Aspect 67-Aspect 107, wherein the form article is a component of an article of apparel.

Aspect 110. The method of any one of Aspect 67-Aspect 107, wherein the form article is a component of an article of sporting equipment.

Aspect 111. The method of any one of Aspect 67-Aspect 110, wherein the thermoplastic copolyester elastomer has a maximum load of about 10 N to about 100 N when determined using a cyclic tensile test as described herein.

Aspect 112. The method of Aspect 111, wherein the thermoplastic copolyester elastomer has a maximum load of about 15 N to about 50 N when determined using a cyclic tensile test as described herein.

Aspect 113. The method of Aspect 111, wherein the thermoplastic copolyester elastomer has a maximum load of about 20 N to about 40 N when determined using a cyclic tensile test as described herein.

Aspect 114. The method of any one of Aspect 67-Aspect 113, wherein the thermoplastic copolyester elastomer has an energy efficiency when determined using a cyclic tensile test as described herein of greater than or equal to about 50%; greater than or equal to about 60%; or greater than or equal to about 70%.

Aspect 115. The method of any one of Aspect 67-Aspect 114, wherein the thermoplastic copolyester elastomer has an energy return when determined using a cyclic tensile test as described herein of about 1 J to about 15 J; about 2 J to about 12 J; or about 4 J to 10 J.

Aspect 116. The method of any one of Aspect 67-Aspect 115, wherein the thermoplastic copolyester elastomer has tensile modulus of about 1 MPa to 15 MPa when determined using a cyclic tensile test as described herein.

Aspect 117. The method of any one of Aspect 67-Aspect 116, wherein the thermoplastic copolyester elastomer has a zero shear viscosity when determined using a cyclic tensile test as described herein of about 10 to about 10,000 pascal-second; about 100 to about 7,000 pascal-second; or about 1,000 to about 5,000 pascal-second.

Aspect 118. The method of any one of Aspect 67-Aspect 117, wherein the form article has a tensile test value of greater than or equal to about 30 kilogram per centimeter when determined using a cyclic tensile test as described herein.

Aspect 119. The method of any one of Aspect 67-Aspect 118, wherein the form article has a split tear test value of greater than or equal to about 1.5 kilogram per centimeter when determined using a cyclic tensile test as described herein.

Aspect 120. The method of any one of Aspect 67-Aspect 119, wherein the form article has a density of less than or equal to about 0.7 gram per cubic centimeter; about 0.1 gram per cubic centimeter to about 0.35 gram per cubic centimeter; about 0.15 gram per cubic centimeter to about 0.35 gram per cubic centimeter; about 0.2 gram per cubic centimeter to about 0.35 gram per cubic centimeter; or about 0.1 gram per cubic centimeter to about 0.22 gram per cubic centimeter.

Aspect 121. The method of any one of Aspect 67-Aspect 120, wherein the form article has a stiffness of about 30 newtons per millimeter to about 275 newtons per millimeter; about 40 newtons per millimeter to about 275 newtons per millimeter; about 40 newtons per millimeter to about 100 newtons per millimeter; or about 50 newtons per millimeter to about 85 newtons per millimeter.

Aspect 122. The method of any one of Aspect 67-Aspect 121, wherein the form article has a change in displacement at max loading of about 0.75 mm or less when measured on form slabs having a thickness of about 1 cm, wherein the form slabs are compressed for about 5000 cycles of compression from 0 N to 300 N and back to 0 N per cycle, using a 45 mm diameter tupp as the compression head.

Aspect 123. The method of any one of Aspect 67-Aspect 121, wherein the form article has a change in displacement at max loading of about 0.1 mm or less when measured on form slabs having a thickness of about 1 cm, wherein the form slabs are compressed for about 5000 cycles of compression from 0 N to 300 N and back to 0 N per cycle, using a 45 mm diameter tupp as the compression head.

Aspect 124. The method of any one of 67-123, wherein the injecting comprises monitoring an injection pressure of the mixture prior or during the injecting, and controlling the injecting based on the injection pressure of the mixture.

Aspect 125. The method of any one of 67-123, wherein the injecting comprises controlling the injection temperature of the mixture prior to the mixture entering the mold cavity.

Aspect 126. The method of any one of 67-123, wherein the injecting comprises controlling a mold cavity temperature prior to the mixture entering the mold cavity.

Aspect 127. The method of any one of 67-126, wherein the mixture has an expansion ratio of 1 as compared to a volume of the mold cavity.

Aspect 128. The method of any one of 67-126, wherein, following removing the form article from the mold cavity, cooling the form article to about 25 degrees C., and equilibrating the form article at about 25 degrees C. and about 1 atm of pressure, a volume of the equilibrated form article is within plus or minus 5 percent of a volume of the mold cavity.

Aspect 129. An article comprising the form article of any one of Aspect 53-Aspect 66 or the form article made by the method of any one of Aspect 67-Aspect 128.

Aspect 130. The article of Aspect 129, wherein the article is an article of footwear.

Aspect 131. The article of Aspect 130, wherein the form article is a cushioning element in the article of footwear.

Aspect 132. The article of Aspect 131, wherein the cushioning element is a component of a sole structure in the article of footwear.

Aspect 133. The article of Aspect 132, wherein the sole structure further comprises an outsole component on a ground-facing side of the outsole component.

Aspect 134. The article of Aspect 133, wherein the outsole component comprises a cured rubber.

Aspect 135. The article of any one of Aspect 129-Aspect 134, wherein the article comprises a side of the form article bonded to an upper.

Aspect 136. The article of Aspect 135, wherein the upper comprises a thermoplastic polyester yarn, a thermoplastic polyester fiber, a thermoplastic polyurethane yarn, a thermoplastic polyurethane fiber, a thermoplastic polyamide yarn, a thermoplastic polyamide fiber, or combinations thereof.

Aspect 137. The article of Aspect 135 or Aspect 136, wherein the side of the form article bonded to an upper is bonded using an adhesive.

Aspect 138. The article of Aspect 135 or Aspect 136, wherein the side of the form article bonded to an upper and is essentially free of an adhesive at a bond interface between the side of the form article and the upper.

Aspect 139. The article of Aspect 129, wherein the article is an article of apparel.

Aspect 140. The article of Aspect 129, wherein the article is an article of sporting equipment.

Aspect 141. A method for manufacturing an article of footwear, the method comprising: affixing a form article and a textile element to each other; wherein the form article is a form article of any one of Aspect 53-Aspect 66; or wherein the form article is a form article is made by the method one of Aspect 67-Aspect 128.

Aspect 142. A method for manufacturing an article of footwear, the method comprising: affixing an outsole to the midsole to a midsole; wherein the outsole comprises an outsole thermoplastic copolyester elastomer; and wherein the midsole comprises a form article of any one of Aspect 53-Aspect 66, or a form article is made by the method of any one of Aspect 67-Aspect 128.

Aspect 143. The method of Aspect 142, wherein the outsole thermoplastic copolyester elastomer comprises a thermoplastic copolyester elastomer of any one of Aspect 1-Aspect 52.

Aspect 144. The method of Aspect 142, wherein the outsole thermoplastic copolyester elastomer is substantially free of a thermoplastic copolyester elastomer of any one of Aspect 1-Aspect 52.

Aspect 145. The method of any one of Aspect 142-Aspect 144, wherein outsole is substantially free of a formed outsole thermoplastic copolyester elastomer.

Aspect 146. The method of any one of Aspect 142-Aspect 144, wherein outsole comprises a formed outsole thermoplastic copolyester elastomer.

Aspect 147. The method of any one of Aspect 142-Aspect 146, wherein the midsole comprises a midsole formed thermoplastic copolyester composition comprising a first polymeric component including at least one first thermoplastic copolyester, and the outsole comprises an outsole thermoplastic copolyester composition comprising a second polymeric component including at least one second thermoplastic copolyester, and wherein a concentration of an additive in the formed thermoplastic copolyester composition differs from a concentration of the additive in the outsole thermoplastic copolyester composition by at least 10 weight percent, or a first concentration of the first polymeric component in the formed thermoplastic copolyester composition differs from a second concentration of the second polymeric component in the outsole thermoplastic copolyester composition by at least 10 weight percent, or a chemical structure of the first at least one thermoplastic copolyester differs from a chemical structure of the second at least one thermoplastic copolyester, or a number average molecular weight of the first at least one thermoplastic copolyester differs from a number average molecular weight of the second at least one thermoplastic copolyester by at least 10 percent, or any combination thereof.

Aspect 148. The method of any one of Aspect 142-Aspect 147, wherein the affixing comprises injection molding an outsole, and then injection molding the midsole directly onto the outsole.

Aspect 149. The method of any one of Aspect 142-Aspect 147, wherein the affixing comprises thermally bonding the midsole to the outsole.

Aspect 150. A molding system for forming a form article, the system comprising: a barrel housing a screw configured to receive a molten polymeric material and form a mixture of the molten polymeric material comprising a thermoplastic elastomer and a blowing agent, and to adjust a position of the screw in the barrel to regulate a flowrate of the mixture out of the barrel; a mold cavity configured to contain the mixture during forming, mold the formed mixture, and solidify the molded formed mixture into the form article; an injection or extrusion device configured to receive the mixture and extrude or inject it into the mold cavity at an injection pressure and temperature; and a temperature control and monitoring system configured to control the injection temperature or a forming temperature at which the molten polymeric material is formed within the mold cavity, or both.

Aspect 151. The molding system of Aspect 150, wherein the temperature control and monitoring system is configured to control the injection temperature of the mixture or the forming temperature of the molten polymeric material or both within a temperature ranging from about the melting temperature of the thermoplastic elastomer to about 50 degrees C. above the tail temperature of the thermoplastic elastomer.

Aspect 152. The molding system of Aspect 150 or Aspect 151, further comprising a gas counter pressure assembly coupled to the mold cavity, wherein the gas counter pressure assembly is configured to regulate an amount of counter pressure gas flow into the mold cavity before, during or after extruding or injecting the mixture into the mold cavity, or during forming of the molten polymeric material in the mold cavity.

Aspect 153. The molding system of any one of Aspect 150-Aspect 152, further comprising a mold cavity venting system configured to regulate a rate of pressure loss due to gas flow out of the mold cavity.

Aspect 154. The molding system of any one of Aspect 150-Aspect 153, wherein the system further comprises a runner system in fluid communication with the injection or extrusion device and the mold cavity.

Aspect 155. The molding system of Aspect 154, wherein the runner system is configured to control a temperature of the mixture as it flows through the runner.

Aspect 156. The molding system of Aspect 155, wherein the runner system is configured to heat the mixture as it flows through the runner.

Aspect 157. The molding system of any one of Aspect 150-Aspect 156, wherein the system includes a pressure control assembly configured to control a pressure of the mixture as it enters the mold cavity.

Aspect 158. A method for operation of a molding system for forming a form article, the method comprising: forming a mixture of a molten polymeric material comprising a thermoplastic elastomer and a blowing agent in a barrel housing a screw; adjusting a position of the screw in the barrel to regulate a flowrate of the mixture out of the barrel; flowing the mixture from the barrel into a mold cavity; extruding or injecting the mixture into the mold cavity at an injection pressure and an injection pressure; forming the molten polymeric material in the mold cavity at a forming temperature, thereby forming a formed molten polymeric material; and solidifying the formed molten polymeric material in the mold cavity, thereby forming a form article having a multicellular form structure.

Aspect 159. The method of operation of Aspect 158, wherein the method further comprises monitoring and controlling the injection temperature of the mixture or the forming temperature of the molten polymeric material or both within a temperature ranging from about the melting temperature of the thermoplastic elastomer to about 50 degrees C. above the tail temperature of the thermoplastic elastomer.

Aspect 160. The method of operation of Aspect 158 or Aspect 159, further comprising regulating an amount of counter pressure gas flowing into the mold cavity before, during or after extruding or injecting the mixture into the mold cavity, or during forming of the molten polymeric material in the mold cavity.

Aspect 161. The method of operation of any one of Aspect 158-Aspect 160, further comprising releasing gas from the mold cavity at a controlled rate during the extruding or injecting or during the forming.

Aspect 162. The method of operation of any one of Aspect 158-Aspect 161, further comprising controlling a temperature of the mixture as it flows through a runner into the mold cavity.

Aspect 163. The method of operation of any one of Aspect 158-Aspect 163, further controlling the injection pressure of the mixture as it enters the mold cavity.

Aspect 164. The method of operation of any one of Aspect 158-Aspect 163, wherein the molten polymeric material comprises a thermoplastic copolyester elastomer according any one of Aspect 1-52, or the form article comprises a form article according to any one of Aspect 53-Aspect 66, or the method is a method of making a form article according to any one of Aspect 67-Aspect 128, or any combination thereof.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Materials.

Hytrel® 3078 and Hytrel® 4068 were obtained from DuPont (Wilmington, Del., USA); Pelprene™ P-30B was obtained from Toyobo U.S.A. Inc. (New York, N.Y., USA); and TRI EL® 5400 was obtained from Samyang Corporation (Korea).

Solid Polymer Characterization.

Dynamic scanning calorimetry (DSC) was performed on a TA instruments Q2000. 10-30 mg pieces of undried resin pellets were cycled from −90 degrees C. to 225 degrees C. at 20 degrees C./min and cooled to −90° C. at 10° C./min. In some instances, experiments were run using a heat-cool-heat profile with a ramp rate of 10 degrees C./min, minimum temperature of 0 degrees C. and maximum temperature of 250 degrees C. Each material was run in duplicate. The $T_m$ and $T_g$ values were recorded from the second cycle. The melt "peak" was identified as the local maximum of the second heating cycle. If there was more than one peak in the DSC curve, the peak occurring at hotter temperatures was chosen as the molding temperature reference. The tail was identified as the intersection of the tangent of the line of the higher temperature side of the melt peak with the extrapolated baseline. A schematic illustrating the method for determining peak and tail temperatures is shown in FIG. 7.

Dynamic mechanical analysis (DMA) was performed on a TA instruments Q800 (New Castle, Del., USA). Solid 150 mm×100 mm×2 mm (L×W×H) plaques of each material were injected molded. From the injection molded plaques approximately 10 mm×60 mm×2 mm (L×W×H) samples were die cut. Strain and frequency sweeps experiments were run at 25° C. Strain sweep experiments sampled the range from $2\times10^4$ to 2 percent strain at 1 Hz. Frequencies from 0.5 to 100 Hz were sampled with 10 points per decade for the frequency sweep experiments at 0.1 percent strain. Temperature sweep experiments were conducted by scanning from −20° C. to 100° C. at 5° C./min with 0.1 percent strain at 1 Hz. The glass transition temperature, $T_g$, was recorded at the peak of the loss modulus, G". If there is not a peak in G" the peak of tan δ was recorded as the $T_g$. Values for G', G', and tan δ were recorded at 25° C.

Viscosity measurements were collected on a TA instruments DHR-3 Rheometer using flat parallel plates. Samples of 25 mm circular cross section and circle roughly 2 mm thick were die cut from a solid injection molded plaque. The samples were dried before placing in the rheometer. All samples were equilibrated at 180° C. for 2-5 minutes and trimmed to obtain a final gap of <1 mm. A flow sweep experiment with shear rates from 0.01 to 100 $s^{-1}$ was conducted. The data was fit with Carreau, Carreau-Yasuda, and Williamson models and the best-fit was selected to record the zero-shear viscosity value. Polymer melt flow curve was determined at a temperature 20 degrees C. greater than the melting point as determined by DSC as described herein above.

The cyclic tensile testing can be carried on a specimen having a dog-bone shape with a 2 mm thickness. In the test, the specimen can be placed under a pre-load of 0-20 N. In some instances, the pre-load is 5 N. Strain is controlled to extend to an extension in the range of 1-25 percent. In some instances, the strain is controlled to extend to 6 percent. The cyclic tensile testing is used to determine the average stiffness, creep, maximum strain ("Max Strain"), and efficiency in the data shown below.

Form Polymer Characterization.

The specific gravity (SG) of 10-20 mm formed plaques was measured using a Densicom Tester (Qualitest, Plantation, Fla., USA). Pre-weighed samples were submerged in a water bath and the ratio of the mass of the sample in air and the mass of the sample in water was used to calculate the specific gravity of the sample.

Water uptake. formed samples were dried in a vacuum oven at 50 degrees C. for 2 days before being submerged in a water bath for 24 h. The surface water was removed by gently blotting it from the surface of the sample before weighing. The water uptake was calculated as the percent mass difference between the dry and wet samples.

Force/displacement behavior for the forms and the formed articles was measured using an Instron Electropuls E10000 (Instron, Norwood, Mass., USA) with a stainless steel 45 mm circular cross section impact geometry. Most form slabs were approximately 10 mm, some were thinner or thicker. Each sample was evaluated by two different compression cycles: "running" and "walking". A "running" compression cycle consists of samples being compressed under displacement control from 0N to 300N and back to 0N in 180 ms, followed by a pause of 400 ms for a total of ~1.7 Hz. The "walking" compression cycle consist of samples compressed from 0N to 144N and back to 0N in 600 ms followed by a pause of 400 ms for a total of ~1 Hz. The corresponding force-displacement data provided information about the form modulus (stiffness), hysteresis (energy efficiency), set, fatigue behavior, etc. . . . over many cycles. Typical characterization using the compression sequence above are run for 5000 cycles, which simulates approximately ~5-10 miles of walking/running and takes about 45 minutes of testing time on the Electropuls. Longer runs up to 100,000 compression cycles are done to simulate accelerated materials response to ~100-200 miles of use.

Energy input is taken as the integral of the force-displacement curve during compression force loading. Energy output is taken as the integral of the force displacement curve during unloading. Hysteresis is taken as the ratio: (energy output)/(energy input), which can also be viewed as the energy efficiency of the form. Fatigue behavior is judged by changes in the form displacement at the max load of a cycle. All measured properties: stiffness, hysteresis, and fatigue are measured for thousands of cycles for both running and walking compression cycles.

Processing Conditions.

Form plaques were prepared according to the conditions shown in Table 1 below.

TABLE 1

| Material | Melt Temp (° C.) | Mold Temp (° C.) | Injection Speed (cc/sec) | Fill time (s) | MPP (Bar) | $N_2$ (%) | GCP (PSI) | GCP release |
|---|---|---|---|---|---|---|---|---|
| Hytrel 4068 | 210 | 54 | 100 | 2.5 | 175 | 0.5 | 600 | End of fill |
| Hytrel 3078 | 200 | 40 | 100 | 2.5 | 175 | 0.5 | 600 | End of fill |

Form midsoles were prepared according to the conditions shown in Table 2 below.

TABLE 2

| Material | Melt Temp (° C.) | Mold Temp (° C.) | Injection Speed (cc/sec) | Fill time (s) | Cooling Time (s) | MPP (Bar) | $N_2$ (%) | GCP (PSI) | GCP release |
|---|---|---|---|---|---|---|---|---|---|
| Hytrel 4068 | 210 | 54 | 100 | 2.5 | 400 | 175 | 1.22 | 600 | End of fill |
| Hytrel 3078 | 200 | 40 | 100 | 2.5 | 400 | 175 | 1.5 | 600 | End of fill |

Form plaques were prepared according to the conditions shown in Table 3 below.

TABLE 3

| No. | Polyester | Mold Temperature (degrees C) | Mold Temperature relative to peak temperature (degrees C) | Mold Temperature relative to tail temperature (degrees C) | Foam Quality |
|---|---|---|---|---|---|
| 1 | Triel ® 5400 | 160 | +5 | −16 | Good |
| 2 | Toyobo P-30B | 175 | 0 | −18 | Poor |
| 3 | Toyobo P-30B | 190 | +15 | −3 | Good |
| 4 | Toyobo P-30B | 205 | +30 | +12 | Coarse |
| 5 | Toyobo P-30B | 245 | +70 | +52 | Coarser |

Figure 9:
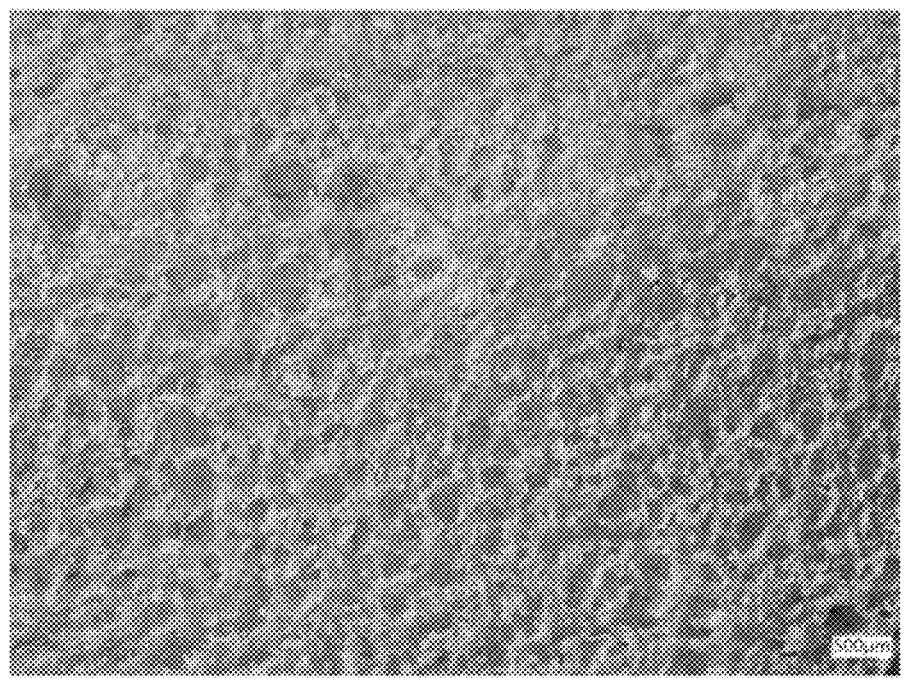
FIG. 9 shows a representative image of a cross-sectional view of a form plaque prepared using a disclosed thermoplastic copolyester elastomer 160 degrees C. The image shows a scalar bar (500 micrometers).

Cross-sectional views of the form plaques described above are shown in FIGS. 8A-8D (for Nos. 2-5 above) and FIG. 9 (for No. 1 above).

Exemplary Data of Form Plaques.

Figure 6:
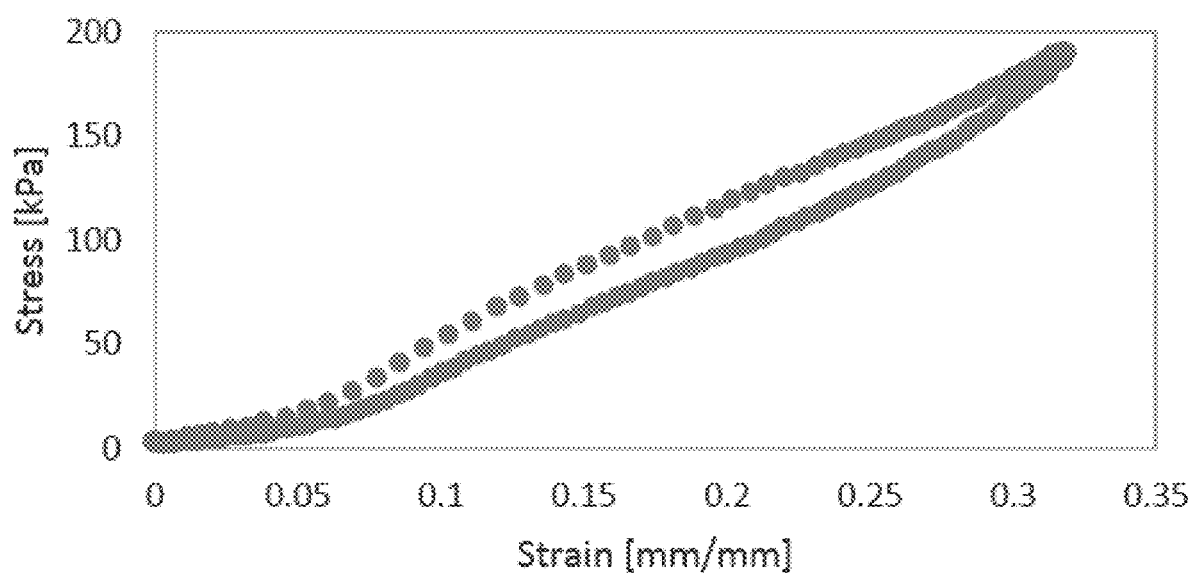
FIG. 6 shows representative compression data for representative form plaques comprising a disclosed composition and prepared using a disclosed method.

Form plaques were prepared as described above using Hytrel® 4068. Exemplary compression data are shown in FIG. 6. The data were obtained by a cyclic compression testing protocol on a plaque in the form of a cylindrical tub having the following dimensions: thickness—20 mm; diameter—44.86 mm. The compression data in FIG. 6 are a representative compression curve. The data obtained from these tests are summarized in Table 4 below.

TABLE 4*

| Material | Average Modulus (kPA) | Average Stiffness (N/mm) | Creep (% strain basis) | Max Strain (mm/mm) | Efficiency (Out/In) |
|---|---|---|---|---|---|
| Hytrel 4068 | 584 | 48 | 1.5 | 0.325 | 0.83 |

*"Average Modulus" is "Average Tensile Modulus."

The specific gravity for form plaques, prepared as described herein above, was determined to be 0.16-0.28 for Hytrel® 4068 and 0.17-0.26 Hytrel® 3078.

The specific gravity for form midsoles, prepared as described herein above, was determined to be 0.19-0.27 for Hytrel® 4068 and 0.19-0.26 Hytrel® 3078.

The form plaques described in Table 3 above were subjected to energy return analysis as described herein. The results are shown in Table 5 below.

TABLE 5

| No. | Polyester | Energy Return (mJ) |
|---|---|---|
| 1 | Triel ® 5400 | 2830 |
| 2 | Toyobo P-30B | 2050 |
| 3 | Toyobo P-30B | 2940 |
| 4 | Toyobo P-30B | 3150 |
| 5 | Toyobo P-30B | 2950 |

It should be emphasized that the above-described aspects of the present disclosure are merely possible examples of implementations, and are set forth only for a clear understanding of the principles of the disclosure. Many variations and modifications may be made to the above-described aspects of the disclosure without departing substantially from the spirit and principles of the disclosure. All such modifications and variations are intended to be included herein within the scope of this disclosure.

What is claimed:

1. A method of making a midsole component, the method comprising:
    forming a single phase solution (SPS) comprising a molten polymeric material and a blowing agent consisting of a supercritical fluid, wherein the molten polymeric material comprises a thermoplastic elastomer;
    injecting the SPS into a pressurized mold cavity;
    forming the molten polymeric material of the SPS in the mold cavity by transitioning the supercritical fluid to a gas by decreasing pressure within the mold cavity, thereby forming a formed polymeric material;
    solidifying the formed polymeric material in the mold cavity, thereby forming a midsole component including a single solidified thermoplastic form portion, wherein the single solidified thermoplastic form portion has a closed skin over its entire exterior surface, the closed skin surrounds an interior region, and the interior region has a multicellular form structure, wherein the single solidified thermoplastic form portion has a specific gravity of from about 0.08 to about 0.31; and
    removing the midsole component from the mold cavity.

2. The method of claim 1, wherein the thermoplastic elastomer is a thermoplastic copolyester elastomer, and the solidified thermoplastic form portion is a solidified thermoplastic copolyester form portion.

3. The method of claim 2, wherein the interior region of the single solidified thermoplastic copolyester form portion has an open-cell multicellular form structure.

4. The method of claim 2, wherein the thermoplastic copolyester elastomer comprises:
    (a) a plurality of first segments, each first segment of the plurality derived from a dihydroxy-terminated polydiol;
    (b) a plurality of second segments, each second segment of the plurality derived from a diol; and
    (c) a plurality of third segments, each third segment of the plurality derived from an aromatic dicarboxylic acid.

5. The method of claim 2, wherein the thermoplastic copolyester elastomer comprises:
    (a) a plurality of first copolyester units, each first copolyester unit of the plurality comprising a segment derived from a dihydroxy-terminated polydiol and an additional segment derived from an aromatic dicarboxylic acid, wherein each first copolyester unit of the plurality has a structure represented by a formula 1:

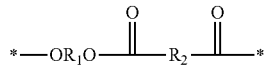

wherein $R_1$ is a group remaining after removal of terminal hydroxyl groups from the dihydroxy-terminated polydiol of the first segment, wherein the dihydroxy-terminated polydiol of the first segment is a poly(alkylene oxide) diol having a number-average molecular weight of about 400 to about 6000; and wherein $R_2$ is a group remaining after removal of carboxyl groups from the aromatic dicarboxylic acid of the third segment; and
    (b) a plurality of second copolyester units, each second copolyester unit of the plurality comprising a segment derived from a diol and a further segment derived from an aromatic dicarboxylic acid, wherein each second copolyester unit of the plurality has a structure represented by a formula 2:

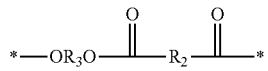

wherein $R_3$ is a group remaining after removal of hydroxyl groups from the diol of the second segment, wherein the diol of the second segment is a diol having a molecular weight of less than about 250; and wherein $R_2$ is the group remaining after removal of carboxyl groups from the aromatic dicarboxylic acid of the third segment.

6. The method of claim 4, wherein the thermoplastic copolyester elastomer consists essentially of about 40 weight percent to about 65 weight percent of the plurality of second copolyester units based on total weight of the thermoplastic copolyester elastomer.

7. The method of claim 1, wherein the supercritical fluid comprises nitrogen or carbon dioxide.

8. The method of claim 1, wherein the supercritical fluid is present in the SPS in an amount of from about 1 percent to about 5 percent by weight based upon a total weight of the SPS.

9. The method of claim 1, wherein the pressurized mold cavity has a first pressure greater than atmospheric pressure; and wherein the forming the molten polymeric material comprises decreasing the first pressure to a second pressure initiating formation of gas bubbles by the supercritical fluid, thereby forming the molten polymeric material.

10. The method of claim 1, wherein the injecting comprises monitoring an injection pressure of the SPS prior or during the injecting, and controlling the injecting based on the injection pressure of the SPS.

11. The method of claim 1, wherein the SPS has an expansion ratio of 1 as compared to a volume of the mold cavity.

12. The method of claim 1, wherein before the forming, a gas counter pressure of from about 100 pounds per square inch to about 3,000 pounds per square inch is applied to the mold cavity.

13. The method of claim 9, wherein the second pressure is atmospheric pressure; and wherein decreasing the first pressure to the second pressure comprises venting the pressurized mold cavity to atmospheric pressure.

14. The method of claim 9, wherein the second pressure is atmospheric pressure; and wherein decreasing the first pressure to the second pressure comprises using a controlled rate of pressure decrease until the mold cavity has a pressure essentially equal to atmospheric pressure.

15. The method of claim 14, wherein the controlled rate of pressure decrease is from about 10 pounds per square inch per second to about 600 pounds per square inch per second.

16. The method of claim 1, wherein the interior region of the single solidified thermoplastic form portion has an average cell size of from about 50 microns to about 5 millimeters.

17. The method of claim 1, wherein the single solidified thermoplastic form portion has an energy efficiency when determined using a cyclic tensile test of greater than or equal to about 50%.

18. The method of claim 1, wherein the single solidified thermoplastic form portion has a split tear value of about 1.0 kilogram per centimeter to 4.5 kilogram per centimeter.

19. The method of claim 1, wherein the thermoplastic elastomer does not form crosslinks during the forming; and wherein the thermoplastic elastomer does not form crosslinks during the solidifying.

20. The method of claim 2, wherein the thermoplastic elastomer is a block copolymer, a segmented copolymer, or a random copolymer.

* * * * *

UNITED STATES PATENT AND TRADEMARK OFFICE
CERTIFICATE OF CORRECTION

| | |
|---|---|
| PATENT NO. | : 11,667,764 B2 |
| APPLICATION NO. | : 17/662668 |
| DATED | : June 6, 2023 |
| INVENTOR(S) | : Hossein A. Baghdadi |

It is certified that error appears in the above-identified patent and that said Letters Patent is hereby corrected as shown below:

On the Title Page

Item (57):
"A variety of forms and form components are provided, including form components for articles of footwear and athletic equipment. The articles include a composition having a form structure, wherein the composition includes a thermoplastic copolyester elastomer comprising: (a) a plurality of first segments, each first segment derived from a dihydroxy-terminated polydiol; (b) a plurality of second segments, each second segment derived from a diol; and (c) a plurality of third segments, each third segment derived from an aromatic dicarboxylic acid. Methods of making the compositions and forms are provided, as well as methods of making an article of footwear including at least one of the form components. In some aspects, the forms and form components can be made by extrusion or injection molding to form the polymeric composition, or extrusion or injection molding to form the polymeric composition followed by compression molding of the form." should read as --A variety of foams and foam components are provided, including foam components for articles of footwear and athletic equipment. The articles include a composition having a foam structure, wherein the composition includes a thermoplastic copolyester elastomer comprising: (a) a plurality of first segments, each first segment derived from a dihydroxy-terminated polydiol; (b) a plurality of second segments, each second segment derived from a diol; and (c) a plurality of third segments, each third segment derived from an aromatic dicarboxylic acid. Methods of making the compositions and foams are provided, as well as methods of making an article of footwear including at least one of the foam components. In some aspects, the foams and foam components can be made by extrusion or injection molding to foam the polymeric composition, or extrusion or injection molding to foam the polymeric composition followed by compression molding of the foam.--.

In the Claims

Claim 1, Column 67, Lines 30 - 41:
"forming the molten polymeric material of the SPS in the mold cavity by transitioning the supercritical fluid to a gas by decreasing pressure within the mold cavity, thereby forming a formed polymeric material; solidifying the formed polymeric material in the mold cavity, thereby forming a midsole Signed and Sealed this
Twelfth Day of September, 2023

Katherine Kelly Vidal
*Director of the United States Patent and Trademark Office* component including a single solidified thermoplastic form portion, wherein the single solidified thermoplastic form portion has a closed skin over its entire exterior surface, the closed skin surrounds an interior region, and the interior region has a multicellular form structure, wherein the single solidified thermoplastic form portion" should read as --foaming the molten polymeric material of the SPS in the mold cavity by transitioning the supercritical fluid to a gas by decreasing pressure within the mold cavity, thereby forming a foamed polymeric material; solidifying the foamed polymeric material in the mold cavity, thereby forming a midsole component including a single solidified thermoplastic foam portion, wherein the single solidified thermoplastic foam portion has a closed skin over its entire exterior surface, the closed skin surrounds an interior region, and the interior region has a multicellular foam structure, wherein the single solidified thermoplastic foam portion--.

Claim 2, Column 67, Lines 46 - 47:
"solidified thermoplastic form portion is a solidified thermoplastic copolyester form portion." should read as --solidified thermoplastic foam portion is a solidified thermoplastic copolyester foam portion.--.

Claim 3, Column 67, Lines 49 - 50:
"copolyester form portion has an open-cell multicellular form structure." should read as --copolyester foam portion has an open-cell multicellular foam structure.--.

Claim 9, Column 68, Line 49 and 52:
"and wherein the forming the molten" should read as --and wherein the foaming the molten--;
"thereby forming the molten" should read as --thereby foaming the molten--.

Claim 12, Column 68, Line 60:
"wherein before the forming," should read as --wherein before the foaming,--.

Claim 16, Column 69, Line 10:
"thermoplastic form portion" should read as --thermoplastic foam portion--.

Claim 17, Column 69, Line 14:
"thermoplastic form portion" should read as --thermoplastic foam portion--.

Claim 18, Column 69, Line 18:
"thermoplastic form portion" should read as --thermoplastic foam portion--.

Claim 19, Column 69, Line 21:
"crosslinks during the forming" should read as --crosslinks during the foaming--.